US012146683B2

United States Patent
Staniforth et al.

(10) Patent No.: US 12,146,683 B2
(45) Date of Patent: Nov. 19, 2024

(54) AIR TREATMENT APPARATUS

(71) Applicant: Dyson Technology Limited, Wiltshire (GB)

(72) Inventors: Mark Joseph Staniforth, Bristol (GB); Akinlara Oladapo Akinjogbin, Essex (GB); David Bardera Barbolla, Pamplona (ES)

(73) Assignee: Dyson Technology Limited, Wiltshire (GB)

( * ) Notice: Subject to any disclaimer, the term of this patent is extended or adjusted under 35 U.S.C. 154(b) by 553 days.

(21) Appl. No.: 17/418,086

(22) PCT Filed: Dec. 17, 2019

(86) PCT No.: PCT/GB2019/053591
§ 371 (c)(1),
(2) Date: Jun. 24, 2021

(87) PCT Pub. No.: WO2020/141312
PCT Pub. Date: Jul. 9, 2020

(65) Prior Publication Data
US 2022/0098059 A1    Mar. 31, 2022

(30) Foreign Application Priority Data

Jan. 2, 2019 (GB) .................................... 1900016
Sep. 12, 2019 (GB) .................................... 1913167

(51) Int. Cl.
*F24F 6/04* (2006.01)
*C02F 1/32* (2023.01)
(Continued)

(52) U.S. Cl.
CPC .............. *F24F 6/043* (2013.01); *C02F 1/325* (2013.01); *D02G 3/449* (2013.01); *F24F 6/04* (2013.01);
(Continued)

(58) Field of Classification Search
CPC ...... F24F 6/043; F24F 6/04; F24F 8/22; F24F 8/95; F24F 13/06; F24F 13/20;
(Continued)

(56) References Cited

U.S. PATENT DOCUMENTS 2,504,349 A * 4/1950 Prieto ..................... C02F 1/325
250/435
3,095,121 A * 6/1963 Douty ................. A47L 15/4427
222/335

(Continued)

FOREIGN PATENT DOCUMENTS

CN           1724950 A      1/2006
CN        201334377 Y     10/2009
(Continued)

OTHER PUBLICATIONS

International Search Report and Written Opinion mailed Mar. 13, 2020, directed to International Application No. PCT/GB2019/053591; 11 pages.

(Continued)

*Primary Examiner* — Stephen Hobson
(74) *Attorney, Agent, or Firm* — Tucker Ellis LLP

(57) ABSTRACT

Provided is an air treatment apparatus comprising an air flow generator arranged to generate an air flow, a moisture source arranged to introduce water vapour into the air flow, and a water supply system. The water supply system comprises a water tank, a water supply pipe arranged to convey water from the water tank, a water pump arranged to pump water through the water supply pipe, and an ultraviolet light source arranged to irradiate the water passing through the water supply pipe. The water supply system further comprises a flow regulator. The flow regulator comprises a receptacle or flow regulation chamber that is arranged to receive water from the water pump and that is fluidically connected to the (Continued)

water supply pipe, and the receptacle comprises a crest or brim that is arranged to allow water to flow of the receptacle.

22 Claims, 30 Drawing Sheets

(51) Int. Cl.
*D02G 3/44* (2006.01)
*F24F 8/22* (2021.01)
*F24F 8/95* (2021.01)
*F24F 13/06* (2006.01)
*F24F 13/20* (2006.01)
*F24F 6/00* (2006.01)

(52) U.S. Cl.
CPC .............. *F24F 8/22* (2021.01); *F24F 8/95* (2021.01); *F24F 13/06* (2013.01); *F24F 13/20* (2013.01); *C02F 2201/3222* (2013.01); *C02F 2201/3228* (2013.01); *C02F 2303/04* (2013.01); *F24F 2006/006* (2013.01); *F24F 2006/008* (2013.01); *F24F 2006/046* (2013.01); *F24F 2013/205* (2013.01)

(58) Field of Classification Search
CPC ........... F24F 2006/006; F24F 2006/008; F24F 2006/046; F24F 2013/205; F24F 6/00; F24F 13/00; C02F 1/325; C02F 2201/3222; C02F 2201/3228; C02F 2303/04; C02F 1/32; D02G 3/449; Y02B 30/70

See application file for complete search history.

(56) References Cited

U.S. PATENT DOCUMENTS

| | | | | |
|---|---|---|---|---|
| 3,535,513 | A * | 10/1970 | Salvatore | C02F 1/325 119/245 |
| 3,825,494 | A * | 7/1974 | Ccall et al. | C02F 3/24 210/197 |
| 3,836,781 | A * | 9/1974 | Ellison | G21K 5/02 976/DIG. 441 |
| 4,102,645 | A * | 7/1978 | Meacham, Jr | C02F 1/325 250/435 |
| 4,306,581 | A * | 12/1981 | Alandt | G05D 21/02 137/563 |
| 4,350,646 | A * | 9/1982 | Baus | F24F 6/04 261/36.1 |
| 4,475,356 | A * | 10/1984 | Lewis | F28F 27/003 261/DIG. 11 |
| 4,630,475 | A * | 12/1986 | Mizoguchi | F24F 6/00 356/440 |
| 4,822,533 | A * | 4/1989 | Steiner | F24F 6/043 261/104 |
| 4,971,687 | A * | 11/1990 | Anderson | C02F 9/20 210/438 |
| 5,677,982 | A * | 10/1997 | Levine | F24F 6/00 392/405 |
| 5,780,860 | A * | 7/1998 | Gadgil | A61L 2/10 250/435 |
| 5,800,741 | A * | 9/1998 | Glenn | F24F 6/04 55/514 |
| 5,817,231 | A * | 10/1998 | Souza | C02F 1/008 210/260 |
| 5,859,952 | A * | 1/1999 | Levine | F24F 6/18 239/102.1 |
| 5,919,357 | A * | 7/1999 | Wilkins | G05D 7/0676 210/120 |
| 6,193,938 | B1 | 2/2001 | Wedekamp | A61L 2/10 405/113 |
| 6,803,587 | B2 * | 10/2004 | Gadgil | C02F 1/325 250/434 |
| 6,845,971 | B2 * | 1/2005 | Bachert | B01F 23/712 261/92 |
| 7,073,781 | B2 * | 7/2006 | Mulvaney | C02F 1/325 239/34 |
| 7,250,610 | B1 * | 7/2007 | Cox | C02F 1/325 210/748.11 |
| 7,498,004 | B2 * | 3/2009 | Saccomanno | A61L 9/20 422/186 |
| 7,534,356 | B2 * | 5/2009 | Saccomanno | A61L 2/10 250/435 |
| 7,540,474 | B1 * | 6/2009 | Huang | F24F 6/12 261/81 |
| 7,566,885 | B2 * | 7/2009 | Helmore | F24D 17/0073 210/744 |
| 7,683,344 | B2 * | 3/2010 | Tribelsky | A61L 9/205 250/435 |
| 8,496,188 | B2 * | 7/2013 | Linton | F04B 23/02 239/128 |
| 8,872,130 | B1 * | 10/2014 | Matthews | C02F 1/325 210/764 |
| 8,980,178 | B2 * | 3/2015 | Gaska | B01D 46/10 422/62 |
| 9,011,700 | B2 * | 4/2015 | Eng | C02F 1/005 601/48 |
| 9,080,780 | B2 * | 7/2015 | Lee | A61L 9/205 |
| 9,593,860 | B1 * | 3/2017 | Robinson | F24F 6/00 |
| 9,732,969 | B2 * | 8/2017 | Lee | C02F 1/325 |
| 11,359,397 | B2 * | 6/2022 | Gruber | C02F 1/325 |
| 12,007,143 | B2 * | 6/2024 | Xu | F24F 13/20 |
| 2002/0190400 | A1 | 12/2002 | Bachert | B01F 23/712 261/81 |
| 2005/0258554 | A1 * | 11/2005 | Bachert | F24F 6/043 261/36.1 |
| 2007/0039345 | A1 * | 2/2007 | Forsberg | E03B 3/28 62/317 |
| 2007/0196235 | A1 * | 8/2007 | Shur | C02F 1/325 422/62 |
| 2010/0176056 | A1 * | 7/2010 | Rozenberg | B01D 61/025 210/636 |
| 2011/0309032 | A1 * | 12/2011 | Makl | B01D 19/0031 250/435 |
| 2011/0315787 | A1 * | 12/2011 | Linton | B08B 3/026 239/124 |
| 2012/0112371 | A1 * | 5/2012 | Kanel | F24F 6/02 261/157 |
| 2013/0020500 | A1 * | 1/2013 | McKinney | C02F 1/325 250/436 |
| 2013/0020501 | A1 * | 1/2013 | McKinney | C02F 1/325 250/437 |
| 2013/0028763 | A1 * | 1/2013 | Staniforth | F24F 13/26 417/423.5 |
| 2013/0048545 | A1 * | 2/2013 | Shatalov | C02F 1/325 210/96.1 |
| 2013/0126430 | A1 * | 5/2013 | Kenley | B01D 61/00 210/638 |
| 2013/0249124 | A1 * | 9/2013 | Staniforth | F24F 6/14 261/129 |
| 2013/0249126 | A1 * | 9/2013 | Staniforth | F24F 13/26 261/141 |
| 2014/0060094 | A1 * | 3/2014 | Shur | F25D 27/005 422/186.3 |
| 2014/0060096 | A1 * | 3/2014 | Shur | A61L 2/10 250/492.1 |
| 2014/0060104 | A1 * | 3/2014 | Shur | F25D 17/042 250/492.1 |
| 2014/0061509 | A1 * | 3/2014 | Shur | A23L 3/003 250/492.1 |
| 2014/0202962 | A1 * | 7/2014 | Bilenko | C02F 1/325 210/748.11 |
| 2014/0264070 | A1 * | 9/2014 | Bettles | A61L 2/10 250/435 |
| 2015/0144575 | A1 * | 5/2015 | Hawkins, II | C02F 1/325 210/748.11 |
| 2015/0314024 | A1 * | 11/2015 | Khan | A61L 2/10 250/435 |

(56) References Cited

U.S. PATENT DOCUMENTS

| | | | | |
|---|---|---|---|---|
| 2015/0338336 | A1* | 11/2015 | Dobrinsky | A61L 9/20 |
| | | | | 250/435 |
| 2016/0009570 | A1* | 1/2016 | Yu | C02F 1/325 |
| | | | | 210/748.1 |
| 2016/0138818 | A1* | 5/2016 | Fitsch | C02F 1/325 |
| | | | | 261/36.1 |
| 2016/0331855 | A1* | 11/2016 | St. Louis | A61L 2/08 |
| 2017/0010011 | A1* | 1/2017 | Duvall | F24F 6/14 |
| 2017/0128603 | A1* | 5/2017 | Guamis Alegre | A61L 2/04 |
| 2017/0203323 | A1* | 7/2017 | Gschwind | B05B 17/0615 |
| 2017/0225971 | A1* | 8/2017 | Henderson | B01F 25/3141 |
| 2017/0225972 | A1* | 8/2017 | Sabin | C02F 1/325 |
| 2017/0296690 | A1* | 10/2017 | Matsui | A61N 5/06 |
| 2017/0320081 | A1* | 11/2017 | Heuckeroth | B05B 9/03 |
| 2018/0072590 | A1* | 3/2018 | Akiyama | A61L 2/26 |
| 2018/0354814 | A1* | 12/2018 | Tymchuk | C02F 1/325 |
| 2022/0074611 | A1* | 3/2022 | Dawson | F24F 8/22 |
| 2022/0106205 | A1 | 4/2022 | Nutbeen et al. | |
| 2022/0349592 | A1 | 11/2022 | Railton et al. | |

FOREIGN PATENT DOCUMENTS

| | | | | | |
|---|---|---|---|---|---|
| CN | 202101377 U | 1/2012 | | | |
| CN | 102338432 A | 2/2012 | | | |
| CN | 202403357 U | 8/2012 | | | |
| CN | 102721159 A | 10/2012 | | | |
| CN | 102900653 A | 1/2013 | | | |
| CN | 203052888 U | 7/2013 | | | |
| CN | 203687273 U | 7/2014 | | | |
| CN | 104075389 A | 10/2014 | | | |
| CN | 104692488 A | 6/2015 | | | |
| CN | 103381336 B | 7/2015 | | | |
| CN | 204830314 U | 12/2015 | | | |
| CN | 205825320 U | 12/2016 | | | |
| CN | 106482271 A | 3/2017 | | | |
| CN | 106545944 A | 3/2017 | | | |
| CN | 206347685 U | 7/2017 | | | |
| CN | 107036220 A | 8/2017 | | | |
| CN | 206511954 U | 9/2017 | | | |
| CN | 107224645 A | 10/2017 | | | |
| CN | 107224654 A | 10/2017 | | | |
| CN | 107421045 A * | 12/2017 | | F24F 13/00 | |
| CN | 108278695 A | 7/2018 | | | |
| CN | 207797308 U | 8/2018 | | | |
| CN | 212057621 U | 12/2020 | | | |
| CN | 212204909 U | 12/2020 | | | |
| DE | 4117645 C1 | 1/1993 | | | |
| DE | 19911443 A1 | 9/2000 | | | |
| EP | 1600702 A2 | 11/2005 | | | |
| EP | 2231527 B1 | 6/2014 | | | |
| EP | 4269363 A1 * | 11/2023 | | C02F 1/325 | |
| FR | 3056111 A1 | 3/2018 | | | |
| GB | 2500012 A | 9/2013 | | | |
| GB | 2568937 A | 6/2019 | | | |
| GB | 2568938 A | 6/2019 | | | |
| JP | 57-021735 A | 2/1982 | | | |
| JP | S57-105283 A | 6/1982 | | | |
| JP | 63-198933 U | 12/1988 | | | |
| JP | 04-307191 A | 10/1992 | | | |
| JP | 05-019819 | 3/1993 | | | |
| JP | H7-73672 B2 | 8/1995 | | | |
| JP | H11-108402 A | 4/1999 | | | |
| JP | 11-290841 A | 10/1999 | | | |
| JP | 2002-168484 A | 6/2002 | | | |
| JP | 2002-235975 A | 8/2002 | | | |
| JP | 2003-004265 A | 1/2003 | | | |
| JP | 2005-337704 A | 12/2005 | | | |
| JP | 2008-039316 A | 2/2008 | | | |
| JP | 2010-019527 A | 1/2010 | | | |
| JP | 2012-13334 A | 1/2012 | | | |
| JP | 2012-067993 A | 4/2012 | | | |
| JP | 2013-013871 A | 1/2013 | | | |
| JP | 2013-050290 A | 3/2013 | | | |
| JP | 2013-185821 A | 9/2013 | | | |
| JP | 2014-76205 A | 5/2014 | | | |
| JP | 2014-76422 A | 5/2014 | | | |
| JP | 2014-233712 A | 12/2014 | | | |
| JP | 2015-187527 A | 10/2015 | | | |
| JP | 2017-74114 A | 4/2017 | | | |
| JP | 2017-87104 A | 5/2017 | | | |
| JP | 2017-225629 A | 12/2017 | | | |
| JP | 2018-059698 A | 4/2018 | | | |
| JP | 6360336 B2 | 7/2018 | | | |
| JP | 2018-192451 A | 12/2018 | | | |
| KR | 10-2010-0088324 A | 8/2010 | | | |
| KR | 10-2012-0039903 A | 4/2012 | | | |
| KR | 10-2012-0040513 A | 4/2012 | | | |
| KR | 10-2014-0030464 A | 3/2014 | | | |
| KR | 10-1377982 B1 | 3/2014 | | | |
| KR | 10-1400930 B1 | 6/2014 | | | |
| KR | 10-2015-0061810 A | 6/2015 | | | |
| KR | 10-2016-0012400 A | 2/2016 | | | |
| KR | 10-2016-0079376 A | 7/2016 | | | |
| KR | 10-2016-0097563 A | 8/2016 | | | |
| KR | 10-2016-0132502 A | 11/2016 | | | |
| KR | 2016146235 A * | 12/2016 | | B01F 5/0602 | |
| KR | 10-2017-0036434 A | 4/2017 | | | |
| KR | 10-2017-0051265 A | 5/2017 | | | |
| KR | 10-1748834 B1 | 6/2017 | | | |
| KR | 10-2017-0115450 A | 10/2017 | | | |
| KR | 10-2018-0002283 A | 1/2018 | | | |
| KR | 10-1853579 B1 | 4/2018 | | | |
| WO | 2010/060979 A1 | 6/2010 | | | |
| WO | 2014/003446 A1 | 1/2014 | | | |
| WO | 2014/053957 A1 | 4/2014 | | | |
| WO | 2014/058011 A1 | 4/2014 | | | |
| WO | 2014/075800 A2 | 5/2014 | | | |
| WO | 2015/099323 A1 | 7/2015 | | | |
| WO | 2016/052885 A1 | 4/2016 | | | |
| WO | 2018/084244 A1 | 5/2018 | | | |
| WO | 2018/190667 A2 | 10/2018 | | | |

OTHER PUBLICATIONS

Search Report dated Feb. 12, 2020, directed to GB Application No. 1913167.1; 1 page.

Search Report dated May 24, 2019, directed to GB Application No. 1900016.5; 1 page.

Office Action received for Korean Patent Application No. 10-2021-7021797, mailed on Feb. 13, 2023, 11 pages (6 pages of English Translation and 5 pages of Original Document).

Office Action received for Korean Patent Application No. 10-2021-7021800, mailed on Feb. 15, 2023, 12 pages (6 pages of English Translation and 6 pages of Original Document).

Office Action received for Korean Patent Application No. 10-2021-7021846, mailed on Feb. 15, 2023, 10 pages (5 pages of English Translation and 5 pages of Original Document).

Office Action received for Chinese Patent Application No. 201911412098.0, mailed on Feb. 9, 2021, 26 pages (15 pages of English Translation and 11 pages of Original Document).

Office Action received for European Patent Application No. 19823983.2, mailed on Apr. 18, 2023, 7 pages.

Office Action received for Japanese Patent Application No. 2021-538812, mailed on Aug. 16, 2022, 5 pages (2 pages of English Translation and 3 pages of Original Document).

Office Action received for Chinese Patent Application No. 201911412057.1, mailed on Sep. 10, 2021, 18 pages (11 pages of English Translation and 7 pages of Original Document).

Office Action received for Chinese Patent Application No. 201911412057.1, mailed on Mar. 2, 2021, 28 pages (16 pages of English Translation and 12 pages of Original Document).

Office Action received for Chinese Patent Application No. 201911420528.3, mailed on Feb. 26, 2021, 29 pages (17 pages of English Translation and 12 pages of Original Document).

Office Action received for Chinese Patent Application No. 201911420528.3, mailed on Sep. 14, 2021, 27 pages (17 pages of English Translation and 10 pages of Original Document).

International Search Report and Written Opinion received for PCT Patent Application No. PCT/GB2019/053589, mailed on Feb. 20, 2020, 11 pages.

(56) References Cited

OTHER PUBLICATIONS

International Search Report and Written Opinion received for PCT Patent Application No. PCT/GB2019/053590, mailed on Mar. 13, 2020, 9 pages.
Office Action received for Japanese Patent Application No. 2021-538666, mailed on Jul. 22, 2022, 16 pages (10 pages of English Translation and 6 pages of Original Document).
Search Report dated Feb. 12, 2020, directed to GB Application No. 1913177.0; 1 page.
Search Report dated Feb. 14, 2020, directed to GB Application No. 1913176.2; 1 page.

* cited by examiner

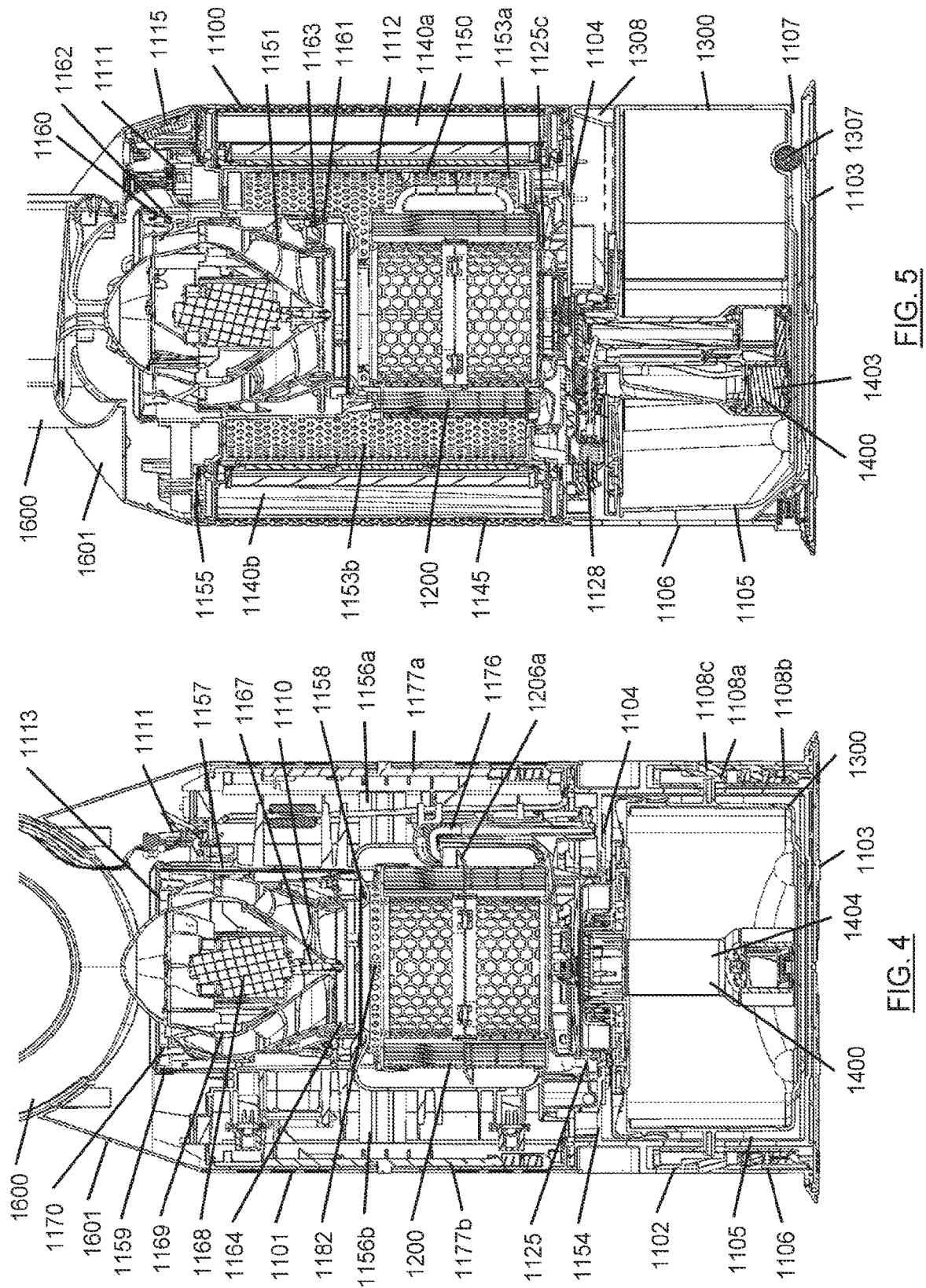

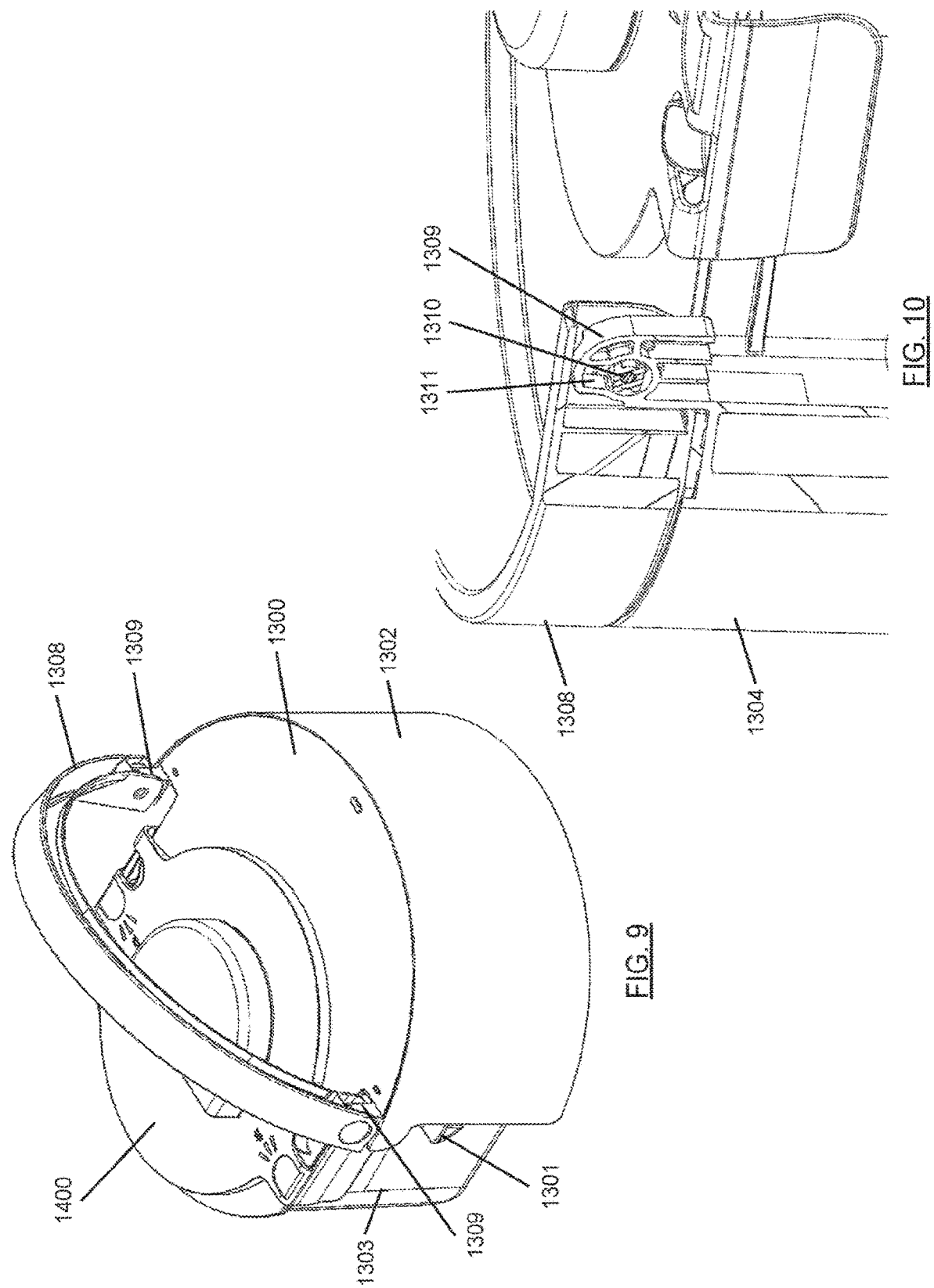

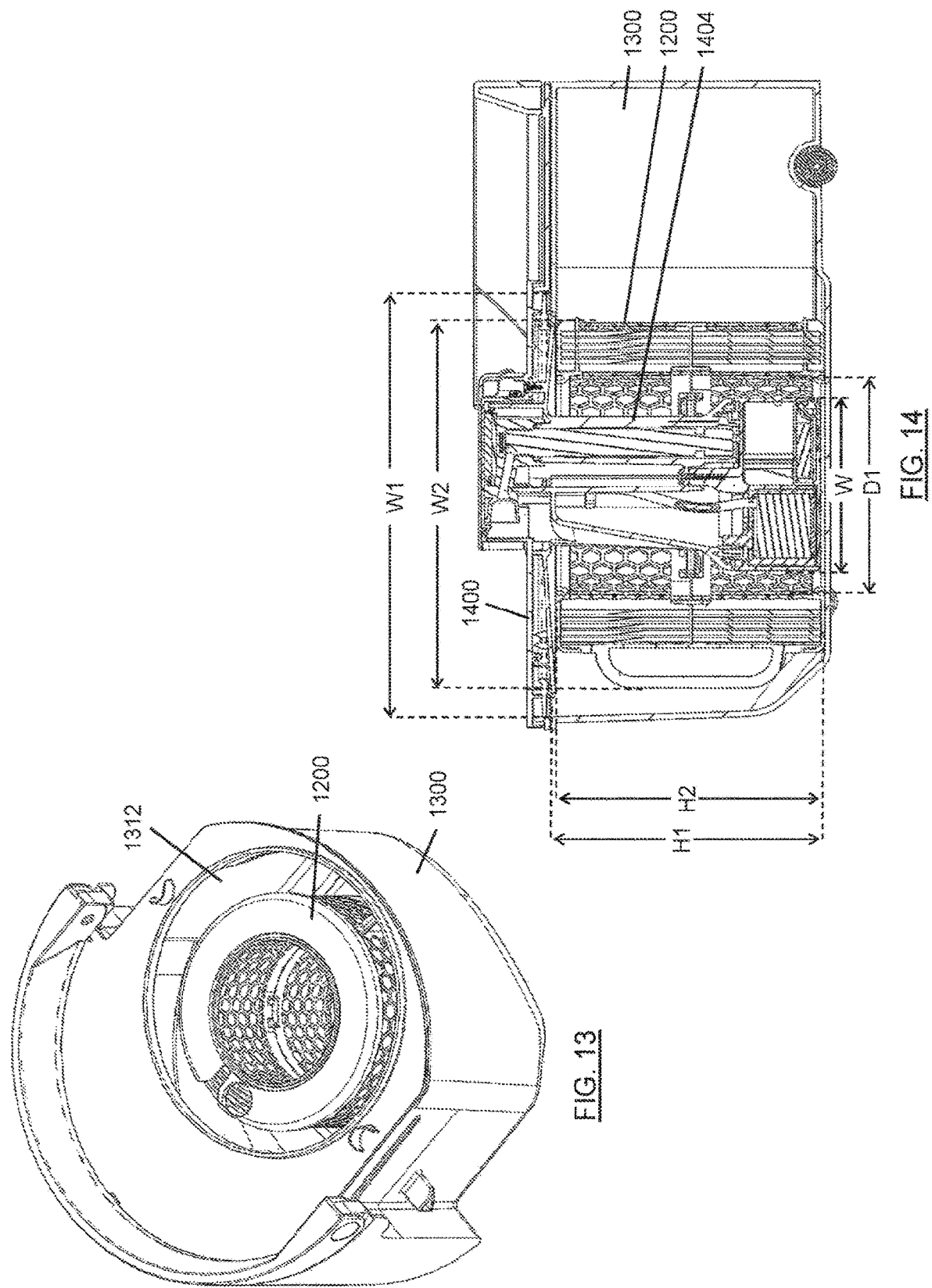

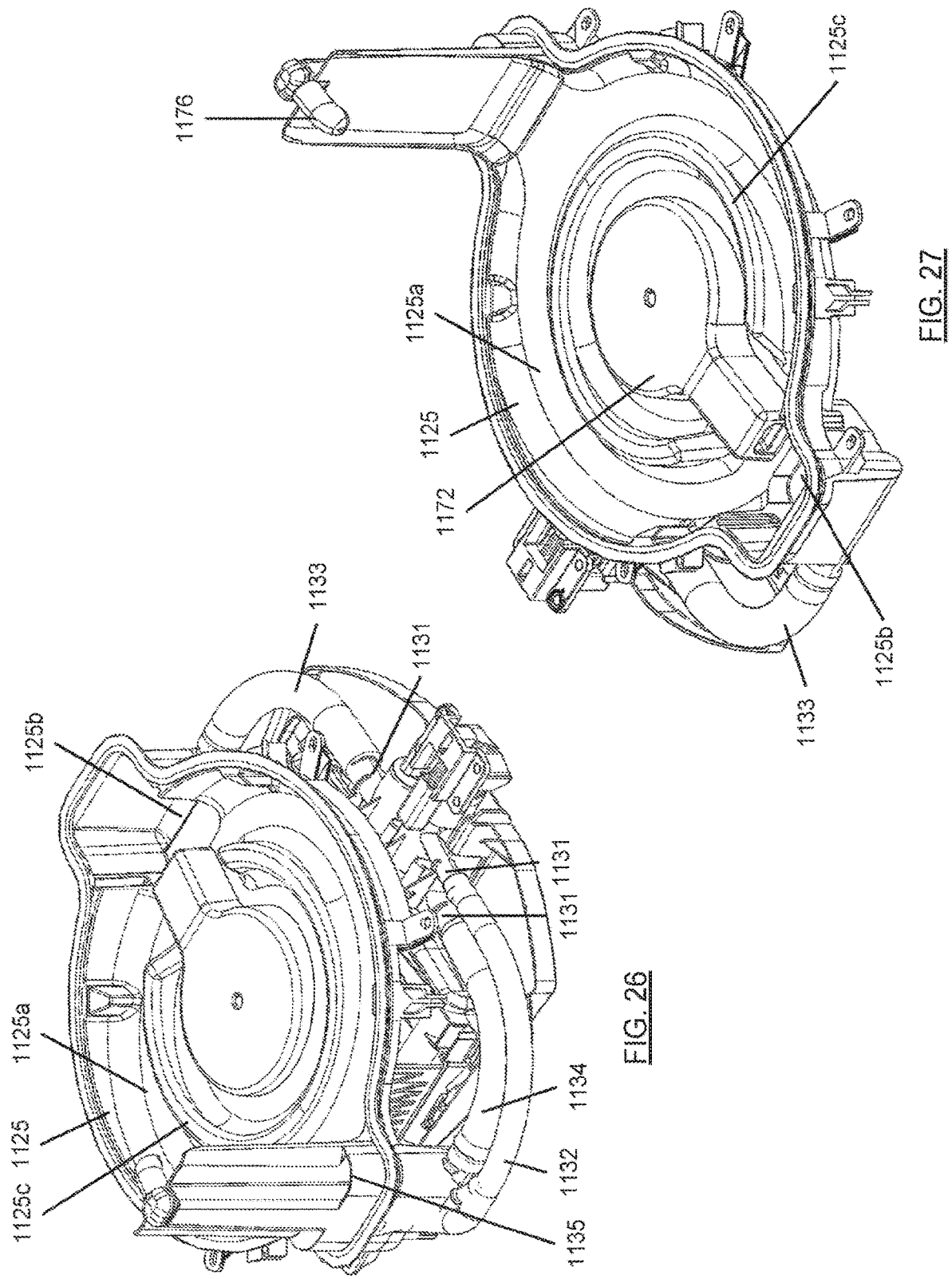

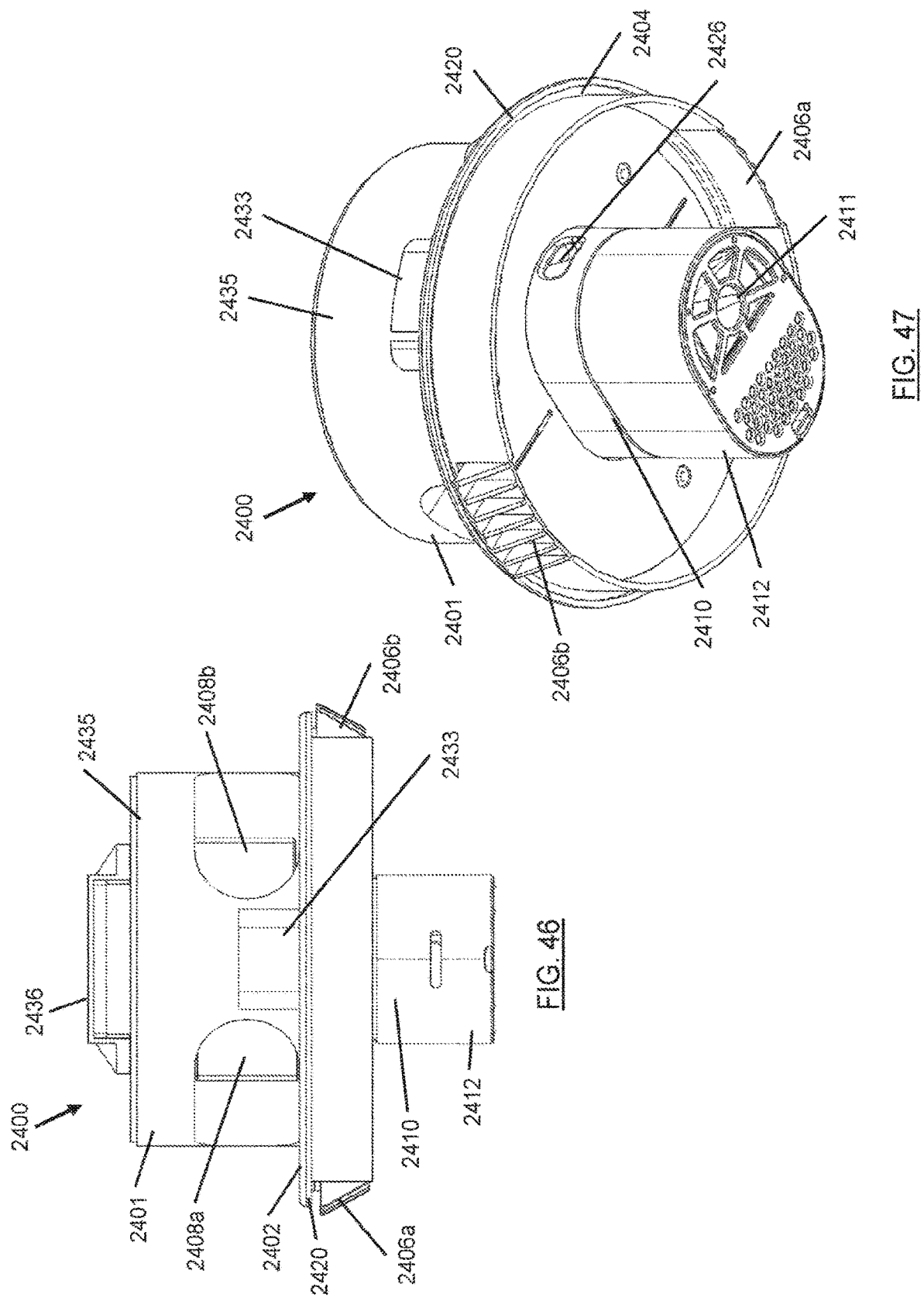

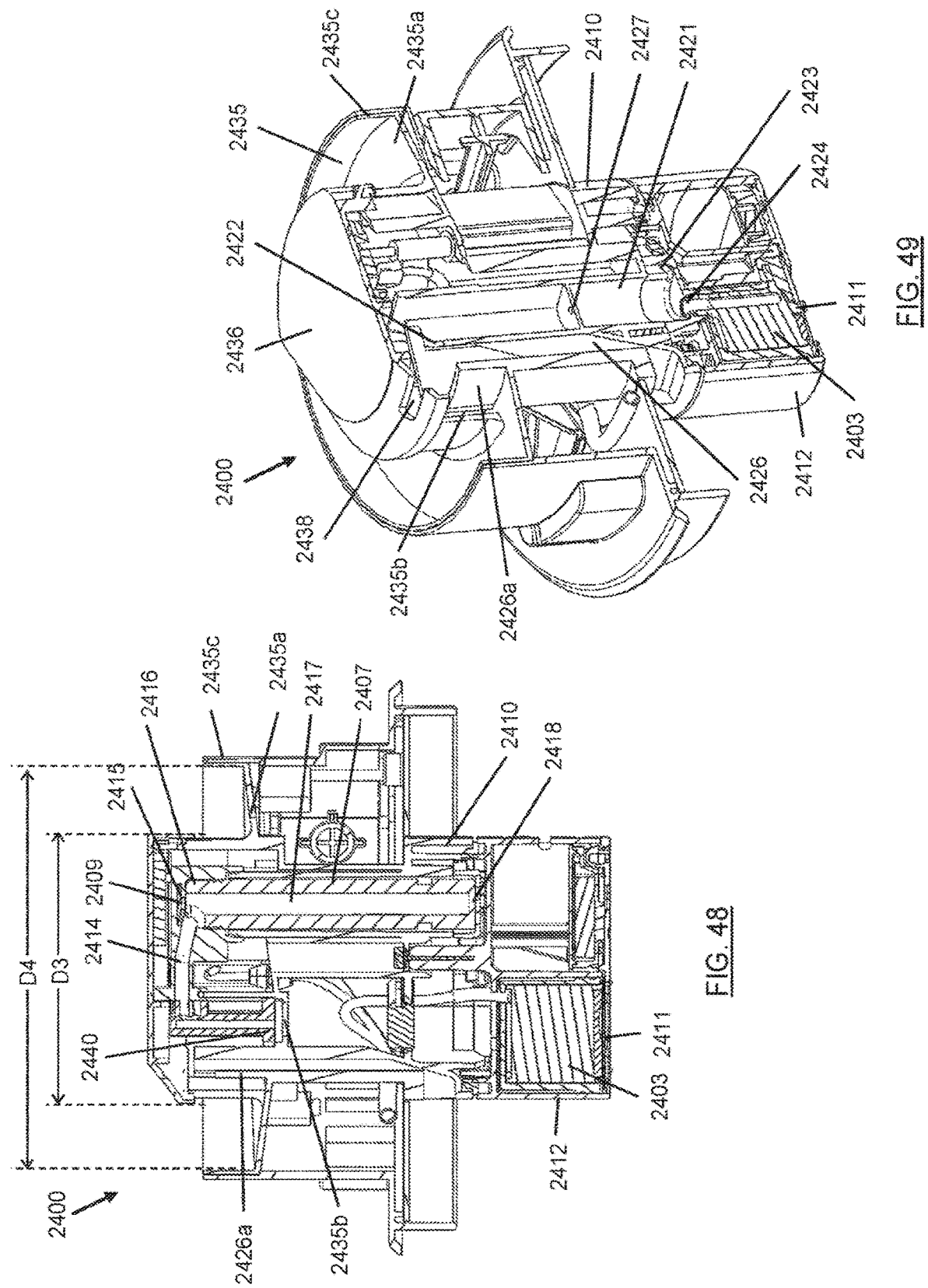

AIR TREATMENT APPARATUS

CROSS-REFERENCE TO RELATED APPLICATIONS

This application is a national phase application under 35 USC 371 of International Application No. PCT/GB2019/053591, filed Dec. 17, 2019, which claims the priority of United Kingdom Application No. 1900016.5, filed Jan. 2, 2019 and United Kingdom Application No. 1913167.1, filed Sep. 12, 2019, the entire contents of each of which are incorporated herein by reference.

FIELD OF THE DISCLOSURE

The present invention relates to the field of air treatment apparatus. More specifically, it relates to a humidifier and in particular to an evaporative humidifier.

BACKGROUND OF THE DISCLOSURE

A humidifier is an apparatus that increases humidity (moisture) in a single room or an entire house. By regulating moisture levels a humidifier can provide health benefits to those who experience excessively dry skin, sinus infections, allergies from dust, etc. For domestic use, the two most common types of humidifier are ultrasonic humidifiers and evaporative humidifiers.

Ultrasonic humidifiers use a piezoelectric transducer to create a high frequency mechanical oscillation in a small volume of water. This forms an extremely fine mist of water droplets that is usually propelled out of the humidifier by an air flow generated by a fan. These water droplets will contain any impurities that are in the water, including minerals from hard water, and any pathogens present will be dispersed into the air.

Evaporative humidifiers use a wick of a porous material that absorbs water from a reservoir and provides a larger surface area for it to evaporate from. A fan is used to force a flow of air through the pores of wick thereby introducing water vapour into the air flow. In evaporative humidifiers any mineral deposits present in the water will be trapped in the wick. However, the wick can therefore become saturated with mineral deposits over time and can also become mouldy if it is not allowed to dry out completely. Evaporative humidifiers therefore typically require that the wick is regularly cleaned or replaced.

SUMMARY OF THE DISCLOSURE

It is an object of the present invention to provide an air treatment apparatus comprising a humidifier that provides various advantages over conventional domestic humidifiers. In particular, the present invention provides an evaporative humidifier having improved humidification efficiency and improved hygiene whilst also providing that the wick is easier to remove and clean.

According to a first aspect there is provided an air treatment apparatus comprising an air flow generator that is arranged to generate an air flow[[.]], a moisture source that is arranged to introduce water vapour into the air flow, and a water supply system that is arranged to provide water to the moisture source. The water supply system comprises a water tank, a water supply pipe arranged to convey water from the water tank towards the moisture source, a water pump arranged to pump water from the water tank through the water supply pipe, and an ultraviolet light source arranged to irradiate the water passing through the water supply pipe with ultraviolet light. The water supply system further comprises a flow regulator that is arranged to ensure that the flow rate of water through the water supply pipe does not exceed a pre-defined maximum, and wherein the flow regulator comprises a receptacle or flow regulation chamber that is arranged to receive water from the water pump and that is fluidically connected to the water supply pipe. The receptacle comprises a crest or brim that is arranged to allow water to flow of the receptacle. Preferably, the water tank arranged to contain a volume of water within an interior of the water tank. Preferably, in use the water pump is disposed within the water tank. Preferably, the flow regulator is arranged to allow water that exceeds a height of the crest to flow out of the receptacle and back into the water tank.

The receptacle may comprise a restriction that is arranged such that the water received by the receptacle must flow through the restriction before passing over the crest/brim of the receptacle. The restriction may comprise an orifice plate disposed between an inlet of the receptacle and the crest of the receptacle. The orifice plate may comprise a wall or barrier that extends across the receptacle with a restriction orifice formed in the wall or barrier.

An inlet into the receptacle may be provided at a lower end of the receptacle and the crest is provided at an upper end of the receptacle. The inlet of the receptacle may be fluidically connected to an outlet of the water pump. An inlet into the water supply pipe may be provided adjacent to a lower end of the water supply pipe and an outlet from the water supply pipe provided adjacent to an upper end of the water supply pipe. The inlet of the receptacle may be fluidically connected to the inlet of the water supply pipe. The outlet of the water pump may be connected to the inlet of the receptacle and inlet of the receptacle is connected to the inlet of the water supply pipe by a channel.

The crest of the receptacle may be displaced vertically relative to the outlet of the water supply pipe. The crest of the receptacle may be lower than the outlet from the water supply pipe. The crest of the receptacle may be fluidically connected to an overflow spillway such that when water within the receptacle rises above the crest the water flows via the overflow spillway. Preferably, in use the overflow spillway is arranged to convey water from the receptacle into the water tank.

The air treatment apparatus may further comprise a pump controller that is arranged to operate the water pump at a flow rate that ensures a constant flow of water over the crest of the receptacle.

The air treatment apparatus may further comprise a body housing both the air flow generator and the moisture source, and the body may then comprise an air inlet through which the air flow is drawn into the body and an air outlet for emitting the air flow from the body. The water tank may be separable from the body (i.e. can be removed from the remainder of the body). Preferably, the water tank has a separable connection to the body). The air treatment apparatus may further comprise a nozzle mounted on the body over the air outlet, the nozzle being arranged to receive the air flow from the body and to emit the air flow from the air treatment apparatus The water supply pipe may comprise an ultraviolet transparent window provided at an upper end of the water supply pipe. The ultraviolet light source may be arranged to longitudinally irradiate an interior of the water supply pipe through the ultraviolet transparent window. The inlet into the water supply pipe may be provided in a side of the water supply pipe adjacent to a lower end of the water supply pipe and the outlet from the water supply pipe provided in a side of the water supply pipe adjacent to an upper end of the water supply pipe. The lower end of the water supply pipe may be closed and the upper end of the water supply pipe open. The ultraviolet transparent window may then cover the open upper end of the water supply pipe.

The water supply pipe may comprise a tube of an ultraviolet reflective material, and preferably comprises a homogeneous tube of an ultraviolet reflective material. The tube of an ultraviolet reflective material may be integrally formed with an open end and a closed end.

The water supply system may comprise a water tank assembly that is separable from the body, the water tank assembly comprising the water tank, the water pump and a water supply outlet through which water pumped from the water tank is conveyed out of the water tank assembly. The water tank assembly may then comprise the water supply pipe, the flow regulator and the ultraviolet light source. The water supply pipe may be disposed between the water pump and the water supply outlet. The water pump, the water supply pipe and the ultraviolet light source may be separable from the water tank. The water supply system may further comprise a pump housing that contains the water pump and that is arranged to be disposed within the water tank.

The water tank may comprise a tank opening and the air treatment apparatus may then further comprise a removable tank cap or cover that is arranged to fit over and thereby occlude the tank opening. Preferably, the tank opening is provided in an upper surface of the water tank. The removable tank cap may be arranged to be releasably retained on the water tank. The removable tank cap may be provided with the pump housing. The pump housing may project from a lower surface of removable tank cap so that the pump is disposed within the interior of the water tank when the removable tank cap is disposed over the tank opening.

According a second aspect there is provided an ultraviolet disinfection apparatus for disinfecting a supply of water. The ultraviolet disinfection apparatus comprises a water supply pipe arranged to the supply of water, a water pump arranged to pump water from the water tank through the water supply pipe, an ultraviolet light source arranged to irradiate the water passing through the water supply pipe with ultraviolet light, and a flow regulator that is arranged to ensure that the flow rate of water through the water supply pipe does not exceed a pre-defined maximum. The flow regulator comprises a receptacle or flow regulation chamber that is arranged to receive water from the water pump and that is fluidically connected to the water supply pipe, and the receptacle comprises a crest or brim that is arranged to allow water to flow of the receptacle. Preferably, the flow regulator is arranged to allow water that exceeds a height of the crest to flow out of the receptacle and back into the water tank.

The receptacle may comprise a restriction that is arranged such that the water received by the receptacle must flow through the restriction before passing over the crest of the receptacle. The restriction may comprise an orifice plate disposed between an inlet of the receptacle and the crest. The orifice plate may comprise a wall/or barrier that extends across the receptacle with a restriction orifice formed in the wall.

An inlet into the receptacle may be provided at a lower end of the receptacle and the crest provided at an upper end of the receptacle. The inlet of the receptacle may be fluidically connected to an outlet of the water pump. An inlet into the water supply pipe may be provided adjacent to a lower end of the water supply pipe and an outlet from the water supply pipe provided adjacent to an upper end of the water supply pipe. The inlet of the receptacle may be fluidically connected to the inlet of the water supply pipe. The outlet of the water pump may be connected to the inlet of the receptacle and inlet of the receptacle is connected to the inlet of the water supply pipe by a channel.

BRIEF DESCRIPTION OF THE DISCLOSURE

An embodiment of the present invention will now be described, by way of example only, with reference to the accompanying drawings, in which:

FIG. 4 is a sectional front view of the body of the humidifier of FIG. 1;

FIG. 5 is a sectional side view of the body of the humidifier of FIG. 1;

FIG. 9 is a perspective view of the water tank assembly of FIGS. 7 and 8 with the handle in a second configuration;

FIG. 10 is a sectional side view of a pivotal attachment of the handle to the water tank of FIGS. 7 and 8;

FIG. 13 is a perspective view of the water tank assembly with the evaporator assembly located within the water tank of FIGS. 7 and 8;

FIG. 14 is a sectional side view of the water tank assembly with the evaporator assembly located within the water tank of FIGS. 7 and 8;

FIG. 26 is a rear perspective view of the evaporator tray with the body-to-tank connector of the humidifier of FIG. 1;

FIG. 27 is a front perspective view of the evaporator tray with the body-to-tank connector of the humidifier of FIG. 1;

FIG. 46 is a front view of the tank cap of the water tank assembly of FIGS. 43 to 45;

FIG. 47 is a perspective view of the tank cap of FIG. 46;

FIG. 48 is a sectional side view of the tank cap of FIG. 46;

FIG. 49 is a sectional perspective view of the tank cap of FIG. 46;

DETAILED DESCRIPTION OF THE DISCLOSURE

There will now be described an air treatment apparatus that provides various advantages over conventional domestic humidifiers. The air treatment apparatus comprises an air treatment apparatus comprising an air flow generator that is arranged to generate an air flow[[.]], a moisture source that is arranged to introduce water vapour into the air flow, and a water supply system that is arranged to provide water to the moisture source. The supply system comprises a water tank, a water supply pipe arranged to convey water from the water tank towards the moisture source, a water pump arranged to pump water from the water tank through the water supply pipe, and an ultraviolet light source arranged to irradiate the water passing through the water supply pipe with ultraviolet light. The water supply system further comprises a flow regulator that is arranged to ensure that the flow rate of water through the water supply pipe does not exceed a pre-defined maximum, and wherein the flow regulator comprises a receptacle or flow regulation chamber that is arranged to receive water from the water pump and that is fluidically connected to the water supply pipe. The receptacle comprises a crest or brim that is arranged to allow water to flow of the receptacle.

In a preferred embodiment, the air treatment apparatus comprises a body that in use surrounds both the air flow generator and the moisture source. The body then comprises an air inlet through which the air flow is drawn into the body and an air outlet downstream of the moisture source for emitting the air flow from the body. The air treatment apparatus may then further comprise a nozzle mounted on the body over the air outlet, the nozzle being arranged to receive the air flow from the body and to emit the air flow from the air treatment apparatus. In particular, the nozzle may comprise one or more air outlets for emitting the humidified air flow from the nozzle. The term "air outlet" as used herein refers to a portion of the nozzle through which any air flow is intentionally exhausted from the nozzle.

Figure 3:
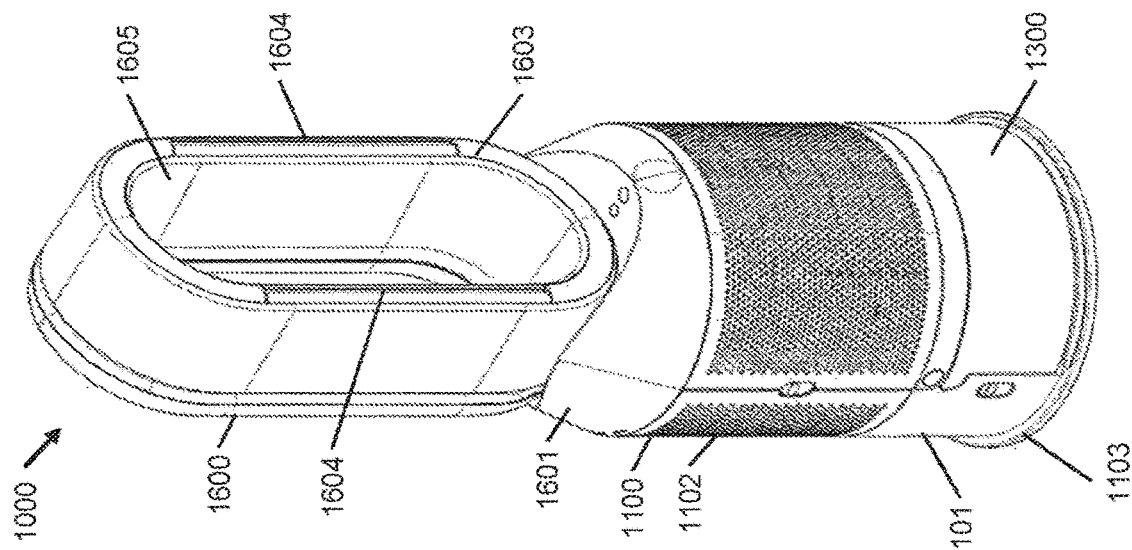
FIG. 3 is a perspective view of the humidifier of FIG. 1.
Figure 2:
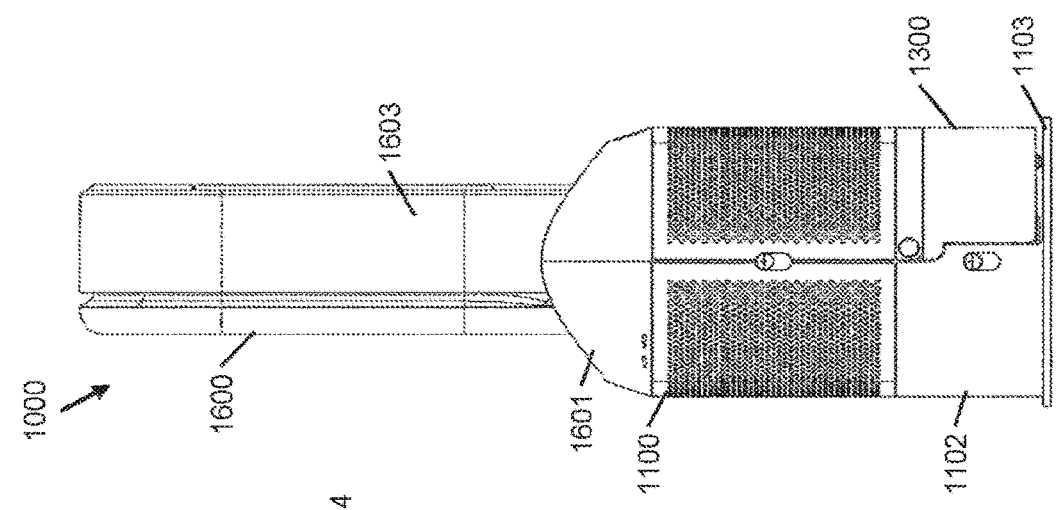
FIG. 2 is a left side view of the humidifier of FIG. 1.
Figure 1:
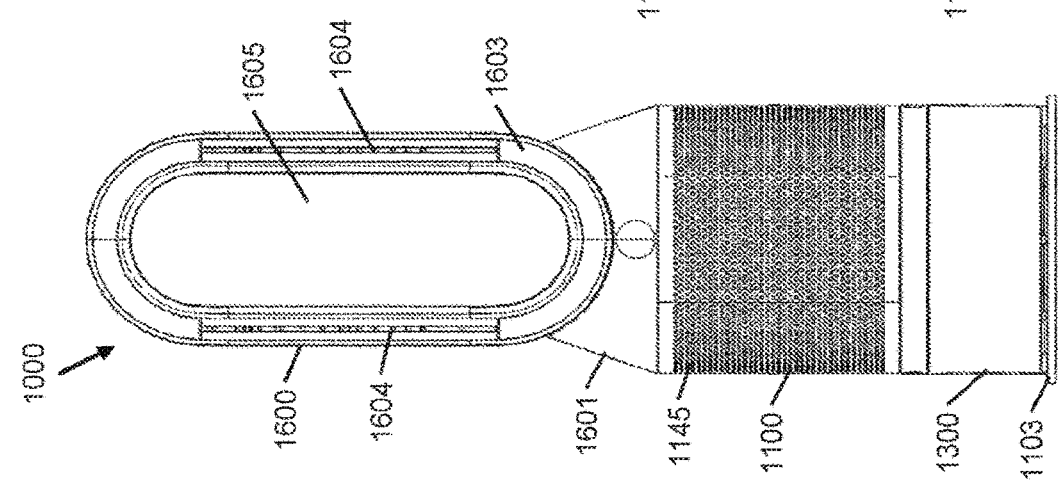
FIG. 1 is a front view of a first example of a humidifier as described herein.

FIGS. 1, 2 and 3 are external views of a first embodiment of a humidifier 1000. FIG. 1 shows a front view of the humidifier 1000, FIG. 2 shows a side view of the humidifier 1000 and FIG. 3 shows a perspective view of the humidifier 1000. The humidifier 1000 comprises a body 1100 containing an air flow generator that is arranged to generate an air flow through the humidifier 1000, a moisture or water vapour source 1200 that is arranged to introduce water vapour into the air flow, a water supply system that is arranged to provide water to the moisture source, and a nozzle 1600 mounted on the body 1100 that is arranged to emit the air flow from the humidifier 1000.

FIG. 4 shows a sectional front view through the body 1100 of the humidifier 1000 and FIG. 5 shows a sectional side view through the body 1100 of the humidifier 1000. In this first embodiment, the moisture source 1200 comprises an evaporator assembly or evaporative wick that is disposed within the air flow through the humidifier 10X). In particular, the evaporator assembly 1200 comprises an arrangement of porous material 1201 that absorbs water supplied to it by the water supply system and provides a large surface area in order to allow the water to evaporate when the air flow passes through the evaporator assembly 1200 thereby introducing water vapour into the air flow.

The water supply system then comprises a water tank assembly 1300, 1400 that has a detachable/separable connection to the body 1100 of the humidifier 1000 and water supply pipework arranged to convey water to the evaporator assembly 1200. The water tank assembly comprises a water tank 1300 and a water pump 1403 that is arranged to be disposed within the water tank 1300 and to move water from the water tank 1300 to evaporator assembly 1200, through the water supply pipework.

Specifically, the water tank 1300 has a tank opening/aperture 1312 through which the water tank 1300 can be filled with water, and a removable tank cap or cover 1400 that is arranged to fit over and thereby occlude the tank opening 1312, with the water pump 1403 being provided on the removable tank cap 1400. In this first embodiment, a first portion of the water supply pipework 1407, 1431 is then disposed within the removable tank cap 1400, whilst a second portion of the water supply pipework is disposed within the body 1100 of the humidifier 1000. The first portion of the water supply pipework 1407, 1431 can therefore be considered to be part of the water tank assembly 1300, 1400.

In this first embodiment, the body 1100 of the humidifier 1000 comprises a substantially cylindrical upper body section 1101 mounted on a substantially cylindrical lower body section 1102. The lower body section 1102 provides a base 1103 upon which the humidifier 1000 rests and a top 1104 that separates the lower body section 1102 from the upper body section 1101. The lower body section 1102 then defines a cavity or chamber 1105 between the base 1103 and the top 1104 within which the water tank 1300 is disposed. Specifically, the lower body section 1102 comprises a side wall 1106 that extends between and connects the base 1103 to the top 1104, with this side wall 1106 defining a side opening 1107 into the cavity 1105 that allows the water tank 1300 to be inserted/pushed into and drawm/pulled out of the cavity 1105. The water tank 1300 can therefore be inserted into and removed from the body 1100 of the humidifier 1000 by sliding the water tank 1300 laterally relative to the body 1100 (i.e. horizontally when the humidifier 1000 is resting upon the base 1103).

The humidifier 1000 is also provided with a tank retaining mechanism 1108, 1301 for releasably retaining the water tank 1300 within the cavity 1105 provided in the lower body section 1102. In the illustrated embodiment, the tank retaining mechanism 1108, 1301 comprises a pair of moveable tank catches 1108 provided by the lower body section 1102, on opposite sides of the side opening 1107 into the cavity 1105, and a pair of tank catch keepers 1301 provided on the water tank 1300, with each of the tank catch keepers 1301 being arranged to be engaged by one of the moveable tank catches 1108 when the water tank 1300 is disposed within the cavity 1105.

Specifically, each of the moveable tank catches 1108 comprise a tank catch member 1108a that is arranged to slide within a corresponding channel defined within the lower body section 1102 between a first position and a second position. The tank catch member 1108a is then provided with a catch surface that is arranged to engage a corresponding tank catch keeper 1301 when the water tank 1300 is located within the cavity 1105 with the tank catch member 1108a in the first positon, and that is arranged to disengage the corresponding tank catch keeper 1301 when the tank catch member 1108a is in the second positon. Each of the moveable tank catches 1108 then further comprises a resilient member 1108b, such as a return/compression spring, that is arranged to bias the tank catch member 1108a into the first position. The tank catch member 1108a is then provided with a tank catch button 1108c (i.e. in the form of a projection and/or a recess provided on the tank catch member 1108a) that is arranged, when operated by the a user, to cause movement of the tank catch member 1108a against the resistance provided by the resilient member so that the tank catch member 1108a can be moved from the first position into the second position thereby releasing the water tank 1300 from the tank retaining mechanism 1108, 1301. Each of the tank catch buttons are located within a corresponding button opening formed in the lower body section 1102. Each of the tank catch keepers 1301 then comprise a projection that extends from the water tank 1300 and that is provided with a cam surface that is arranged to engage the corresponding catch surface as the tank 1300 is inserted into the cavity 1105 and thereby cause movement of the tank catch member 1108a from the first position into the second position against the resistance provided by the resilient member 1108b.

Figure 6:
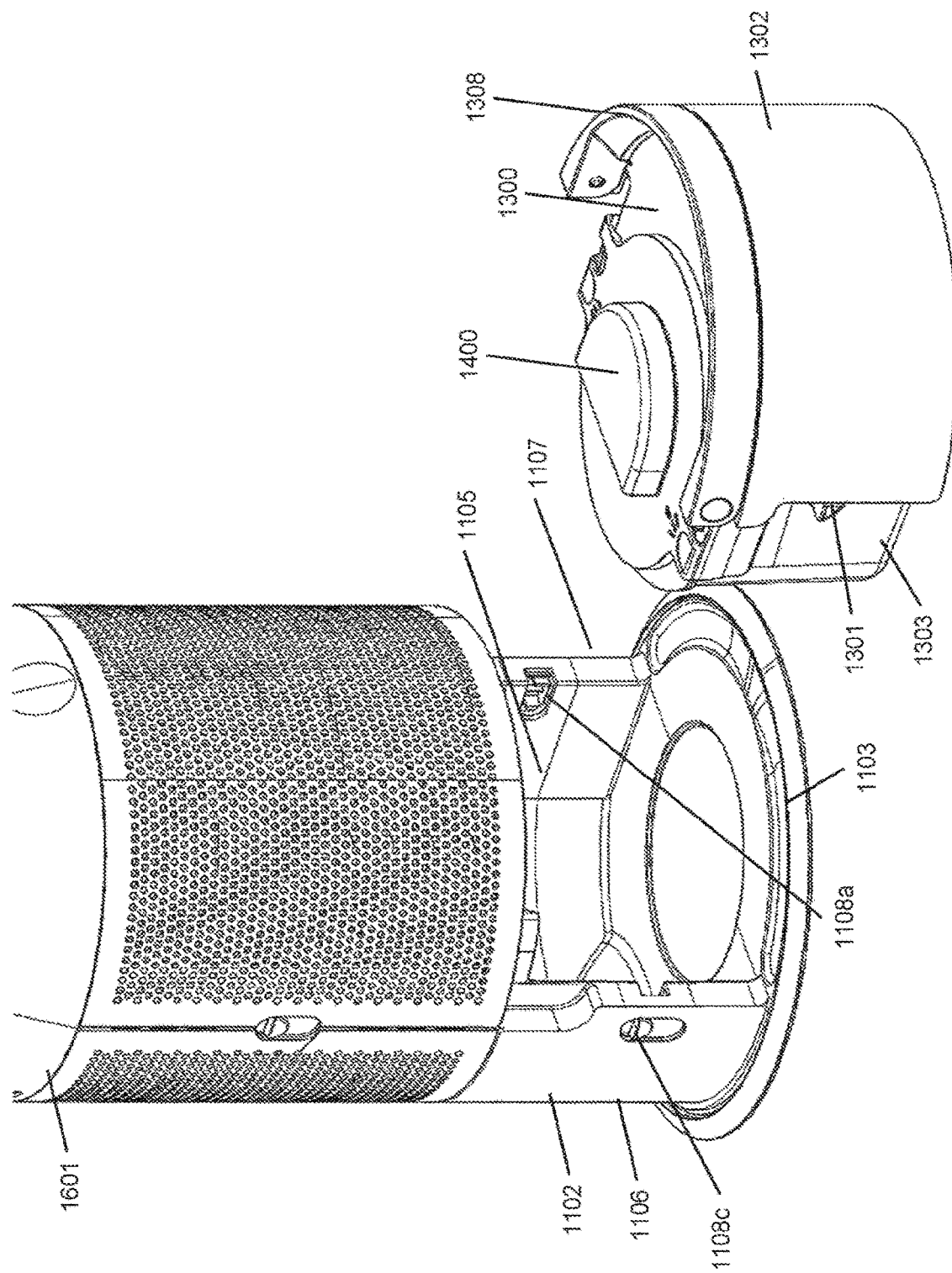
FIG. 6 is a perspective view of the body the humidifier of FIG. 1 with the water tank assembly separated from the body.

FIG. 6 shows a perspective view of the body 1100 the humidifier 1000 with the water tank 1300 separated from the body 1100. In the illustrated embodiment, the lower body section 1102 of the humidifier 1000 is generally cylindrical in shape. Specifically, both the base 1103 and top 1104 of the lower body section 1102 are generally circular in shape, with the side wall 1106 of the lower body section 1102 then extending partially around the circumference/periphery of the base 1103 and top 1104 of the lower body section 1102. The side wall 1106 of the lower body section 1102 is therefore generally arcuate in shape, and preferably semi-cylindrical, with the opposing ends of the arcuate side wall 1106 then defining the side opening 1107 into the cavity 1105. The moveable tank catches 1108 are then provided within the side wall 1106, adjacent to the ends of the side wall 1106.

The water tank 1300 is then arranged to be disposed within the cavity 1105 defined by the lower body section 1102. In particular, the water tank 1300 is arranged to be inserted into and removed from the cavity 1105 by moving/sliding the water tank 1300 laterally relative to the body 1100 through the side opening 1107 into the cavity 1105. The water tank 1300 therefore comprises a front portion 1302 that is arranged to be adjacent to the side opening 1107 when the water tank 1300 is disposed within the cavity 1105 and a rear portion 1303 that is arranged to be adjacent to the rear of the cavity 1105. The width of the rear portion 1303 is less than that of the front portion 1302 so that the rear portion 1303 can be inserted into the cavity 1105 whilst the front portion 1302 fills the side opening 1107. The water tank 1300 is then shaped to substantially correspond to the shape of the cavity 1105 in order to optimise the use of the space provided by cavity 1105 and thereby maximise the capacity of the water tank 1300. Specifically, the water tank 1300 has a front wall 1304 that is arranged to be substantially flush/level with the edges of the side opening 1107 when the water tank 1300 is disposed within the cavity 1105. An opposing rear wall 1305 of the water tank 1300 is then shaped to generally correspond with the rear/inner surface of the cavity 1105 that faces the side opening 1107, whilst the side walls 1306 of the water tank 1300 are shaped to generally correspond with the inner surfaces of the cavity 1105 that are adjacent to the edges of the opening 1107

Figure 7:
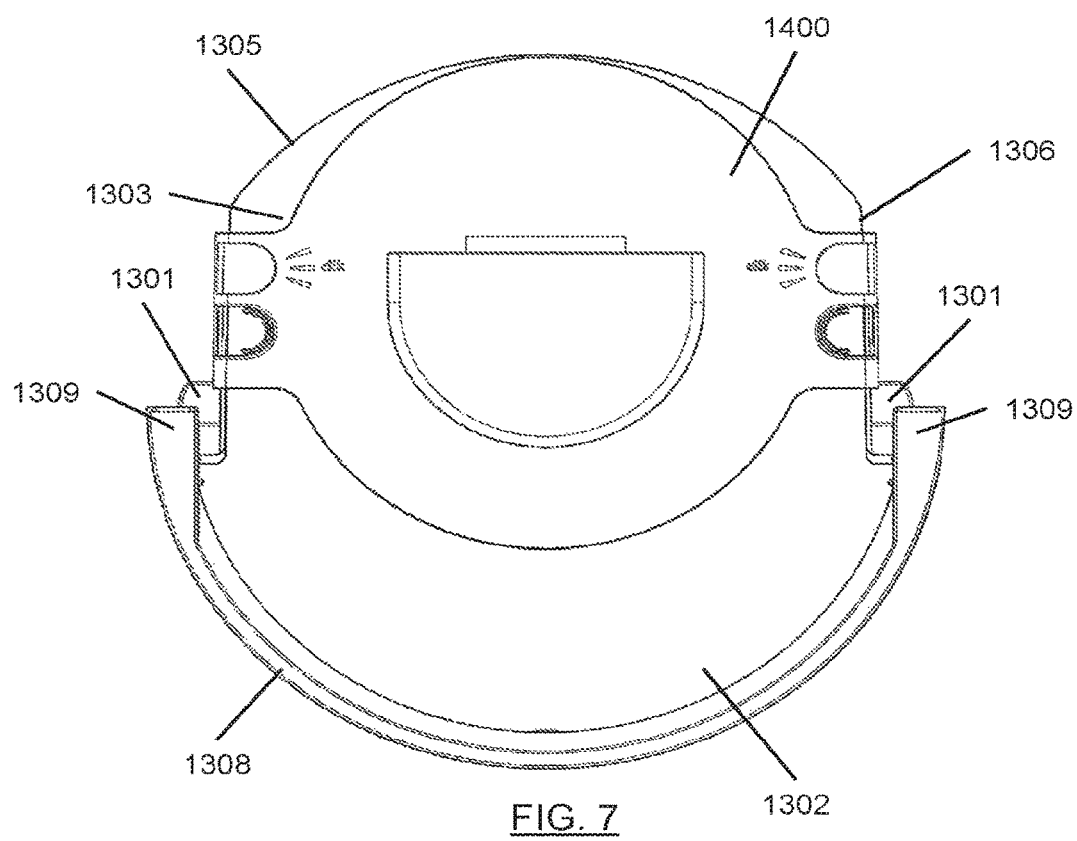
FIG. 7 is a top view of the water tank assembly of the humidifier of FIG. 1.
Figure 8:
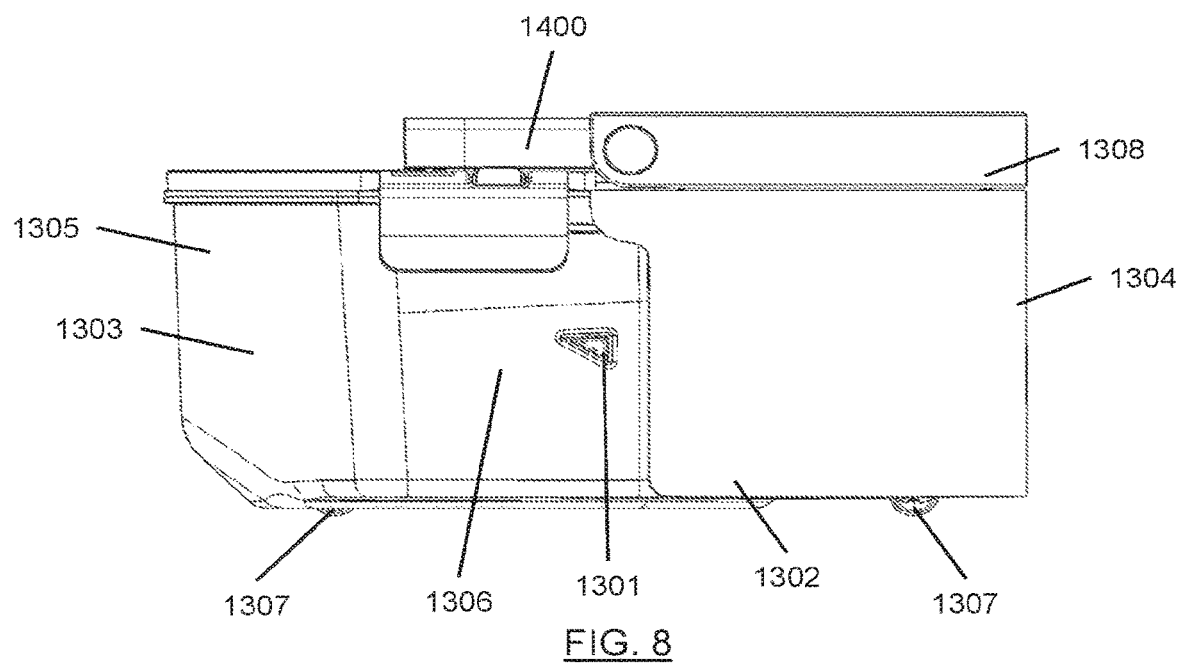
FIG. 8 is a side view of the water tank assembly of the humidifier of FIG. 1.

FIG. 7 show a top view of the water tank 1300, and FIG. 8 shows left side view of the water tank 1300. In the illustrated embodiment, the water tank 1300 has an arcuate front wall 1304 that has substantially the same radius as the outer surface of the arcuate side wall 1106 of the lower body section 1102 (and the base 1103 and top 1104 of the lower body section 1102) so that the front wall 1304 of the water tank 1300 is flush/level with the edges of the side opening 1107 when the water tank 1300 is disposed within the cavity 1105. The lower portion of the humidifier 1000 therefore has a cylindrical appearance when the water tank 1300 disposed within the body 1100. The water tank 1300 also has an arcuate rear wall 1305 that has a radius that is approximately the same as that of the rear surface of the cavity 1105 so that the rear wall 1305 of the water tank 1300 is proximate with/adjacent to the rear surface of the cavity 1105 when the water tank 1300 is disposed within the cavity 1105. In the illustrated embodiment, the lower edge of the rear wall 1305 of the water tank 1300 is also partially chamfered/sloped to avoid catching on the base 1103 of the lower body section 1102 (i.e. the lower edge of the side opening 1107) when sliding the water tank 1300 into the cavity 1105. The side walls 1306 are then planar and parallel to one another in order to allow the tank 1300 to slide laterally through the side opening 1107 whilst being proximate with/adjacent to the sides of the cavity 1105 (i.e. those portions of the inner surface of the side wall 1106 that are adjacent to the end of the side wall 1106 that define the cavity 1105).

The water tank 1300 is also provided with a plurality of wheels or rollers 1307 that are disposed on the lower surface of the water tank 1300 and that are each arranged to rotate about an axis that is perpendicular to a line that bisects the front and rear of the water tank 1300. These wheels 1307 therefore can assist a user when sliding the water tank 1300 into the cavity 1105 by allowing the water tank 1300 to roll along a surface adjacent to the body 1100 of the humidifier 1000, onto the base 1103 of the lower body section 1102 and into the cavity 1105. In the illustrated embodiment, the lower surface of the water tank 1300 is provided with three wheels 1307. Two of these wheels 1307 are disposed symmetrically toward the rear of the water tank 1300 whilst the third of these wheels 1307 is disposed towards the front of the water tank 1300.

The water tank 1300 is then also provided with a tank handle 1308 that is arranged to be held by the user when lifting the water tank 1300. The tank handle 1308 is pivotally attached to the water tank 1300 and is arranged to rotate between a first configuration in which the tank handle 1308 is stowed adjacent to the upper surface of the water tank 1300 and a second configuration in which the tank handle 1308 projects away from the upper surface of the water tank 1300 so that the handle 1308 can be gripped by a user. Specifically, the tank handle 1308 is bent (i.e. angled or curved) with both ends of the tank handle 1308 being pivotally attached to opposite sides of the upper surface of the water tank 1300. The tank handle 1308 can then rotate between a first configuration in which the tank handle 1308 is flush with/abuts against the upper surface of the water tank 1300 and a second configuration in which the tank handle 1308 projects perpendicularly relative to upper surface of the water tank 1300. FIG. 9 therefore shows a perspective view of the water tank 1300 with the handle 1308 in the second configuration. In the illustrated embodiment, the tank handle 1308 is arcuate and has substantially the same radius as the front wall 1304 of the water tank 1300 (and the arcuate side wall 1106 of the lower body 1102). The pivotal attachment of the tank handle 1308 to the water tank 1300 is then arranged to allow the tank handle 1308 to rotate towards the front of the water tank 1300 so that when the tank handle 1308 is stowed the tank handle 1308 is flush/level with the front wall 1304 of the water tank 1300. The lower body section 1102 is then arranged so that the tank handle 1308 is located within the side opening 1107 when the water tank 1308 is disposed within the cavity 1105 such that the tank handle 1308 is also flush/level with the edges of the side opening 1107.

The pivotal attachment of the tank handle 1308 to the water tank 1300 is also arranged such that, when the tank handle 1308 is in the second configuration and the water tank 1300 is being lifted by the tank handle 1308, the water tank 1300 is prevented from rotating. FIG. 10 therefore shows a sectional side view of a pivotal attachment of the handle 1308 to the water tank 1300. In the illustrated embodiment, each end of the tank handle 1308 is provided with a projection or pintle 1310 that projects perpendicularly from the end of the tank handle 1308. The water tank 1300 is then provided with two arms 1309 that extend upwards from opposite sides of the upper surface of the water tank 1300, with each arm 1309 then being provided with a socket or gudgeon 1311 that is arranged to fit over one of the projections 1308. The projections 1310 and the sockets 1311 are generally shaped so that the projections 1310 can rotate within the sockets 1311. However, each socket 1311 is also provided with a recessed portion that is arranged to receive the projection 1310 when the tank handle 1308 projects perpendicularly relative to upper surface of the water tank 1300 and such that the projection 1310 is prevented from rotating relative to the socket 1311 when the projection 1310 is within the recess.

Figure 12:
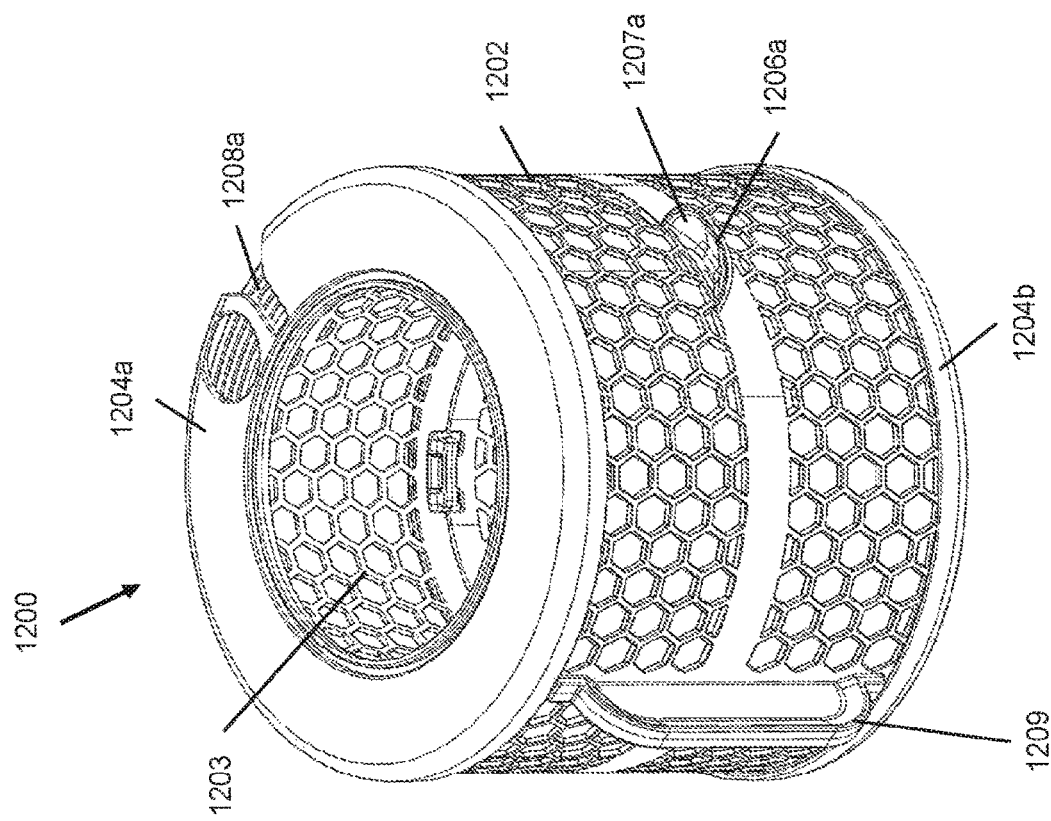
FIG. 12 is a perspective view of the evaporator assembly of the humidifier of FIG. 1.

The tank opening or aperture 1312 is then provided on an upper surface of the water tank 1300. As will be described in more detail below, the tank opening 1312 is sufficiently large to allow the evaporator assembly 1200 to be inserted into the water tank 1300, with the water tank 1300 also being sufficiently deep to allow the evaporator assembly 1200 to be fully contained within the water tank 1300 when inserted through the tank opening 1312. FIG. 12 therefore shows a perspective view of the evaporator assembly 1200, whilst FIGS. 13 and 14 then show the evaporator assembly 1200 located within the water tank 1200. In the illustrated embodiment, the tank opening 1312 is circular and is relatively large, having a diameter of approximately 180 mm.

Figure 11:
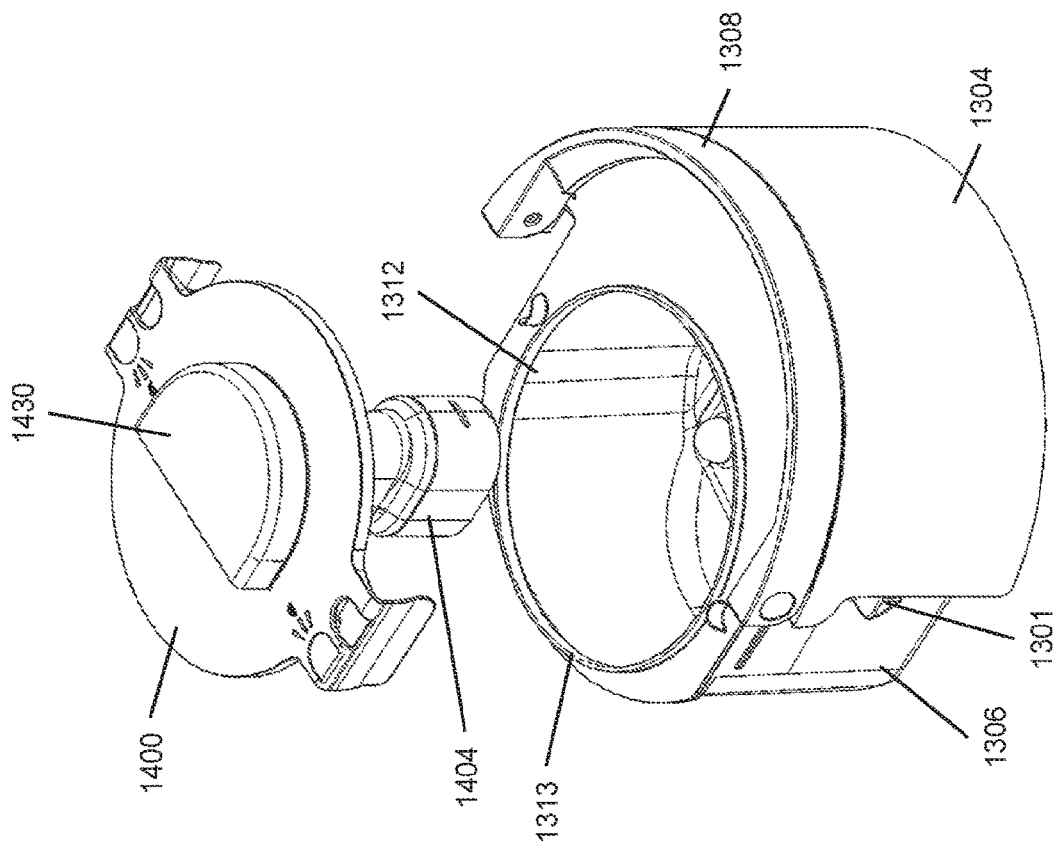
FIG. 11 is a perspective view of the water tank assembly of FIGS. 7 and 8 with the tank cap assembly separated from the water tank.
Figure 15:
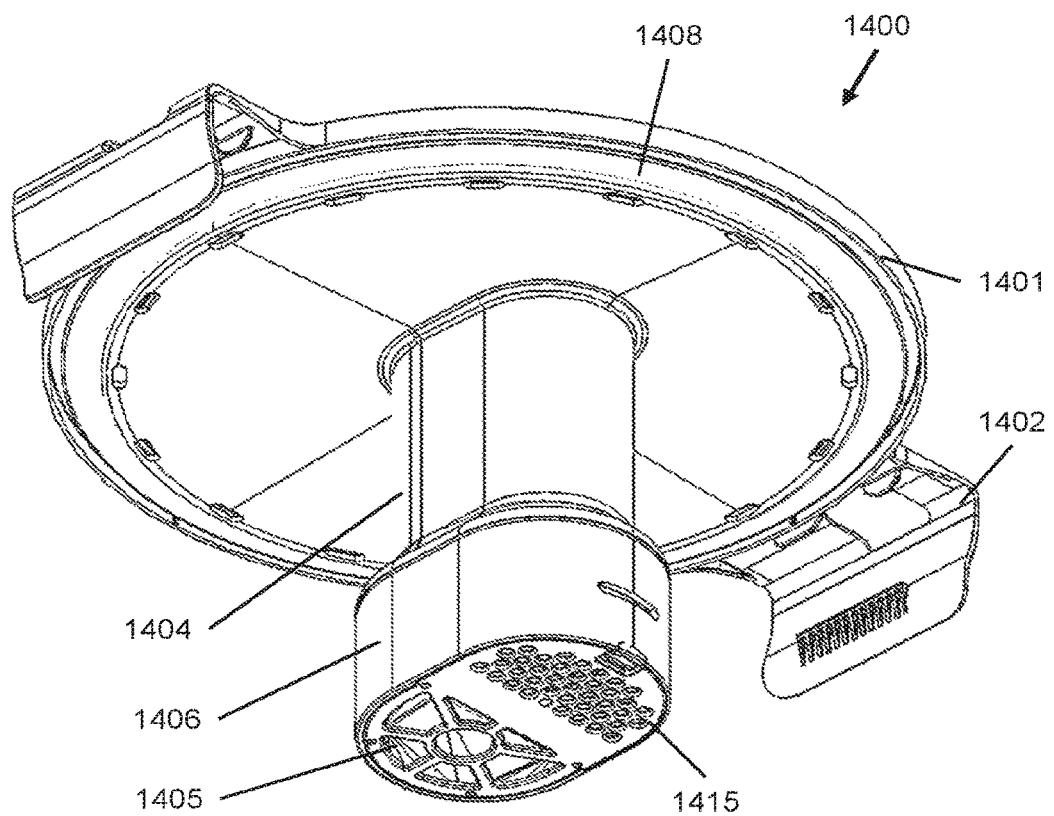
FIG. 15 is a perspective view of the tank cap assembly of the water tank assembly of FIGS. 7 and 8.
Figure 16:
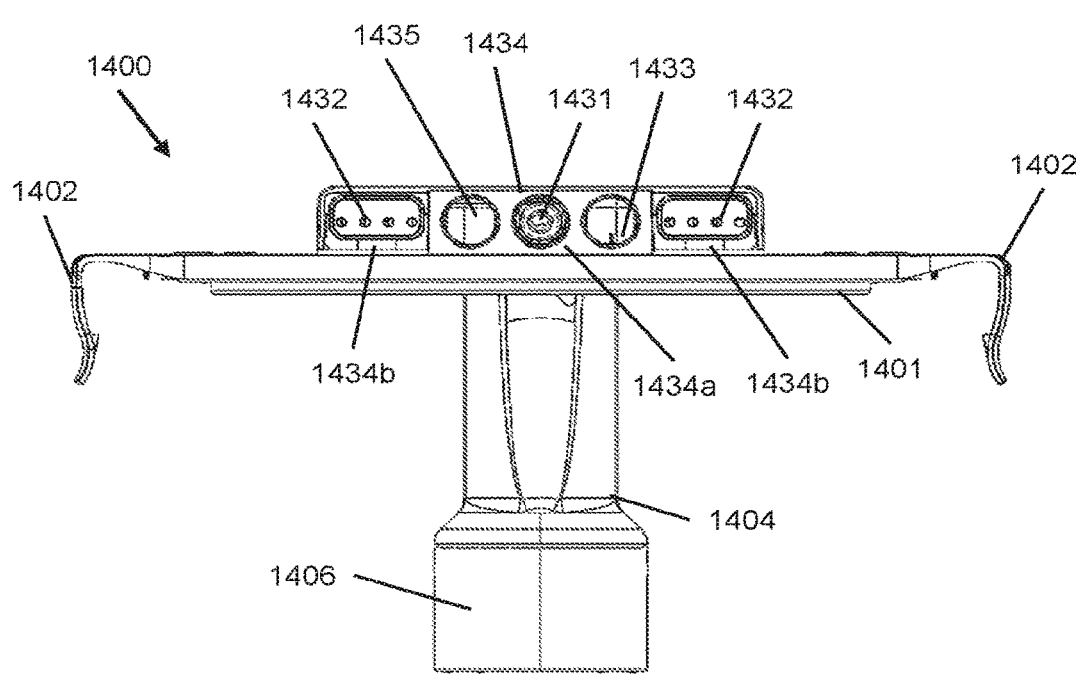
FIG. 16 is a rear view of the tank cap assembly of FIG. 15.

As described above, the water tank 1300 is provided with a tank cap or cover 1400 that is arranged to fit over and thereby occlude the tank opening 1312. The tank cap 1400 is releasably retained on the water tank 1300 so that the tank cap 1400 can be removed to allow the supply of water in the water tank 1300 to be replenished. FIG. 11 shows a perspective view of the water tank 1300 with the tank cap 1400 separated from the water tank 1300, whilst FIG. 15 shows a perspective view of the tank cap 1400 and FIG. 16 shows a rear view of the tank cap 1400. In the illustrated embodiment, the tank cap 1400 comprises a lid portion that is generally circular in shape with a rim 1401 that projects downwardly from the periphery of the lid portion. The rim 1401 is arranged to fit closely around the outside of a corresponding rim 1313 that projects upwardly from the periphery of the tank opening 1312 to thereby locate and align the tank cap 1400 over the opening 1312. The tank cap 1400 is releasably retained on the water tank 1300 by retention arms 1402 that extend over the upper edges of the side walls 1306, and which thereby align the tank cap 1400 on the water tank 1300, with the distal end of each of the retention arms 1402 being resilient and provided with a ledge that is arranged to clip over a corresponding ridge provided on the outer surface of the side walls 1306 of the water tank 1300.

The tank cap 1400 is also provided with a tank cap sealing element 1408 that is arranged to form a seal against the water tank 1300 when the tank cap 1400 is disposed on the water tank 1300 and thereby prevent the leakage of air through the tank opening 1312 into the water tank 1300. In the illustrated embodiment, the tank cap sealing element 1408 is provided by an annular flap seal formed from a resilient material, such as a rubber, and is arranged to project radially outward on the underside of the tank cap 1400, beneath the lid portion, so that the tank cap sealing element 1408 contacts and forms a seal against a radially inward facing surface of the upward rim 1313 provided around the periphery of the tank opening 1312.

Figure 17:
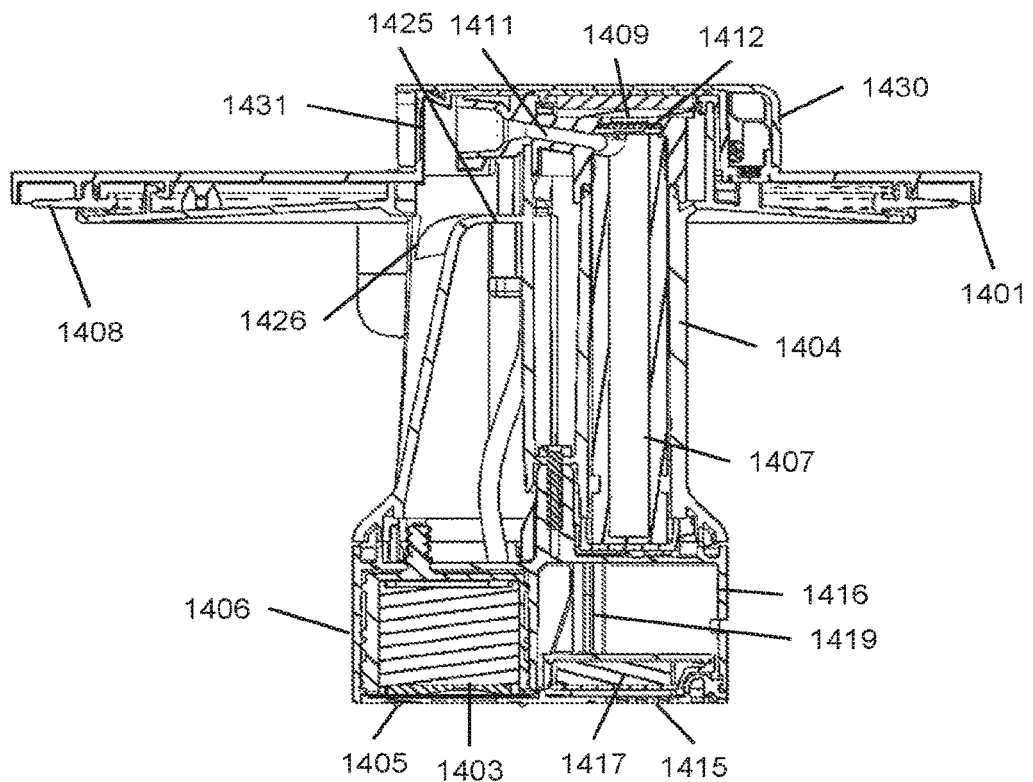
FIG. 17 is a sectional side view of the tank cap assembly of FIG. 15.
Figure 18:
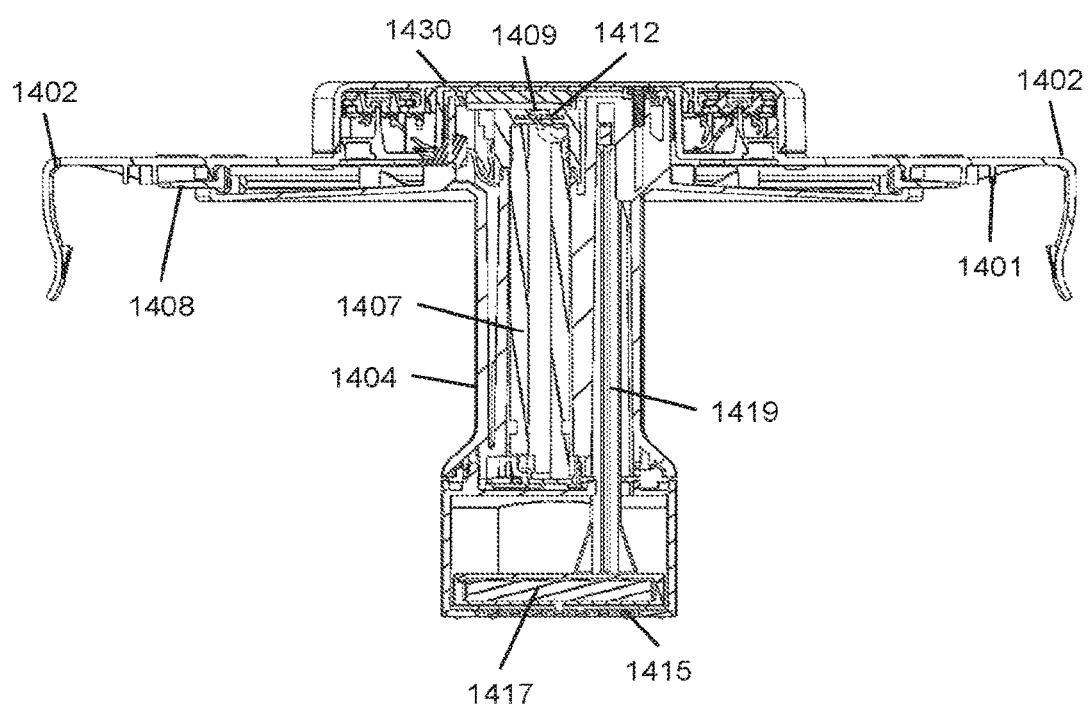
FIG. 18 is a sectional rear view of the tank cap assembly of FIG. 15.
Figure 19:
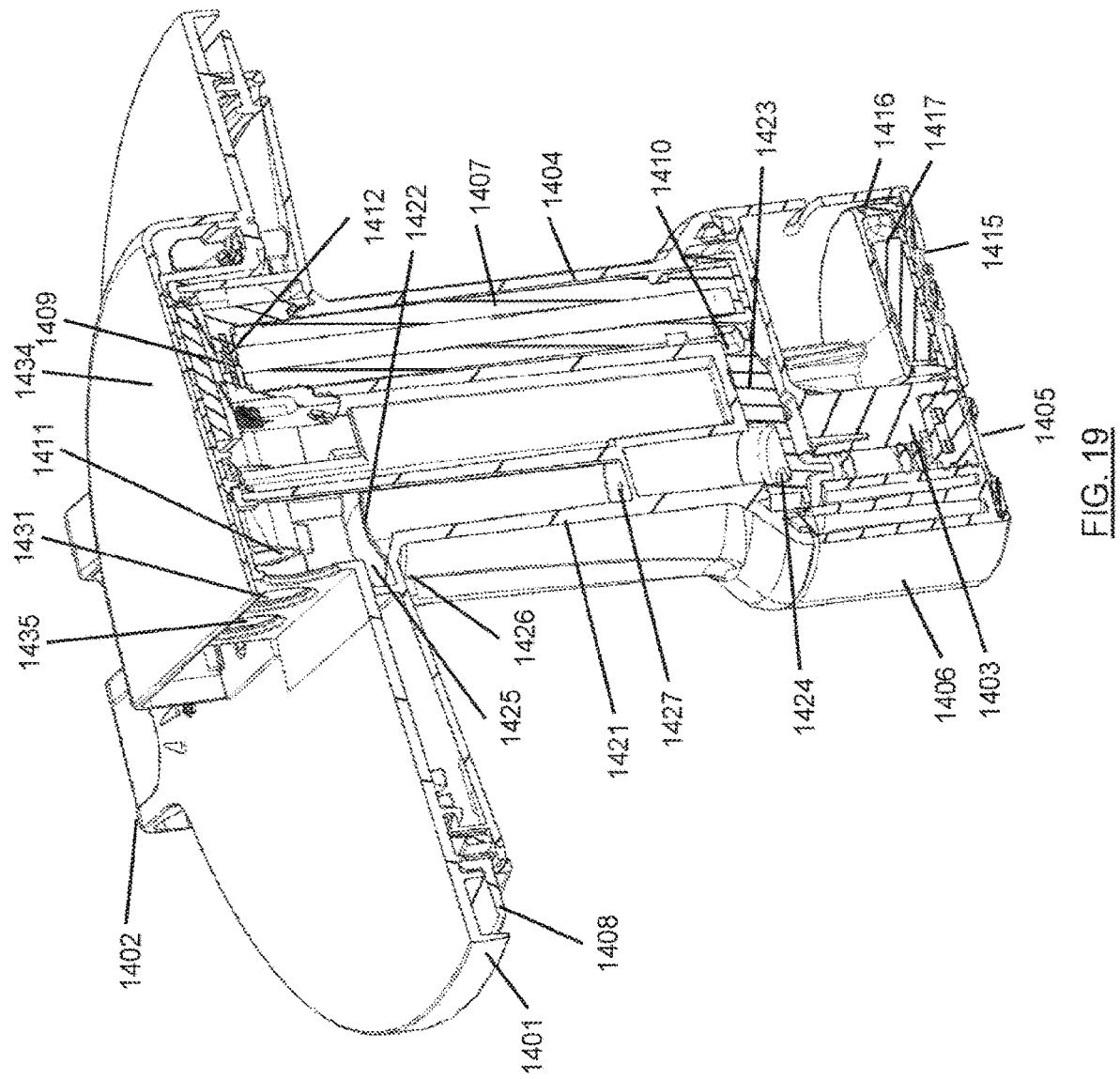
FIG. 19 is a sectional perspective view of the tank cap assembly of FIG. 15.
Figure 20:
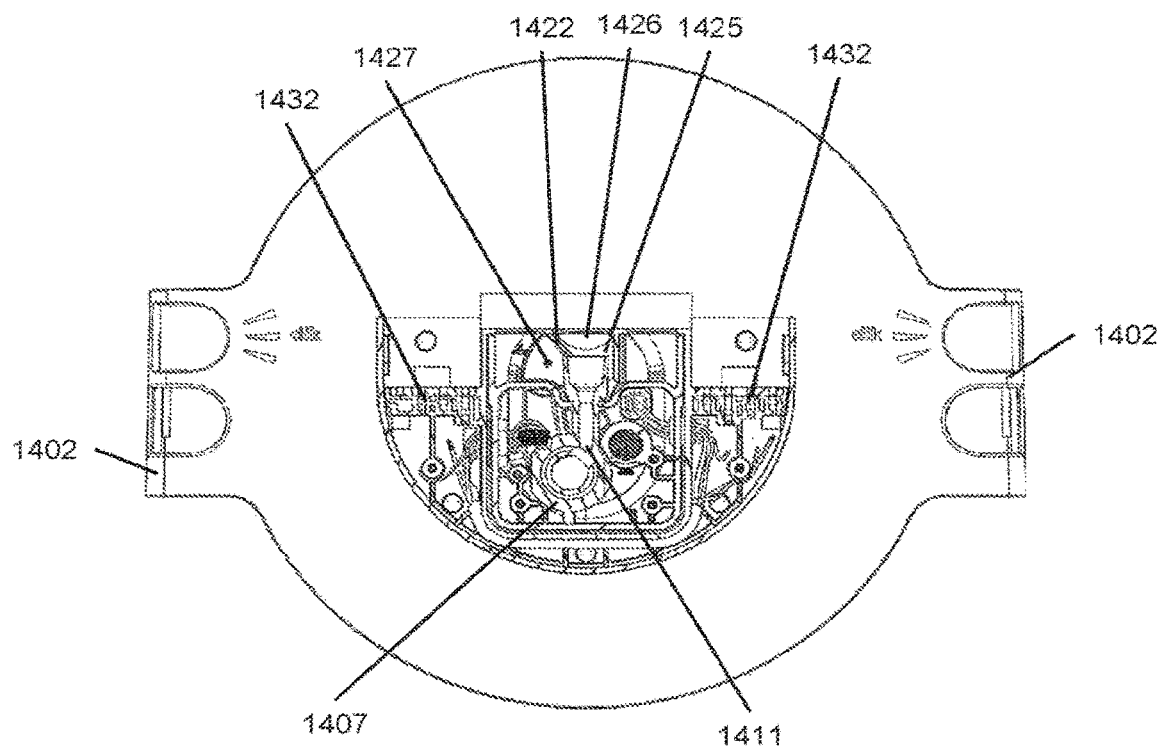
FIG. 20 is a sectional top view of the tank cap assembly of FIG. 15.
Figure 21:
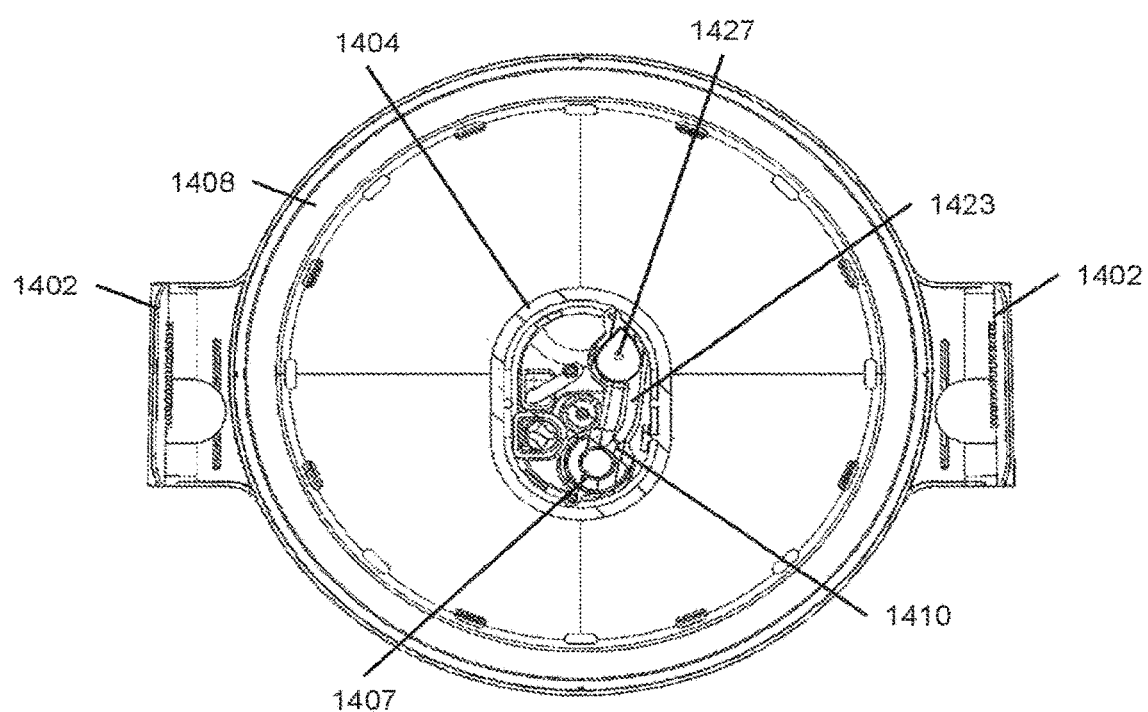
FIG. 21 is a sectional bottom view of the tank cap assembly of FIG. 15.
Figure 22:
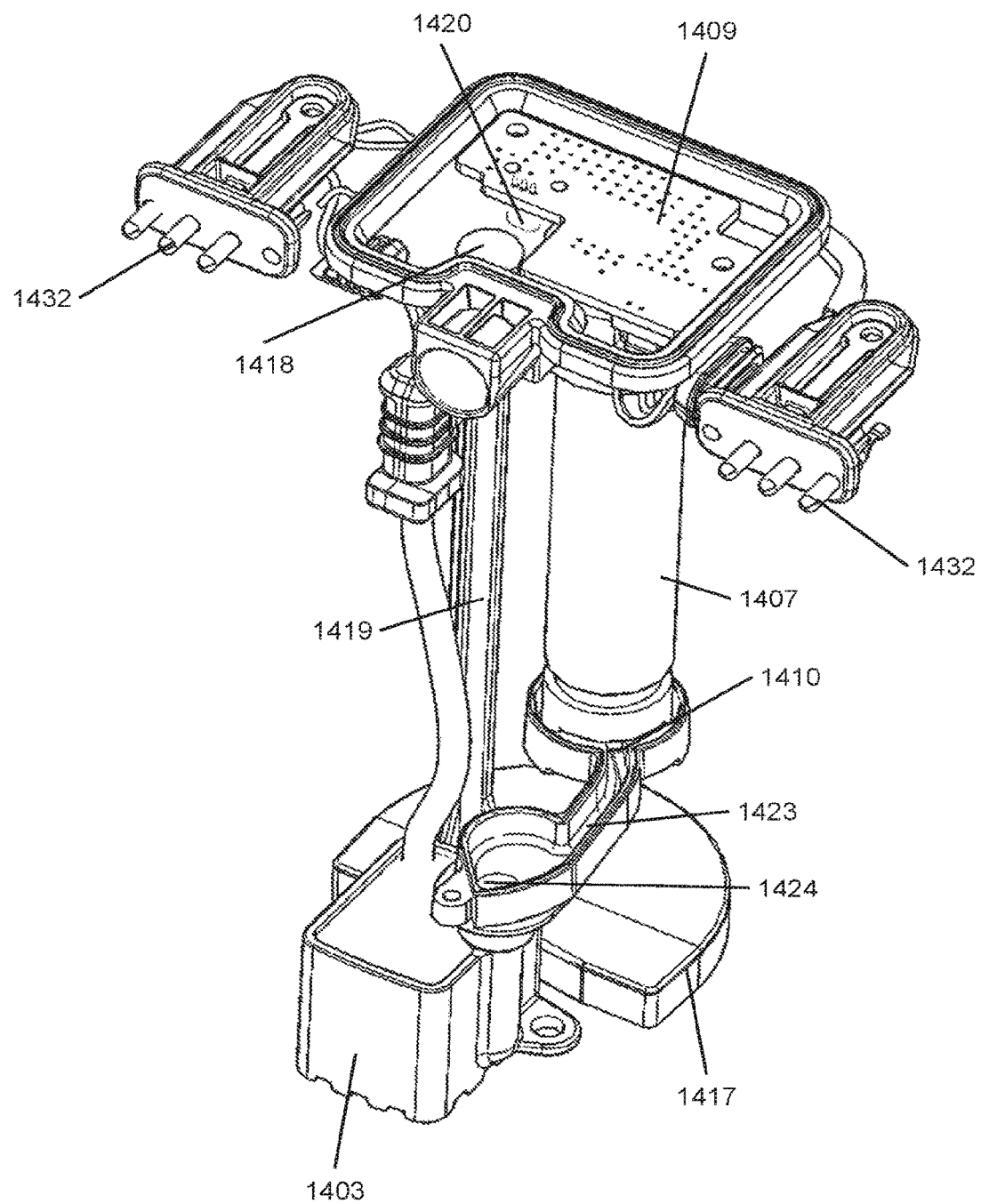
FIG. 22 is a perspective view of the pump system of the tank cap assembly of FIG. 15.

The tank cap 1400 then provides a pump 1403 that is arranged to pump water from within the water tank 1300 and through the water supply pipework to the evaporator assembly 1200. FIG. 17 shows a sectional side view of the tank cap 1400, FIG. 18 shows a sectional rear view of the tank cap 1400, FIG. 19 shows a sectional perspective view of the tank cap 1400, FIG. 20 shows a sectional top view of the tank cap 1400, and FIG. 21 shows a sectional bottom view of the tank cap 1400. FIG. 22 then shows a perspective view of the water supply system of the tank cap 1400. In the illustrated embodiment, the tank cap 1400 further comprises a column 1404 that projects downwardly from the tank cap 1400 (i.e. beneath the lid portion) such that, when the tank cap 1400 is located on the water tank 1300, the column 1404 extends into the interior of the water tank 1300 with the bottom of the column 1404 adjacent to the bottom of the water tank 1300. The bottom of the column 1404 is then provided with a pump housing inlet 1405 that allows water to enter a pump housing portion 1406 of the column 1404, with the pump 1403 then being provided within the pump housing 1406 at the bottom of the column 1404, immediately above the pump housing inlet 1405. An outgoing water supply pipe 1407 is then arranged to convey water from the pump 1403 to a water supply outlet 1431 provided at the top of the tank cap 1400.

The column 1404 also contains an ultraviolet (UV) disinfection system that is arranged to irradiate the water with UV light as it is pumped from the water tank 1300 to the body 1100 of the humidifier 1000. The UV disinfection system comprises a UV light source 1409 arranged to irradiate the water passing through the outgoing water supply pipe 1407. Specifically, the UV light source 1409 is arranged to irradiate the water passing through the outgoing water supply pipe 1407 with short-wavelength UVC light (i.e. 100 to 280 nm). The outgoing water supply pipe 1407 is then arranged such that the inner surface is capable of reflecting the UV light generated by the UV light source 1409.

The outgoing water supply pipe 1407 comprises a tube of material that is capable of reflecting the UVC light, such as polytetrafluoroethylene (PTFE), with a lateral water inlet 1410 provided adjacent to a lower end of the tube and a lateral water outlet 1411 provided adjacent to an upper end. In the illustrated embodiment, the lateral water outlet 1411 comprises an aperture formed in the side of the tube at the upper end and a channel that extends away from the aperture in a direction that is tangential relative to the hollow centre of the tube of ultraviolet reflective material (i.e. in a direction that is tangential to an inner surface of the tube). In this regard, the term "tangentially" is used herein to describe the water outlet 1411 as being arranged such that the water flowing through the water outlet 1411 flows in a direction that is tangential to the inner surface of the tube. The UV light source 1409 then comprises a single UV LED disposed at the upper end of the tube that is arranged to longitudinally irradiate the interior of the tube through an upper UV transparent window 1412 (e.g. quartz glass) provided at the upper end of the tube. The tangential arrangement of the water outlet 1411 ensures that the flow of water out of the tube creates a vortex within the tube which prevents bubbles from forming on the upper UV transparent window 1412 and thereby improves the performance of the disinfection system. In addition, the creation of a vortex within the tube ensures that the cleaning cycle removes mineral deposits from the UV transparent window 1412.

By longitudinally irradiating the interior of a tube having a high UV reflectance, the UV disinfection system can make use of a single UVC LED as a UV source and still achieve high levels disinfection.

The column 1404 also contains a tank water level sensor arranged to detect when the level of the water in the water tank 1300 exceeds a predefined threshold. For example, the tank water level sensor arranged to detect when the level of the water in the water tank 1300 is above or below a predefined minimum level. Specifically, the bottom of the column 1404 is provided with a float housing inlet 1415 that allows water to enter a float housing portion 1416 of the column 1404, with a float 1417 then being provided within the float housing 1416 at the bottom of the column 1404, immediately above the float housing inlet 1415. The float 1417 is then provided with a magnet 1418, which is attached to the distal end of an arm 1419 that extends from the float 1417, and that is arranged such that the magnet 1418 is disposed adjacent to a magnetic sensor 1420, such as a unipolar Hall Effect sensor, that detects the position of the magnet 1418 relative to the magnetic sensor 1420 and thereby detects a change in the position of the float 1417.

In the illustrated embodiment, the magnet 1418 is arranged such the magnetic axis of the magnet 1418 is substantially parallel to the direction of movement of the float 1417 (i.e. vertically) and such that the magnet 1417 is beside the magnetic sensor 1420 (i.e. so that the magnetic sensor 1420 is lateral relative to the magnet axis of the magnet 1418). The tank water level sensor is therefore arranged such movement of the float 1417 as the level of water in the water tank 1300 changes causes the magnet 1418 to move in the direction of the magnetic axis across/passed the magnetic sensor 1420, rather than towards or away from the magnetic sensor 1420, such that the magnetic sensor 1420 detects a change in polarity of the magnetic field produced by the magnet 1418. For example, the water level sensor can be arranged such that the magnetic sensor 1420 detects the north pole of the magnet 1418 when the float 1417 is floating at the top of the float housing 1416 and detects the south pole of the magnet 1418 when the float 1417 drops to the bottom of the float housing 1416. This arrangement improves the accuracy of the water level sensor.

The column 1404 also contains a flow regulator of the pump system that is arranged to ensure that the flow rate of water through the UV disinfection system does not exceed a pre-defined maximum, thereby ensuring that a minimum level of disinfection of the water flowing through the outgoing water supply pipe 1407 is maintained. Specifically, the flow regulator is provided by a receptacle 1421 that is arranged to receive water from the pump 1403 and that is fluidically connected to the inlet 1410 provided at the lower end of the water supply pipe 1407. The upper end of the receptacle 1421 is then provided with a crest/brim 1422 that allows excess water to flow out of the receptacle 1421 and back into the water tank 1300, such that the receptacle 1421 can be considered to act as a weir. The receptacle 1421 then further comprises a restriction 1427, with this restriction 1427 being arranged such that the water received by the receptacle 1421 must flow through the restriction 1427 before passing over the crest/brim 1422 of the receptacle 1421. By configuring the water pump 1403 to operate at a flow rate that ensures a constant flow of water over the weir provided by the flow regulator, the flow rate of the water received by the outgoing water supply pipe 1407 is then regulated by a combination of the height of the crest/brim 1422 of the receptacle 1421 and the size of the restriction 1427. Specifically, any fluctuations in the flow rate of the water received from the water pump 1403 (e.g. due to a reduction in the height of the water in the tank 1300, fluctuations in the performance of the water pump 1403 etc.) are then consumed by fluctuations in the volume of water flowing over the weir provided by the flow regulator such that the flow rate of the water received by the outgoing water supply pipe 1407 remains substantially constant.

In the illustrated embodiment, the receptacle 1421 comprises a flow regulation chamber provided within the column 1404 that is connected to the inlet 1410 provided at the lower end of the outgoing water supply pipe 1407 by a channel or manifold 1423 that extends from the lower end of the chamber. The outlet of the pump 1403 is then connected to an inlet 1424 provided at the bottom of the flow regulation chamber, whilst the crest/brim 1422 comprises an outlet provided at the top of the flow regulation chamber through which water exits the flow regulation chamber into a tank water return tray 1425 provided towards the top of the column 1404. The crest/brim 1422 is then displaced vertically relative to the outlet 1411 of the outgoing water supply pipe 1407 (i.e. when the tank cap 1400 is disposed on the water tank 1300). In particular, the crest/brim 1422 of the receptacle 1421 is lower than the outlet 1411 of the outgoing water supply pipe 1407. The restriction 1427 then comprises an orifice plate disposed between the inlet of the flow regulation chamber and the crest/brim, with the orifice plate comprising a wall/barrier that extends across the flow regulation chamber with a restriction orifice formed in the wall/barrier. The tank water return tray 1425 is then provided with a drain 1426 through which water can flow back into the water tank 1300 via an overflow spillway.

The top of the tank cap 1400 is then provided with a tank-to-body connector 1430 that is arranged to connect to a corresponding body-to-tank connector 1120 provided on the body 1100 of the humidifier 1000 and through which water pumped from the water tank 1300 is conveyed out of the tank cap 1400 to the body 1100 of the humidifier 1000. The tank-to-body connector 1430 is arranged to be substantially parallel with the direction in which the water tank 1300 is arranged to be inserted into the cavity 1105 (i.e. laterally relative to the body 1100), and is directed/faces towards the rear of the water tank 1300, so that the tank-to-body connector 1430 mates and/or connects with the corresponding body-to-tank connector 1120 provided on the body 1100 of the humidifier 1000 during insertion of the water tank 1300 into the body 1100.

The tank-to-body connector 1430 comprises a water supply outlet 1431 through which water pumped from the water tank 1300 is conveyed out of the tank cap 1400 and that is arranged to supply water to a water supply inlet 1121 provided on the body-to-tank connector 1120. The tank-to-body connector 1430 also comprises electrical connectors 1432 for receiving electrical power from the body 1100 of the humidifier 1000 and for communicating with control circuitry 1111 provided in the body 110X of the humidifier 1000. The electrical connectors 1432 provided by the tank-to-body connector 1430 are therefore arranged to contact/engage with corresponding electrical connectors 1122 provided by the body-to-tank connector 1120. The tank-to-body connector 1430 further comprises a water return inlet 1433 through which water can return through the tank cap 1400 to the water tank 1300 and that is arranged to receive excess water from a water return outlet 1123 provided on the body-to-tank connector 1120. The tank-to-body connector 1430 can also be arranged to receive a supply of air from the body 1100 of the humidifier 1000 and to convey this supply of air into the water tank 1300. As will be described below, providing the water tank 1300 with a supply of air from the body 1100 of the humidifier 1000 allows the pressure of the air within the water tank 1300 to be equalised with that within the body 110X of the humidifier 1000 and thereby allows the tank 1300 to be sealed against the ingress of air that has not passed through filters provided on the body 1100 of the humidifier 1000 without impacting on the draining of excess water back into the water tank 1300.

In the illustrated embodiment, the tank-to-body connector 1430 comprises a connector housing 1434 provided on the top of the tank cap 1400 and that is arranged to project above the upper surface of the water tank 1300 when the tank cap 1400 is disposed on the water tank 1300. The connector housing 1434 comprises a fluid connector section 1434*a* and two separate electrical connector sections 1434*b* that are separated from and disposed either side of the fluid connector section 1434*a*.

The fluid connector section 1434*a* of the connector housing 1434 comprises an enclosure that contains the water supply outlet 1431 and the water return inlet 1433. The water supply outlet 1431 then comprises a pipe or conduit that extends from the outlet 1411 provided towards the top the outgoing water supply pipe 1407 to the fluid connector section 1434*a*. The water return inlet 1433 then comprises the above-mentioned tank water return tray 1425, with the tank water return tray 1425 being arranged to be disposed beneath the water return inlet 1433 when the tank-to-body connector 1430 is connected to the body-to tank connector 1120. The tank water return tray 1425 is also arranged to extend below the water supply outlet 1431 such that any water that leaks from the water supply outlet 1431 and/or from the interface between the water supply outlet 1431 and the water supply inlet 1121 of the body 1100) flows back into the water tank 1300 through the drain 1426.

A rearward facing surface of the connector housing 1434 is then provided with openings through which the water supply inlet 1121 and the water return outlet 1123 provided on the body-to-tank connector 1120 can enter the fluid connector section 1434*a* of the connector housing 1434. The fluid connector section 1434*a* can therefore be considered to be a female connector providing sockets, with the water supply inlet 1121 and the water return outlet 1123 provided on the body-to-tank connector 1120 then being considered to be pins of a male connector.

The fluid connector section 1434*a* of the tank-to-body connector 1430 can also include an air supply inlet 1435 that receives a supply of air from the body-to-tank connector 1120 and conveys this supply of air to the water tank 1300. In the illustrated embodiment, the air supply inlet 1435 is provided by one of the openings in the fluid connector section 1434*a* of the connector housing 1434 through which a supply of air can be received from an air supply outlet 1124 of the body-to-tank connector 1120, with this supply of air then flowing into the water tank 1300 through the drain 1426 of the tank water return tray 1425.

Each of the electrical connector sections 1434b of the tank-to-body connector 1430 then comprise an electrical connector enclosure and a plurality of male-ended electrical connectors 1432 that project from the enclosure into a recess defined by the connector housing 1434, such that the male-ended electrical connectors 1432 extend towards the rear of the water tank 1300 when the tank cap 1400 is disposed on the water tank 1300. Wiring from the column 1404 of the tank cap 1400 then enters the enclosure and connects to the inner ends of the male-ended electrical connectors 1432.

The body 1100 of the humidifier 1000 is then provided with the body-to-tank connector 1120 that is arranged to connect to the tank-to-body connector 1430 and through which water pumped from the water tank 1300 is conveyed into the pipework provided within the body 1100 of the humidifier 1000. The body-to-tank connector 1120 is arranged to be substantially parallel with the direction in which the water tank 1300 is arranged to be inserted into the cavity 1105 (i.e. laterally relative to the body 1100), and is directed/faces the side opening 1107 into the cavity 1105, so that the body-to-tank connector 1120 connects with the tank-to-body connector 1430 provided on the tank cap 1400 during insertion of the water tank 1300 into the body 1100.

The body-to-tank connector 1120 comprises the water supply inlet 1121 through which water is received from the water supply outlet 1431 provided on the tank-to-body connector 1430 and that is arranged to convey water into the pipework provided within the body 1100 of the humidifier 1000. The body-to-tank connector 1120 also comprises electrical connectors 1122 for transmitting electrical power to the tank cap 1400 and for communicating with control circuitry provided in the tank cap 1400. The electrical connectors 1122 provided by the body-to-tank connector 1120 are therefore arranged to contact/engage with corresponding electrical connectors 1432 provided by the tank-to-body connector 1430. The body-to-tank connector 1120 further comprises the water return outlet 1123 through which excess water is conveyed from the body 1100 of the humidifier 1000 to the tank-to-body connector 1430 and that is arranged to receive this excess water from an evaporator tray 1125 contained in the body 1100 of the humidifier 1000. The body-to-tank connector 1120 can also be arranged to receive a supply of air from within the body 1100 of the humidifier 1000 and to convey this supply of air to the tank-to-body connector 1430.

Figure 23:
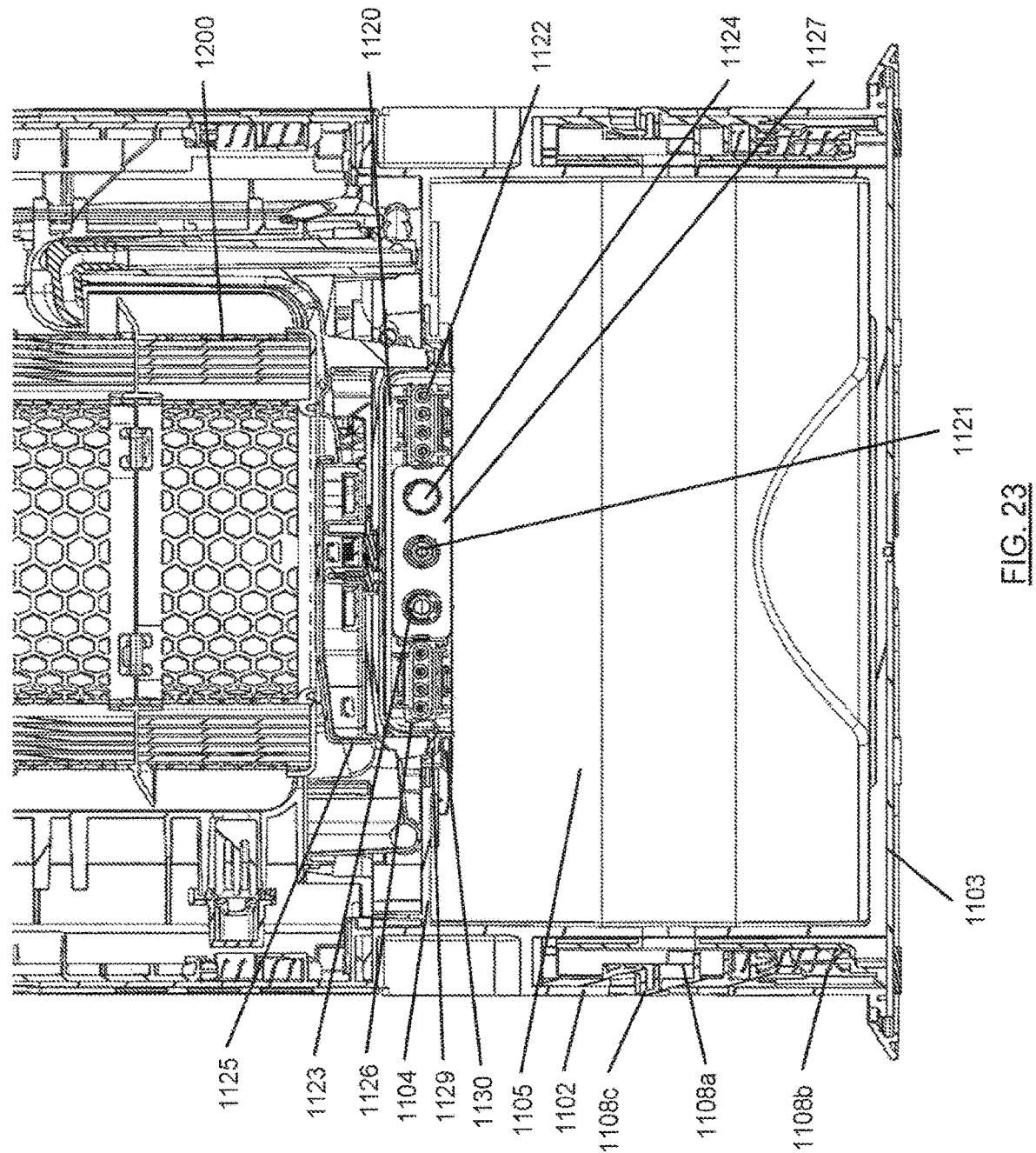
FIG. 23 is a sectional front view of the lower body section of the humidifier of FIG. 1 without the water tank assembly.
Figure 24:
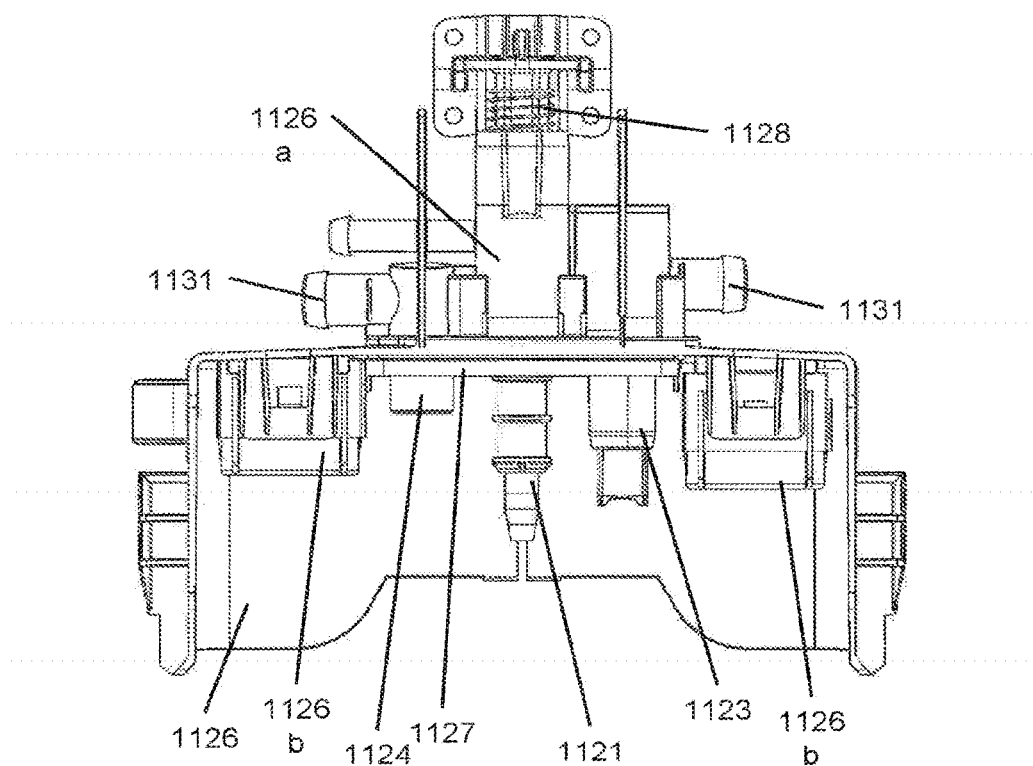
FIG. 24 is a bottom view of the body-to-tank connector of the humidifier of FIG. 1.
Figure 25:
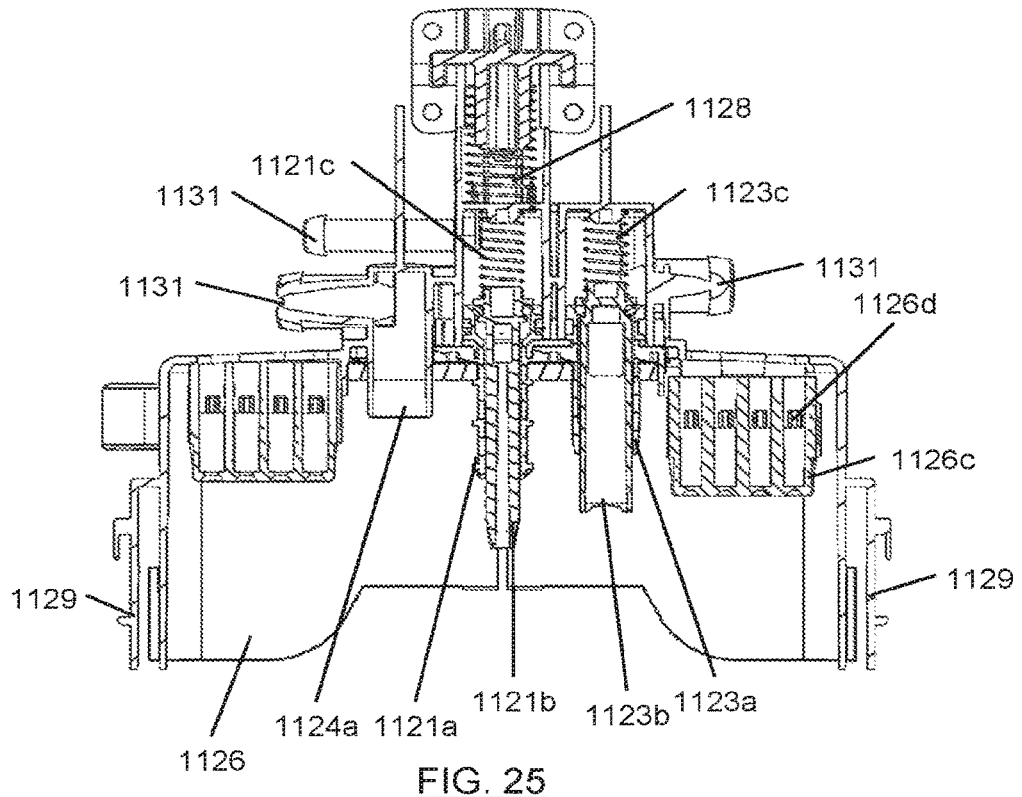
FIG. 25 is a sectional bottom view of the body-to-tank connector of FIG. 24.

FIG. 23 shows a front view of the lower body section 1102 without the water tank 1300 and in which the body-to-tank connector 1120 is visible within the cavity 1105, FIG. 24 then shows a bottom view of the body-to-tank connector 1120 and FIG. 25 shows a sectional bottom view of the body-to-tank connector 1120. In the illustrated embodiment, the body-to-tank connector 1120 comprises a connector carriage or chassis 1126 that is disposed towards the top of the cavity 1105 defined by the lower body section 1102 and is arranged to align with the connector housing 1434 provided on the tank cap 1430 when the water tank 1300 is inserted into the cavity 1105. The connector chassis 1126 comprises a fluid connector section 1126a and two separate electrical connector sections 1126b that are disposed either side of the fluid connector section 1126a.

The fluid connector section 1126a of the connector chassis 1126 provides the water supply inlet 1121 and the water return outlet 1123. Each of the water supply inlet 1121 and the water return outlet 1123 then comprise a pipe or conduit 1121a, 1123a and a stop valve 1121b, 1123b within the pipe that is biased into a closed position by a resilient member 1121c, 1123c, such as a return/compression spring. Each of these stop valves 1121b, 1123b is then arranged so that, as the water tank 1300 is inserted into the cavity 1105, the stop valve 1121b, 1123b moves into the open position against the resistance provided by the corresponding resilient member 1121c, 1123c. Consequently, when the water tank 1300 is disposed within the cavity 1105 in the body 1100 of the humidifier 1000, the stop valves 1121b, 1123b will both be open and thereby allow water to flow through the corresponding pipe 1121a, 1123a. Then, as the water tank 1300 is removed from within the cavity 1105 in the body 1100 of the humidifier 1000, the resilient members 1121c, 1123c force the corresponding stop valves 1121b, 1123b into the closed positon and thereby prevent water from flowing through the pipes 1121a, 1123a.

In the illustrated embodiment, the stop valve 1121b of the water supply inlet 1121 comprises a hollow piston or plunger that has an open distal end, a closed proximal end and one or more slots formed in the side wall of the piston adjacent to the closed proximal end. The piston is disposed and slides within a sleeve that is then fixedly disposed within the pipe 1121a of the water supply inlet 1121. The piston is arranged to align with and contact the water supply outlet 1431 provided on the tank-to-body connector 1430 when the water tank 1300 is disposed within the cavity 1105. This contact with the water supply outlet 1431 causes movement of the piston against a compression spring into a position within the sleeve at which the slots are exposed such that water can enter the open distal end of the piston and exit through the slots into the pipe 1121a of the water supply inlet 1121. Then, as the water tank 1300 is removed from within the cavity 1105, the compression spring forces the piston into a position within the sleeve at which the slots are covered by the sleeve.

Similarly, the stop valve 1123b of the water return outlet 1123 comprises a hollow piston or plunger that has an open distal end, a closed proximal end and one or more slots formed in the side wall of the piston adjacent to the closed proximal end. The piston is disposed and slides within a sleeve that is then fixedly disposed within the pipe 1123a of the water return outlet 1123. The piston is arranged to contact a portion of the tank-to-body connector 1430 when the water tank 1300 is disposed within the cavity 1105. This contact with the tank-to-body connector 1430 causes movement of the piston against a compression spring into a position within the sleeve at which the slots are exposed such that water can enter through the slots into the piston and exit through open distal end of the piston into the water return inlet 1433 of the tank-to-body connector 1430. Then, as the water tank 1300 is removed from within the cavity 1105, the compression spring forces the piston into a position within the sleeve at which the slots are covered by the sleeve.

The fluid connector section 1126a of the body-to-tank connector 1120 can also provide the air supply outlet 1124 that receives a supply of air from within body 1100 of the humidifier 1000 and conveys this supply of air to the tank-to-body connector 1430. In the illustrated embodiment, the air supply outlet 1124 comprises a pipe or conduit 1124a having an open outer end that is arranged to align with the air supply inlet 1435 provided on the tank-to-body connector 1430 when the water tank 13M) is disposed within the cavity 1105.

The connector chassis 1126 is then provided with an interface/connection sealing element 1127 that is arranged to form a seal between the water tank assembly 1300, 1400 and the body 1100 that prevents that prevents the leakage of air into the body 1100 of the humidifier 1000 (i.e. from outside the humidifier 1000). In particular, the interface sealing element 1127 that is arranged to form a seal around the interface between the water tank assembly 1300, 1400 and the body 1100 of the humidifier 1000. In this first embodiment, each of the water supply inlet 1121, the water return outlet 1123 and the air supply outlet 1124 are provided on a surface of the connector chassis 1126 that faces towards the side opening 1107 into the cavity 1105, and the interface/connection sealing element 1127 is provided on this surface of the connector chassis 1126. The interface sealing element 1127 is therefore arranged to form a seal against the opposing rearward facing surface of the connector enclosure 1434 of the tank-to-body connector 1430 and thereby prevent the leakage of air through the connectors 1430, 1120 into either the water tank 1300 or the body 1100 of the humidifier 1000. In the illustrated embodiment, the connection sealing element 1127 is provided by a gasket formed from a resilient material, such as a rubber, and is arranged surround each of the water supply inlet 1121, the water return outlet 1123 and the air supply outlet 1124.

Each of the electrical connector sections 1126*b* of the body-to-tank connector 1120 then comprise an electrical connector body 1126*c* and a plurality of female-ended electrical connectors 1126*d* that are accessible within the connector body 1126*c*, such that the female-ended electrical connectors 1126*d* extend towards the side opening 1107 into the cavity 1105. Wiring from the body 1100 of the humidifier 1000 then enters through a rear of the connector body 1126*c* and connects to the inner ends of the female-ended electrical connectors 1126*d*.

The connector chassis 1126 of the body-to-tank connector 1120 is movably mounted within the cavity 1105 defined by the lower body section 1102. Specifically, the connector chassis 1126 is arranged to move in a direction that is parallel with the direction in which the water tank 1300 is arranged to be inserted into the cavity 1105 (i.e. by moving/sliding the water tank 1300 laterally relative to the body 1100). The body-to-tank connector 1120 then further comprises a resilient member 1128, such as a return/compression spring, that is arranged to bias the connector chassis 1126 towards the side opening 1107 into the cavity 1105. The connector chassis 1126 is therefore arranged so that, as the water tank 1300 is inserted into the cavity 1105, the tank cap 1400 provided on the water tank 1300 contacts the connector chassis 1126 and causes movement of the connector chassis 1126 away from the side opening 1105, against the resistance provided by the resilient member 1128. The biasing of the connector chassis 1126 towards the side opening 1107 into the cavity 1105 ensures that the corresponding connectors make good contact with/sufficiently engage one another and also ensures that the interface sealing element 1127 is compressed between the connectors when the water tank 1300 is disposed in the cavity 1105. In the illustrated embodiment, the connector chassis 1126 is provided with a pair of rails 1129 that engage corresponding channels/tracks 1130 provided on the body 1100 of the humidifier 1000, with the rails 1129 being arranged to slide over the channels/tracks 1130.

The connector chassis 1126 is also provided with ports 1131 through which fluids are conveyed to or from each of the water supply inlet 1121, the water return outlet 1123 and the air supply outlet 1124. The ports 1131 of each of the water supply inlet 1121, the water return outlet 1123 and the air supply outlet 1124 are provided with a hose attachment member or hose barb by which a corresponding flexible pipe or hose can be connected to the connector chassis 1126. A water supply hose 1132 is then attached between the port of the water supply inlet 1121 and the additional pipework provided within the body 1100 of the humidifier 1000 that conveys water to the evaporator assembly 1200, a water return hose 1133 is attached between the port of the water return outlet 1123 and a port of the evaporator tray 1125 contained within the body 1100 of the humidifier 1000, and an air supply hose 1134 is connected between the port of the air supply outlet 1124 and an air supply vent 1135 provided within the body 1100 of the humidifier 1000. For example, each of these hoses 1132, 1133, 1134 could comprise a flexible material such as silicone. FIG. 26 shows a rear perspective view and FIG. 27 shows a front perspective view of the evaporator tray and the hoses 1132, 1133, 1134 connected to the body-to-tank connector.

The upper body section 1101 of the humidifier 1100 contains/houses the air flow generator and the evaporator assembly 1200, and provides the second portion of the water supply pipework of the water supply system. The upper body section 1101 is therefore provided with air inlets 1112 through which the air flow generator can draw a flow of air from outside of the body 1100 of the humidifier 1000, and an air outlet 1113 through which the air flow generated by the air flow generator is exhausted from the body 1100 of the humidifier 1000. The upper body section 1101 is therefore also provided with a side door that can be opened in order to allow the evaporator assembly 1200 to be inserted/pushed into and drawn/pulled out (i.e. for cleaning) from within the interior of the body 1100 of the humidifier 1000. The upper body section 1101 also contains the evaporator tray 1125 that is arranged to support the evaporator assembly 1200 so that the evaporator assembly 1200 is disposed within the air flowing through the body 1100 of the humidifier 1000. In addition, the evaporator tray 1125 is arranged to support the evaporator assembly 1200 so that water pumped from the water tank 1300 is supplied to the evaporator assembly 1200 and so that any excess water that falls/drips from the evaporator assembly 1200 is caught by the evaporator tray 1125 and conveyed back to the water tank 1300. The nozzle 1600 is then mounted to an upper end of the upper body section 1101 and is arranged to receive the air flow exhausted from the air outlet 1113 of the body 1100 of the humidifier 1000.

The upper body section 1101 of the humidifier 1000 is also arranged to support removable filter assemblies 1140*a*. 1140*b* upstream of the air inlets 1112 so that the air flow drawn through the air inlets 1112 by the air flow generator is filtered prior to entering the body 1100 of the humidifier 1000. The upper body section 1101 is then also provided with mechanisms for retaining and releasing the filter assemblies 1140*a*, 1140*b* from the body 1100 of the humidifier 1000.

Figure 29:
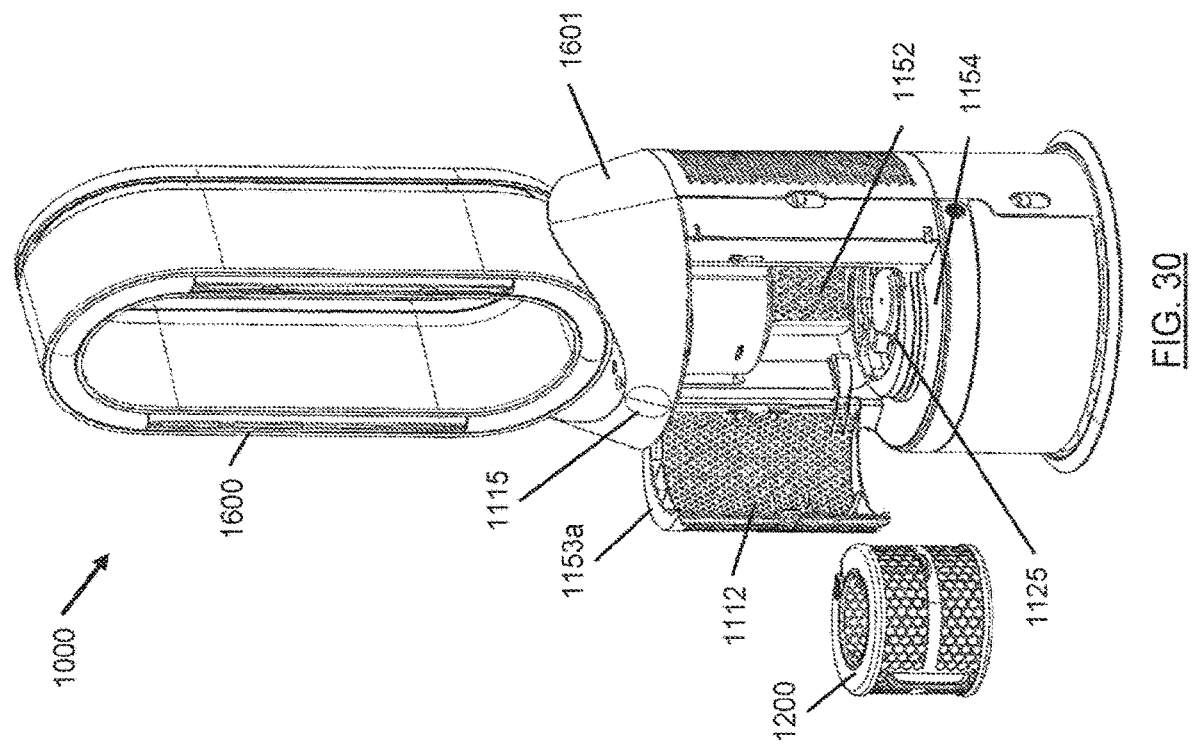
FIG. 29 is a perspective view of the humidifier of FIG. 1 with a filter assembly separated from the humidifier.

In the illustrated embodiment, the upper body section 1101 of the humidifier 1000 comprises an upper body chassis 1150. The air flow generator is then provided by a motor-driven impeller 1110 that is housed within an impeller housing 1151 that is supported towards an upper end of the upper body chassis 1150. The upper body chassis 1150 then defines an evaporator cavity 1152 below the impeller housing 1151, within which the evaporator assembly 1200 can be disposed, that contains the pipework that conveys water to the evaporator assembly 1200 within the evaporator cavity 1152 and supports the evaporator tray 1125 below the evaporator cavity 1152. The upper body section 1101 further comprises a pair of grilles or grates 1153*a*, 1153*b* that are disposed on the upper body chassis 1150 such that they enclose the evaporator cavity 1152 and that provide the air inlets 1112 into the upper body section 1101, and a pair of filter assemblies 1140*a*. 1140*b* that are releasably retained on the upper body chassis 1150 over the grilles 1153*a*. 1153*b*. FIG. 29 therefore shows a perspective view of the humidifier 1000 with one of the filter assemblies 1140*a* detached and with the other of the filter assemblies 1140*b* mounted on the far side of the upper body section 1101.

In the illustrated embodiment, the upper body chassis 1150 comprises a lower annular flange 1154 located at the lower end of the upper body chassis 1150, an upper annular flange 1155 located towards/adjacent to the upper end of the upper body chassis 1150, and a pair diametrically opposed side sections 1156*a*, 1156*b* that extend vertically between the lower annular flange 1154 and the upper annular flange 1155.

Both the lower annular flange 1154 and the upper annular flange 1155 extend radially/perpendicularly away from the centre axis of the upper body chassis 1150. The outer edge of the lower annular flange 1154 is then substantially flush with the periphery/external surface of the lower body section 1102, whilst the outer edge of the upper annular flange 1155 is substantially flush with the external surface of a base/neck 1601 of the nozzle 1600 that connects to upper end of the upper body chassis 1150.

The upper body chassis 1150 further comprises a fan mount/seat section 1157 provided at the upper end of the upper body chassis 1150 that is arranged to support the impeller housing 1151 within the upper body section 1101. In the illustrated embodiment, the fan mount/seat section 1157 of the upper body chassis 1150 is generally tubular in shape with an inlet bell-mouth 1158 at the lower end and a plain pipe outlet 1159 at the upper end. An upper retention ring 1160 is then located at the upper end of the tubular fan mount/seat section 1157 whilst a lower retention ring 1161 is located towards/adjacent to the lower end of the tubular fan mount/seat section 1157. The impeller housing 1151 is then supported within the tubular fan mount/seat section 1157 by a first set of tension springs 1162 that are connected between the impeller housing 1151 and the upper retention ring 1160 and a second set of tension springs 1163 that are connected between the impeller housing 1151 and the lower retention ring 1161.

In the illustrated embodiment, the impeller housing 1151 extends around the motor-driven impeller 1110 and has a first end defining an air inlet 1164 of the impeller housing 1151 and a second end located opposite to the first end and defining an air outlet 1113 of the impeller housing 1151. The impeller housing 1151 is aligned within the fan mount section 1157 such that the longitudinal axis of the impeller housing 1151 is collinear with the longitudinal axis (Z) of the body 1100 of the humidifier 1000 and so that the air inlet 1164 of the impeller housing 1151 is located beneath the air outlet 1113. The impeller housing 1151 comprises a generally frusto-conical lower wall and a generally frusto-conical upper wall. A substantially annular inlet member is then connected to the bottom of the lower wall of the impeller housing 1151 for guiding the incoming air flow into the impeller housing 1151. The air inlet 1164 of the impeller housing 1151 is therefore defined by the annular inlet member provided at the open bottom end of the impeller housing 1151, with this air inlet 1164 of the impeller housing 1151 being disposed above and aligned with the inlet bell-mouth 1158 provided at the lower end of the fan mount section 1157.

In the illustrated embodiment, the impeller 1110 is in the form of a mixed flow impeller and comprises a generally conical hub, a plurality of impeller blades connected to the hub, and a generally frusto-conical shroud connected to the blades so as to surround the hub and the blades. The impeller 1110 is connected to a rotary shaft 1167 extending outwardly from a motor 1168 that is housed within a motor housing 1169 disposed within the impeller housing 1151. In the illustrated embodiment, the motor is a DC brushless motor having a speed which is variable by a control circuit in response to control inputs provided by a user.

The motor housing 1169 comprises a generally frusto-conical lower portion that supports the motor 1168, and a generally frusto-conical upper portion that is connected to the lower portion. The shaft 1167 protrudes through an aperture formed in the lower portion of the motor housing 1169 to allow the impeller 1110 to be connected to the shaft 1167. The upper portion of the motor housing 1169 further comprises an annular diffuser in the form of curved blades that project from the outer surface of the upper portion of the motor housing 1169. The walls of the impeller housing 1151 surround and are spaced from the motor housing 1169 such that the impeller housing 1151 and the motor housing 1169 between them define an annular air flow path which extends through the impeller housing 1151. The air outlet 1113 of the impeller housing 1151, through which the air flow generated by the motor-driven impeller 1110 is exhausted, is then defined by the upper portion of the motor housing 1169 and the upper wall of the impeller housing 1151.

A flexible sealing member 1170 is then attached between the impeller housing 1151 and the upper end of the fan mount section 1157 of the upper body chassis 1150. The flexible sealing member 1170 prevents air from passing around the outer surface of the impeller housing 1151. The sealing member 1170 preferably comprises an annular lip seal, preferably formed from rubber.

Figure 28:
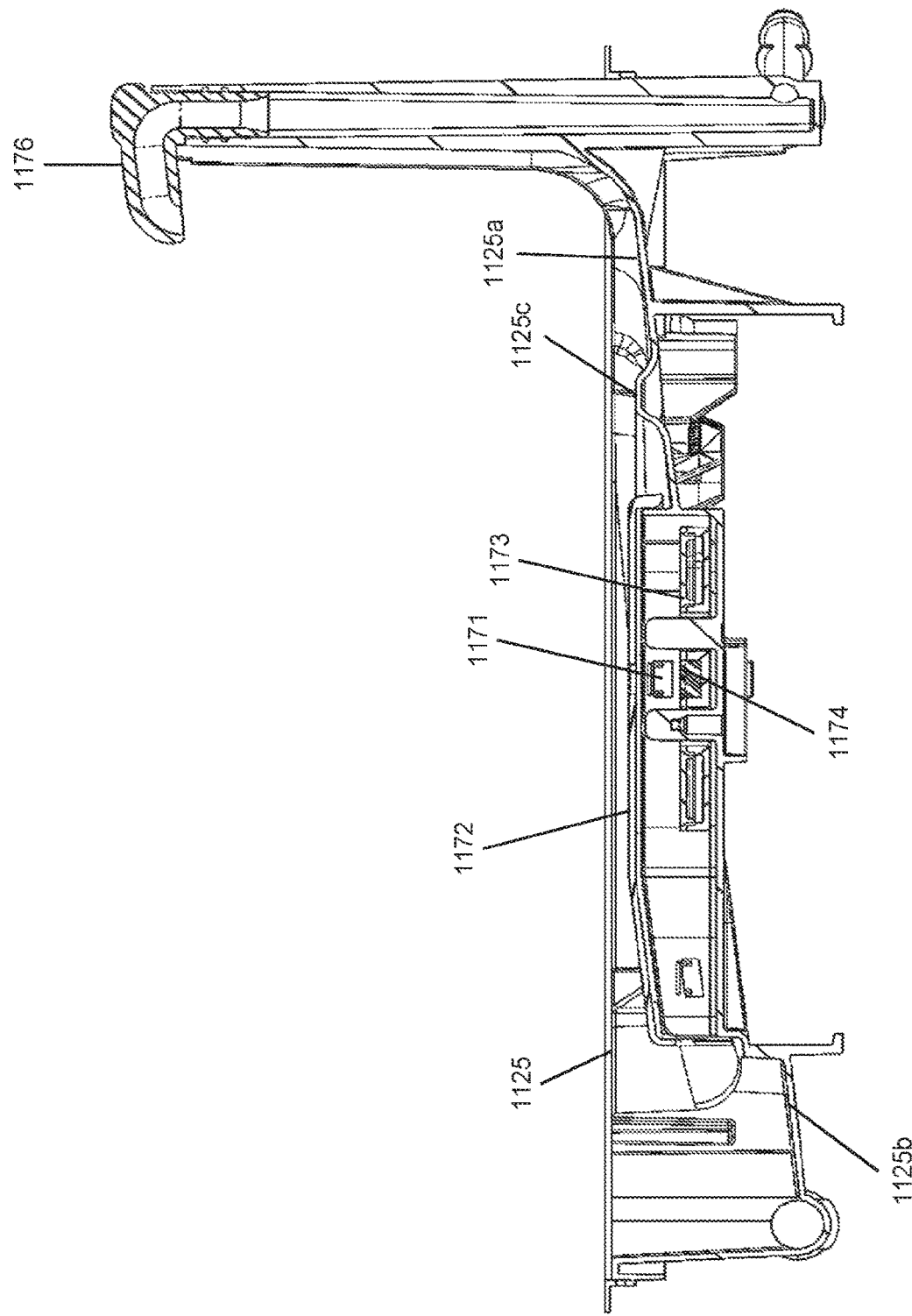
FIG. 28 is a sectional front view of the evaporator tray of FIGS. 26 and 27.

The evaporator tray 1125 is then mounted within the open centre/central aperture of the lower annular flange 1154. The evaporator cavity 1152 is then defined by the space between the evaporator tray 1125 and the lower end of the fan mount section 1157. FIG. 28 is a sectional front view of the evaporator tray 1125. In the illustrated embodiment, the evaporator tray 1125 comprises a generally circular sink section 1125*a* that slopes downwardly towards a drain 1125*b* through which water can flow out of the evaporator tray 1125 and back into the water tank 1300 via the water return hose 1133. The evaporator tray 1125 is also provided with an arcuate ridge 1125*c* that projects upwardly from the sloped surface of the sink section 1125*a* that provides an evaporator seat upon which the evaporator assembly 1200 can rest when disposed within the evaporator cavity 1152. The arcuate ridge 1125*c* is therefore arranged such that its upper surface is flat and substantially horizontal when the base 1103 of the humidifier 1000 is horizontal. The arcuate ridge is also arranged such that the gap between the ends of the arcuate ridge is towards the lower end of the sloped sink section, adjacent to the drain.

The evaporator tray 1125 further comprises an evaporator tray water level sensor 1171 that is arranged to detect when the water level in the evaporator tray 1125 is above a predefined maximum level, which would therefore indicate that the drain 1125*b* is at least partially blocked. Specifically, the evaporator tray 1125 is provided with a float housing 1172 that is disposed at the centre of the evaporator tray 1125, within the arcuate ridge 1125*c*. An evaporator tray float 1173 is then disposed beneath the float housing 1172 adjacent to the surface of the sink section 1125*a*. The evaporator tray float 1173 is then provided with a magnet 1174, which is mounted to the evaporator tray float 1173, and that is arranged such that the magnet 1174 is disposed adjacent to a magnetic sensor (not shown), such as a unipolar Hall Effect sensor, that detects the position of the magnet 1174 relative to the magnetic sensor and thereby detects a change in the position of the evaporator tray float 1173. The evaporator tray water level sensor 1171 is then arranged such movement of the evaporator tray float 1173 away from the surface of the sink section 1125*a* results in movement the magnet 1174 in the direction of the magnetic axis across/passed the magnetic sensor, rather than towards or away from the magnetic sensor, such that the magnetic sensor detects a change in polarity of the magnetic field produced by the magnet 1174.

The pipework that conveys water to the evaporator assembly 1200 then comprises a water supply spout 1176 that projects out into the evaporator cavity 1152 directly above the evaporator tray 1125 so that water can be supplied to evaporator assembly 1200 when disposed in the evaporator cavity 1152. In the illustrated embodiment, the pipework within the upper body section 1101 conveys water from the water supply hose 1132 to the water supply spout 1176. The water supply spout 1176 then projects out into the evaporator cavity 1152 such that it is disposed above the upper end of the sloped sink section 1125*a*, at a location that is approximately two thirds of the way up the height of the evaporator cavity 1152, with the outlet of the water supply spout 1176 facing downwards towards the evaporator tray 1125 so that water can pour from the water supply spout 1176.

As mentioned above, the upper body section 1101 of the humidifier 1000 further comprises a pair of grilles or grates 1153*a*. 1153*b* that are disposed on the opposing open sides of the upper body chassis 1150. Each of the grilles 1153*a*, 1153*b* is provided with an array of apertures which act as the air inlet 1112 of the body 1100 of the humidifier 1000. Specifically, a first grille 1153*a* is mounted on a first open side of the upper body chassis 1150 whilst a second grille 1153*b* is mounted on a second open side of the upper body chassis 1150. The first grille 1153*a* has the shape of a tubular plate (i.e. has an arcuate cross-section) that is provided with an array of apertures, and is arranged to extend between the upper annular flange 1155 and the lower annular flange 1154 and between the first and second side sections 1156*a*, 1156*b* of the upper body chassis 1150. The second grille 1153*b* then also has the shape of a tubular plate (i.e. has an arcuate cross-section) that is provided with an array of apertures, and is arranged to extend between the upper annular flange 1155 and the lower annular flange 1154 and between the first and second side sections 1156*a*, 1156*b* of the upper body chassis 1150.

Figure 30:
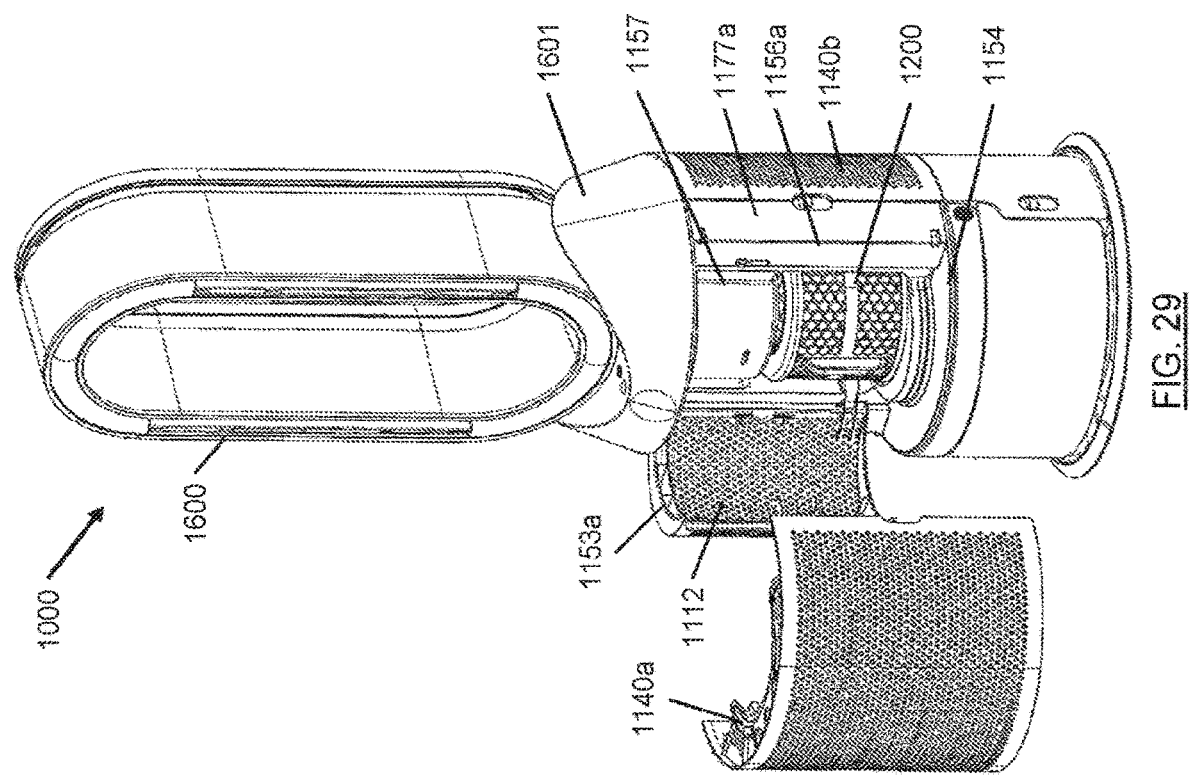
FIG. 30 is a perspective view of the humidifier of FIG. 1 with the evaporator assembly separated from the humidifier.

The first grille 1153*a* is attached to the upper body chassis 1150 by one or more hinges that allow the first grille 1153*a* to rotate/swing away from the first open side of the upper body chassis 1150. The first grille 1153*a* is therefore arranged to provide a door into the evaporator cavity 1152 that can be opened in order to allow the evaporator assembly 1200 to be inserted and removed (i.e. for cleaning) from within the evaporator cavity 1152 of the body 1100 of the humidifier 1000. The second grille 1153*b* is then statically fixed over the second open side of the upper body chassis 1150 and therefore defines the rear of the evaporator cavity 1152. The first open side of the upper body chassis 1150, which can be opened and closed by the hinged first grille 1153*a*, therefore defines the front of the evaporator cavity 1152. FIG. 30 therefore shows a perspective view of the humidifier 1000 in which the hinged first grille 1153*a* is open and the evaporator assembly 1200 is removed from the humidifier 1000.

Figure 31:
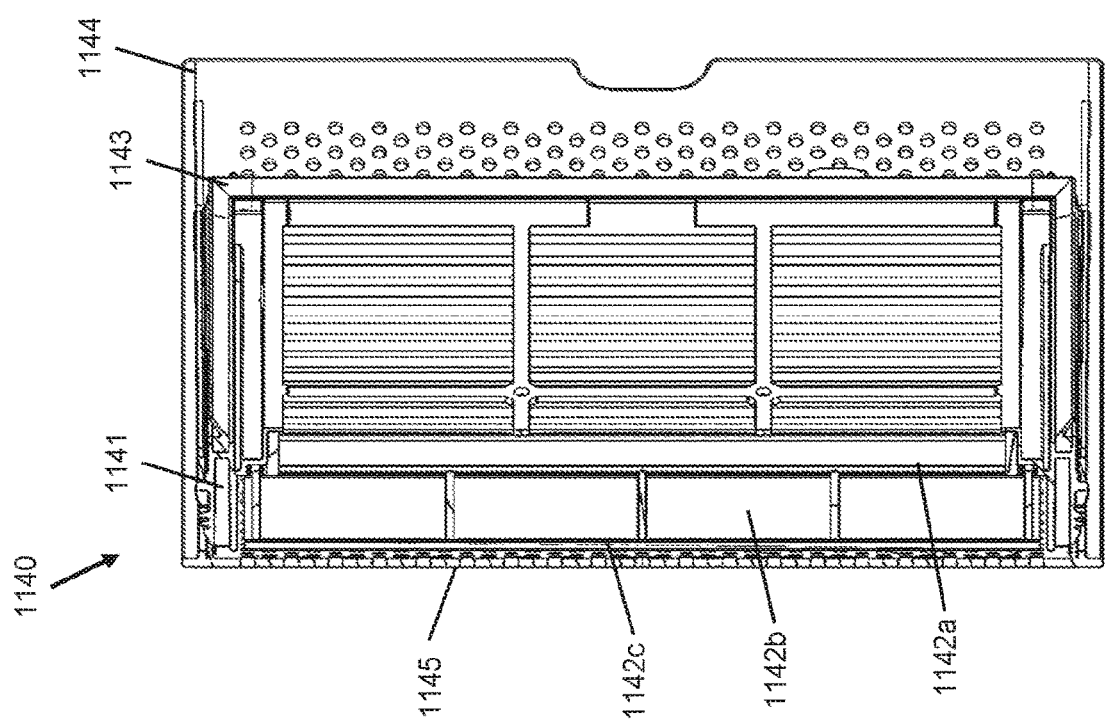
FIG. 31 is a sectional side of a filter assembly of the humidifier of FIG. 1.

In the illustrated embodiment, the side sections 1156*a*, 1156*b* of the upper body chassis 1150 each support one of a pair of filter retention assemblies 1177*a*. 1177*b* that cooperate to releasably retain a pair of filter assemblies 1140*a*, 1140*b* on the upper body chassis 1150 over the grilles 1153*a*, 1153*b*. Specifically, a first retention assembly 1177*a* is supported within a first side section 1156*a* of the upper body chassis 1150 and a second retention assembly 1177*b* is supported within a second side section 1156*b* of the upper body chassis 1150. The first retention assembly 1177*a* is then configured to releasably engage both a first filter assembly 1140*a* adjacent to a first edge of the first filter assembly 1140*a* and a second filter assembly 1140*b* adjacent to a first edge of the second filter assembly 1140*b*. The second retention assembly 1177*b* is then configured to releasably engage both the first filter assembly 1140*a* adjacent to a second edge of the first filter assembly 1140*a* and the second filter assembly 1140*b* adjacent to a second edge of the second filter assembly 1140*b*. The first edge of the first filter assembly 1140*a* is opposite to the second edge of the first filter assembly 1140*a*, and the first edge of the second filter assembly 1140*b* is opposite to the second edge of the second filter assembly 1140*b*. The filter retention assemblies 1177*a*, 1177*b* and the filter assemblies 1140 are as described in GB1720055.1 and GB1720057.7, which are hereby incorporated by reference FIG. 31 shows a sectional side of a filter assembly 1140 suitable for use with the humidifier 1000. In the illustrated embodiment, each filter assembly 1140 comprises a filter frame 1141 that supports one or more filter media 1142. Each filter frame 1141 substantially has the shape of a semi-cylinder with two straight sides that are parallel to the longitudinal axis of the filter frame 1141 and two curved ends that are perpendicular to the longitudinal axis of the filter frame 1141. The one or more filter media 1142 are arranged so as to cover the surface area defined by the filter frame 1141. Each filter assembly 1140 further comprises a flexible filter seal 1143 provided around the entirety of an inner periphery of the filter frame 1141 for engaging with the upper body chassis 1150 to prevent air from passing around the edges of the filter assembly 1140 to the grilles 1153*a*, 1153*b* that provide the air inlet 1112 of the body 1100 of the humidifier 1000. The flexible filter seal 1143 preferably comprises lower and upper curved seal sections that substantially take the form of an arc-shaped wiper or lip seal, with the each end of the lower seal section being connected to a corresponding end of the upper seal section by two straight seal sections that each substantially take the form of a wiper or lip seal. The upper and lower curved seal sections are therefore arranged to contact the those portions of the upper body chassis 1150 that are above and below the grilles 1153*a*, 1153*b*, whilst the straight seal sections are arranged to contact one or other of the side sections 1156*a*, 1156*b* of the upper body chassis 1150. Preferably, the filter frame 1141 is provided with a recess (not shown) that extends around the entirety of the inner periphery of the filter frame 1141 and that is arranged to receive and support the flexible filter seal 1143.

The one or more filter media 1142 are then supported on the outer, convex face of the filter frame 1141. In the illustrated embodiment, each filter assembly 1140 comprises a chemical filter media layer 1142*a*, a particulate filter media layer 1142*b* upstream of the chemical filter media layer 1142*a*, and an outer mesh layer 1142*c* upstream of the particulate filter media layer 1142*b*.

Figure 32:
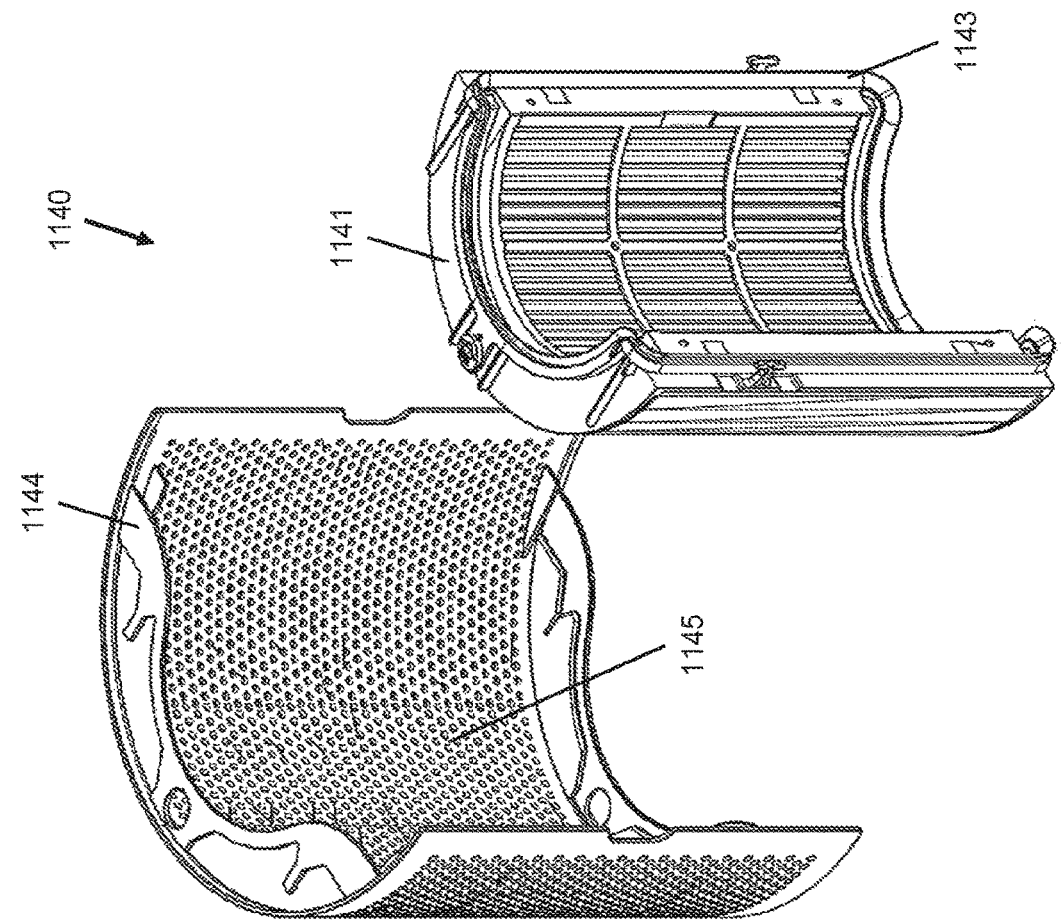
FIG. 32 is a rear perspective view of the filter assembly of FIG. 31 with the shroud separated from the filter assembly.

A perforated shroud 1144 is then releasably attached to each filter frame 1141 so as to cover the filter media 1142 when located on the body 1100 of the humidifier 1000. FIG. 32 therefore shows a rear perspective view of a filter assembly 1140 with the perforated shroud 1181 detached from the filter frame 1178. Each perforated shroud 1144 comprises an array of apertures which act as an air inlet 1145 of the filter assembly 1140 when in use 1107. Alternatively, the air inlet 1145 of the shroud 1144 may comprise one or more grilles or meshes mounted within windows in the shroud 1144. It will also be clear that alternative patterns of air inlet arrays are envisaged within the scope of the present invention. The shroud 1144 protects the filter media 1142 from damage, for example during transit, and also provides a visually appealing outer surface for the filter assemblies 1140, which is in keeping with the overall appearance of the humidifier 1000. As the shroud 1144 defines the air inlet 1145 for the filter assembly 1140, the array of apertures are sized to prevent larger particles from entering the filter assembly 1140 and blocking, or otherwise damaging, the filter media 1142. In the illustrated embodiment, the perforated shroud 1144 is substantially in the shape of a semi-cylinder and is arranged to cover the area that extends between the outer edge of the upper annular flange 1155 and the outer edge of the lower annular flange 1154 and between the outer surfaces of the first and second side sections 1156*a*, 1156*b* of the upper body chassis 1150.

As mentioned above, the evaporator assembly 1200 comprises an arrangement of porous material 1201 that absorbs water supplied to it by the water supply system and provides a large surface area in order to allow the water to evaporate when the air flow passes through the evaporator assembly 1200 thereby introducing water vapour into the air flow. The evaporator assembly 1200 then further comprises an evaporator frame that supports the arrangement of porous material 1201, with the evaporator frame comprising a first end cap covering a first end of the arrangement of porous material 1201, a second end cap covering a second end of the arrangement of porous material 1201, and at least one grille that extends between the first end cap and the second end cap. The at least one grille is connected to both the first end cap and the second end cap and thereby maintains the overall structure of the evaporator frame without restricting the flow of air through the evaporator assembly.

Figure 33:
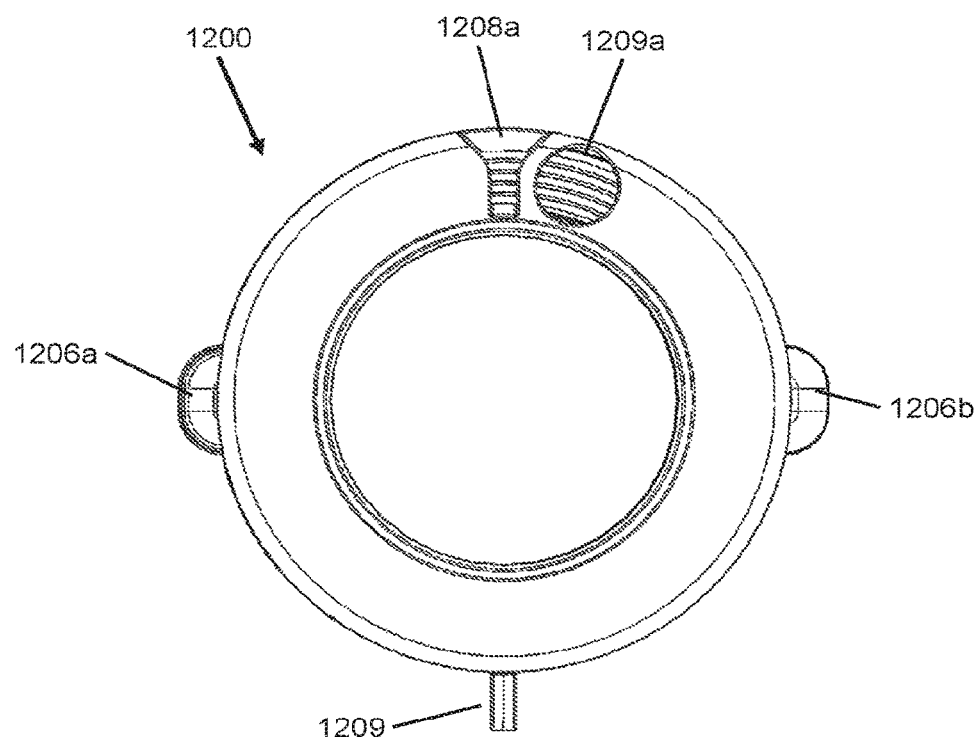
FIG. 33 is a top view of the evaporator assembly of the humidifier of FIG. 1.
Figure 34:
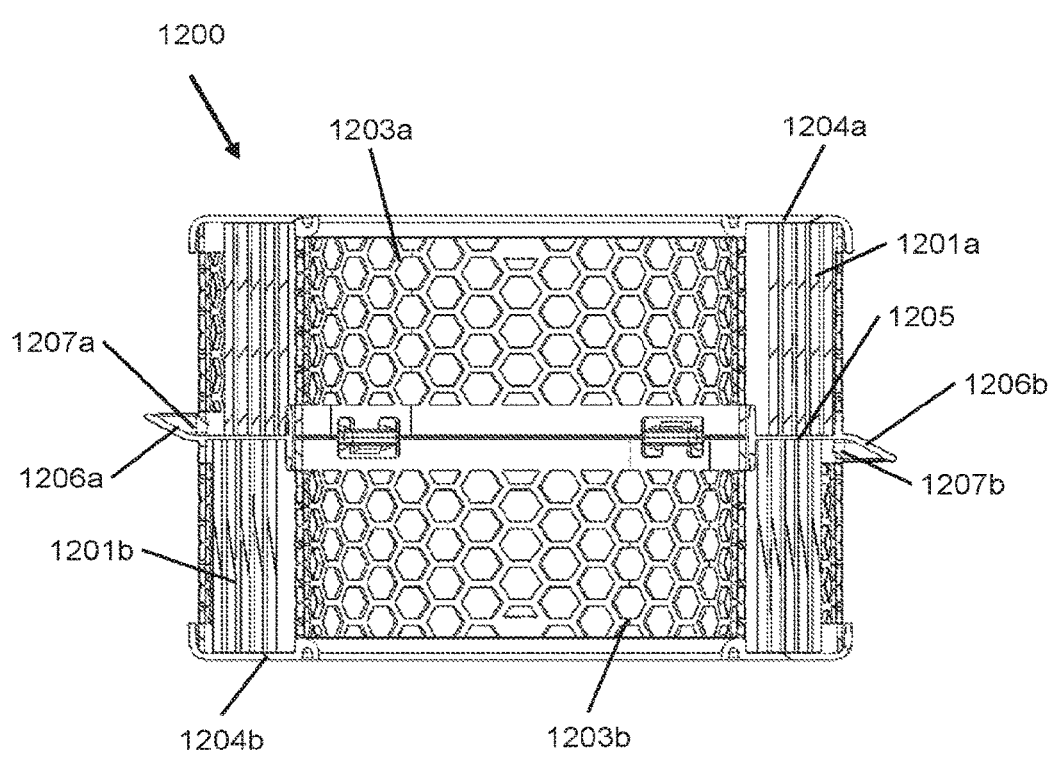
FIG. 34 is a sectional front view of the evaporator assembly of the humidifier of FIG. 1.
Figure 35:
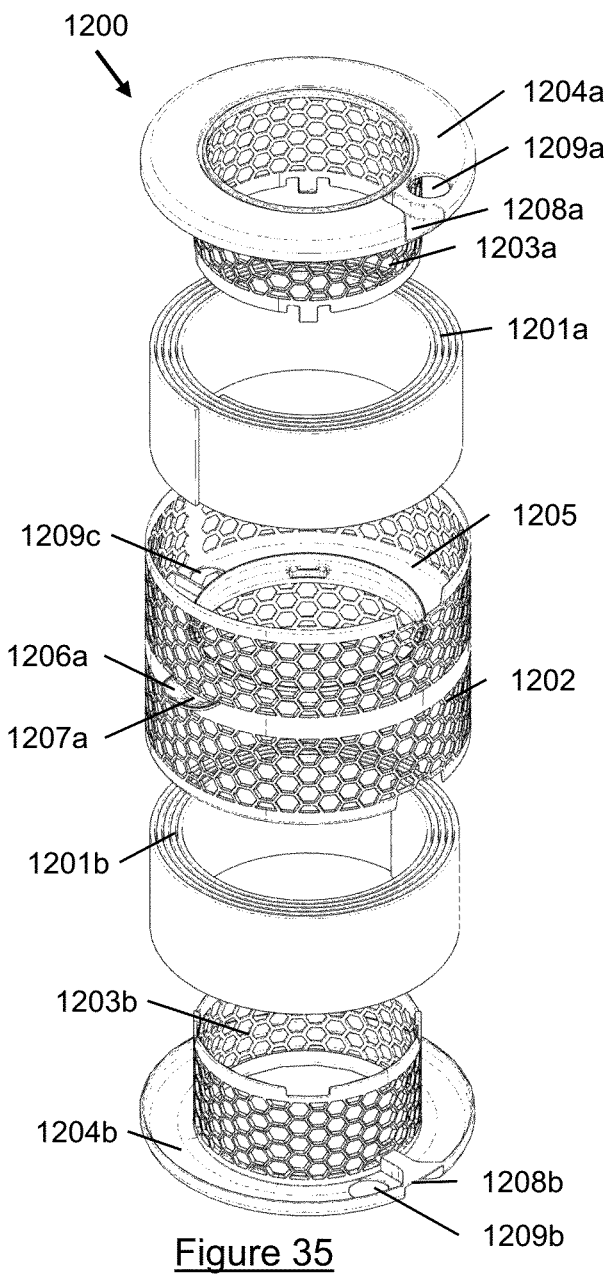
FIG. 35 is an exploded view of the evaporator assembly of the humidifier of FIG. 1.

FIG. 33 shows a top view of an evaporator assembly 1200 suitable for use with the humidifier 1000 of this first embodiment, FIG. 34 shows a sectional front view of the evaporator assembly 1200, and FIG. 35 shows an exploded view of the evaporator assembly 1200. In the illustrated embodiment, the evaporator frame comprises a generally tubular outer grille 1202 that extends over the outer surface of a tubular arrangement of porous material 1201*a*, 1201*b* and a generally tubular inner grille 1203*a*, 1203*b* that extends over the inner surface of the tubular arrangement of porous material 1201*a*, 1201*b*. The evaporator frame then further comprises a pair of annular end caps 1204*a*, 1204*b* that cover the exposed ends of the tubular arrangement of porous material 1201*a*. 1201*b*.

In the illustrated embodiment, the evaporator frame is provided with a middle shelf 1205 that projects radially inward from the inner surface of the outer grille 1202 at a location that is midway along the length/height of the outer grille 1202. This middle shelf 1205 comprises a two-sided, bilateral annular trough/tray. The tubular arrangement of porous material 1201*a*, 1201*b* then comprises two separate tubes of porous material, with a first tube of porous material 1201*a* being disposed between a first surface of the middle shelf 1205 and a first end cap 1204*a* of the evaporator assembly 1200, and a second tube of porous material 1201*b* being disposed between a reverse, second surface of the middle shelf 1205 and a second end cap 1204*b* of the evaporator assembly 1200. The adjacent, proximal ends of the first and second tubes of porous material 1201*a*, 1201*b* are then each disposed within the trough/tray provided by the corresponding side of the middle shelf 1205, whilst the distal ends of the of the first and second tubes of porous material 1201*a*, 1201*b* are disposed within an annular trough/tray provided by the corresponding end cap 1204*a*, 1204*b*.

The evaporator frame is also provided with two separate inlet funnels 1206*a*, 1206*b* that each project from the outer surface of the evaporator frame and that are arranged to receive and convey water from outside of the evaporator assembly 1200 and onto a corresponding surface of the two-sided annular trough/tray 1205.

Specifically, a first inlet funnel 1206*a* of the evaporator frame is arranged to convey water through a first inlet 1207*a* provided in the outer surface evaporator frame and onto the first surface of the two-sided annular trough/tray provided by middle shelf 1205, and a second inlet funnel 1206*b* of the evaporator frame is arranged to convey water through a second inlet 1207*b* provided in the outer surface evaporator frame and onto the second surface of the two-sided annular trough/tray provided by middle shelf 1205. These inlet funnels 1206*a*, 1206*b* are diametrically opposed on the evaporator assembly 1200 and face in opposite directions such that the assembly 1200 has two-fold rotational symmetry and can therefore be inserted into the evaporator cavity 1152 with either of the two end caps 1204*a*, 1204*b* at the top.

In the illustrated embodiment, the outer grille 1202, the inner grille 1203*a*. 1203*b*, the two-sided trough/tray 1205 and the end caps 1204*a*, 1204*b* are arranged so that water overflows outwardly (i.e. radially outward relative to evaporator assembly 1200) from the upward facing surface of the two-sided annular trough/tray provided by middle shelf 1205 and overflows inwardly (i.e. radially inward relative to evaporator assembly 1200) from the annular trough/tray provided by the lowermost end cap 1204. Water that overflows the upward facing surface of the two-sided trough/tray provided by middle shelf 1205 therefore flows onto the outside of the outer grille 1202 (i.e. through the apertures in the outer grille 1202), runs down the outside of the outer grille 1202, back into the interior of the evaporator assembly 1200 below the two-sided trough/tray provided by middle shelf 1205 (i.e. through the apertures in the outer grille 1202) and then onto the trough/tray provided by the lowermost end cap 1204. This directing of the flow of water is achieved by arranging an inner wall of the middle shelf 1205 so that is taller than the opposing apertures in the outer grille 1202, and by arranging an inner wall of the trough/tray provided by the end caps 1204*a*. 1204*b* so that it is lower than the opposing apertures in the inner grille 1203.

To ensure that, irrespective of the orientation of the evaporator assembly 1200, the upward facing inlet funnel 1206*a* is accurately located beneath the water supply spout 1176 when the evaporator assembly 1200 is disposed within the evaporator cavity 1152, the evaporator assembly 1200 is provided with two separate alignment channels/grooves 1208*a*, 1208*b* that are arranged such that one of these alignment channels 1208*a*, 1208*b* cooperates with an alignment rib 1182 that projects from the body 1100 of the humidifier 1000 and into the evaporator cavity 1152. In the illustrated embodiment, an alignment rib 1182 projects downwardly from the top of the evaporator cavity 1152 into the evaporator cavity 1152 at a location towards the rear of the evaporator cavity 1152. This alignment rib 1182 is straight and extends in a direction that bisects the evaporator cavity 1152. A first alignment channel 1208a is then provided on the first end cap 1204a whilst a second alignment channel 1208b is provided on the second end cap 1204b. The first and second alignment channels 1208a, 1208b are in vertical alignment and extend in a direction that is perpendicular to a direction that bisects the two inlet funnels 1206a. 1206b. Both the first and second alignment channels 1208a, 1208b taper outwardly from an inner end to a mouth through which the alignment rib 1182 can enter (i.e. slide into) the alignment channel 1208a, 1208b. The mouth is therefore larger than the inner end of the alignment channel 1208a, 1208b thereby making it easier to align the alignment rib 1182 with the mouth of the alignment channel 1208a, 1208b, with the tapering of the alignment channel 1208a, 1208b then guiding the alignment rib 1182 towards the inner end and a position in which the upward facing of the inlet funnels 1206a, 1206b provided on the evaporator assembly 1200 is disposed beneath, and in vertical alignment with, the water supply spout 1176. Consequently, water that pours or drips from the outlet of the water supply spout 1176 lands in the upward facing inlet funnel 1206a, 1206b and onto the upward facing surface of the two-sided annular trough/tray provided by middle shelf 1205.

In the illustrated embodiment, the evaporator frame 1202 is also provided with a tab 1209 that projects radially outward from the outer surface of the evaporator frame 1202 and that can therefore be gripped by a user to assist in sliding the evaporator assembly 1200 out of the body 1100 of the humidifier 1000. Specifically, the tab 1209 projects radially outward from a location that is diametrically opposed to the first and second alignment channels 1208a, 1208b formed in the first and second end caps 1204a, 1204b respectively. Consequently, when one of the alignment channels 1208a, 1208b is engaged by the alignment rib 1182 that is disposed towards the rear of the evaporator cavity 1152, the tab 1209 projects outwards towards the front of the evaporator cavity 1152.

In the illustrated embodiment, the end caps 1204a, 1204b and the middle shelf 1205 are each provided with an aperture 1209a, 1209b, 1209c that allows water to drain out of the associated annular trough/tray. These apertures 1209a, 1209b, 1209c thereby allow water to drain out of the evaporator assembly 1200 when the evaporator assembly 1200 is not receiving a supply of water so that the evaporator assembly 1200 can dry out when the humidifier 1000 is not in use. Preferably, the evaporator assembly 1200 is arranged such that the aperture 1209c provided in the middle shelf 1205 is generally diametrically opposite to the apertures 1209a, 1209b provided in the end caps 1204a, 1204b. Locating the apertures 1209a, 1209b, 1209c in this way ensures that water supplied to the evaporator assembly 1200 does not simply flow directly out of the evaporator assembly 1200 through the apertures 1209a, 1209b, 1209c but rather flows along a circuitous path through evaporator assembly 1200.

As mentioned above, the water tank 1300 is arranged to allow the evaporator assembly 1200 to be inserted into and fully contained within the water tank 1300 when the tank cap 1400 is retained over the tank opening 1312. This arrangement allows the evaporator assembly 1200 to be located within the water tank 1300 when the water tank 1300 is inserted into the body 1100 of the humidifier 1000 so that the evaporator assembly 1200 can be immersed in a de-scaling solution whilst the humidifier 1000 implements a self-contained cleaning cycle. This self-contained cleaning cycle can therefore simultaneously clean both the water supply system, including both the water tank 1300 and the pump system, and the evaporator assembly 1200. The tank opening 1312 of the water tank 1300 is therefore configured to allow the evaporator assembly 1200 to pass/fit through the tank opening 1312. Specifically, the dimensions of the tank opening 1312 exceed the footprint of the evaporator assembly 1200. The interior volume of the water tank 1300 then also a height/depth that is greater than the height of the evaporator assembly 1200. In addition, the evaporator assembly 1200 is configured to allow the column 1404 that projects from the lower surface of the tank cap 1400 to fit within the hollow centre of evaporator assembly 1200 so that the tank cap 1400 can be located on the water tank 1300 when the evaporator assembly 1200 is aligned with the tank opening 1312.

FIG. 13 therefore shows a perspective view of the water tank 1300 with the evaporator assembly 1200 located within the water tank 1300, whilst FIG. 14 shows a sectional side view of the water tank 1300 with the evaporator assembly 1200 located within the water tank 1300 and the tank cap 1400 covering the opening 1312. In the illustrated embodiment, the tank opening 1312 is circular and therefore has a width/diameter (W1) that is greater than the maximum width (W2) of the evaporator assembly 1200. The interior volume of the water tank 1300 then has a height/depth (H1) that is greater than the height (H2) of the evaporator assembly 1200. In addition, the evaporator assembly 1200 is tubular and therefore has an inner diameter (D1) that is greater than the maximum width (W3) of the column 1404 that projects from the lower surface of the tank cap 1400. In the illustrated embodiment, the evaporator assembly 1200 has a height (H2) (i.e. the distance between the outer faces of the first and second end caps 1204a, 1204b) of at least 100 mm and a maximum width (W2) (i.e. the distance between the outer edges of the first and second inlet funnels 1206a, 1206b) of at least 150 mm.

It is preferable that evaporator assembly 1200 comprises a multi-layered arrangement of porous material 1201. Consequently, in the illustrated embodiment, the first and second tubes of porous material 1201a, 1201b each comprise a single piece of porous material 1201 that is formed into a spiral or roll so as to have multiple, overlapping layers. However, in an alternative embodiment, the first and second tubes of porous material 1201a, 1201b could each comprise multiple separate pieces of porous material 1201 that are formed into separate tubes disposed concentrically.

Figure 36:
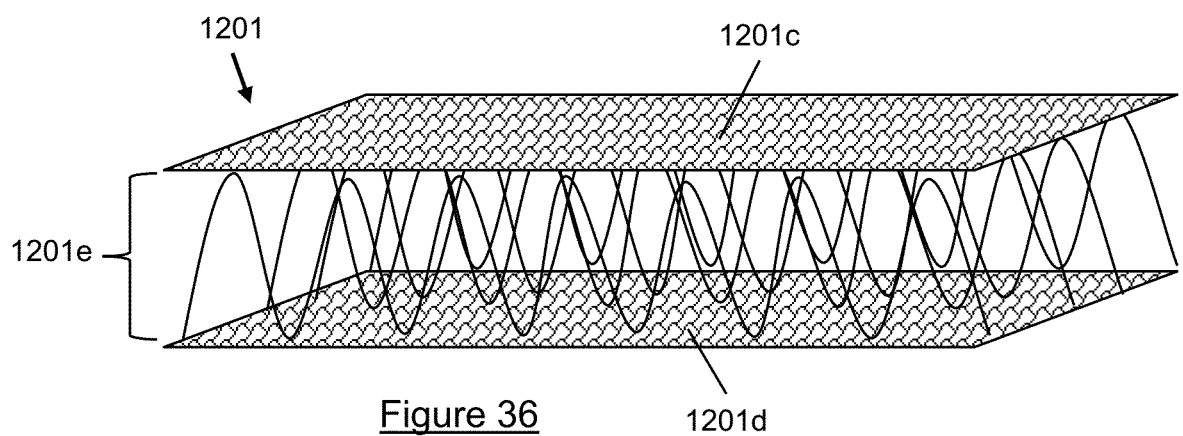
FIG. 36 is a schematic illustration of a porous material suitable for use in the evaporator assembly of FIGS. 33 to 35.

FIG. 36 shows a schematic illustration of a porous material suitable for use in the evaporator assembly 1200. In the illustrated embodiment, the porous material 1201 of the evaporator assembly 1200 comprises a spacer fabric, sometimes referred to as an air mesh or 3D woven fabric. In this regard, a spacer fabric comprises a front face layer 1201c that is connected to a back face layer 1201d by a spacer layer 1201e. The spacer layer 1201e typically comprises a monofilament yarn that has loops or strands that are generally perpendicular to the front and back face layers 1201c. 1201d such that front and back face layers 1201c, 1201d are spaced apart from one another. The front and back face layers 1201c, 1201d then each comprise a mesh or net defining an array of holes or pores through which air can flow through spacer fabric. To provide sufficient air permeability for air flowing through the evaporator cavity 1152 the spacer fabric preferably has an open area of at least 75%, more preferably at least 80% and yet more preferably of at least 85%. In the illustrated embodiment, the porous material 1201 has a thickness of approximately 2.5 mm. Each multi-layered arrangement of porous material 1201 then comprises five overlapping layers of the porous material 1201 having a total thickness of approximately 12.5 mm. However, the porous material 1201 could have a thickness of from 1.5 to 3.5 mm, and more preferably of from 2 to 3 mm. Each multi-layered arrangement of porous material 1201 could also comprise anything from 2 to 7 overlapping layers of the porous material 1201.

The porous material 1201 of the evaporator assembly 1200 further comprises silver as an anti-bacterial agent. Specifically, the spacer fabric comprises yarn that is coated and/or impregnated with silver. In a preferred embodiment only the front and/or back face layers 1201c, 1201d of the spacer fabric comprise a yarn that is coated and/or impregnated with silver. In a particular embodiment, the spacer fabric is provided in sheet form and strands of yarn that is coated and/or impregnated with silver are disposed in the front and/or back face layers 1201c, 1201d of the spacer fabric with the individual strands running parallel to an edge of the sheet. The strands of yarn are preferably spaced apart from one another and distributed across the front and/or back face layers 1201c, 1201d of the spacer fabric.

By way example, the yarn could comprise an X-Static® silver fiber yarn that is available from Noble Biomaterials, Inc. These silver fiber yarns comprise nylon fibres that have a layer of silver that is bonded to their surface and can therefore comprise from 70 to 95% nylon and between 5 and 30% silver. However, it is preferable that the silver fiber yarns comprise from 75 to 92% nylon and between 8 and 25% silver. The spacer layer 1201e that connects and spaces apart the front and/or back face layers 1201c, 1201d of the spacer fabric can then comprise polyester thread or yarn.

When in use the pump 1403 provided by the tank cap 1400 pumps water from within the water tank 1300 through the outgoing water supply pipe 1407. Within the outgoing water supply pipe 1407 the water from the water tank 1300 is then disinfected by the UV system before the water exits the tank cap 1400 through tank-to-body connector 1430 out into the water supply inlet 1121 of the body-to-tank connector 1120. The water then exits the body-to-tank connector 1120 into the water supply hose 1132 and passes through the pipework of the upper body section 1101. The water then passes out through the water supply spout 1176 and onto one of the inlet funnels 1206 of the evaporator assembly 1200 that conveys the water into the corresponding annular trough/tray provided by the middle shelf 1205 of the evaporator assembly 1200. The annular trough/tray 1205 therefore provides a reservoir for water received from the water supply system, with the water contained within the annular trough/tray 1205 then being drawn up through the porous material 1201a that is disposed within the trough/tray provided by the middle shelf 1205. Water then also flows from the middle shelf 1205 and down on to the porous material 1201b that is disposed within the trough/tray provided by the bottom end cap 1204b. Rotation of the impeller 1110 by the motor 1168 generates an air flow through the impeller housing 1151. This air flow draws air into the body 1100 of the humidifier 1000 through the filter assemblies 1140 that are mounted over the air inlets 1112 and through the pores of the evaporator assembly 1200. The water absorbed by the porous material 1201a, 1201b of the evaporator assembly 1200 then evaporates into the air flow as it passes through the porous material 1201a, 1201b thereby introducing water vapour into the air flow. The humidified air flow then passes through the impeller housing 1151 and exits the body 1100 of the humidifier 1000 through an air vent/opening 1113 provided at the upper end of the upper body section 1101 and into the nozzle 1600.

The nozzle 1600 is mounted on the upper end of the body 1100 over the air vent 1113 through which the humidified airflow exits the body 1100. Specifically, the nozzle 1600 comprises a neck/base 1601 that connects to the upper end of the body 1100 and has an open lower end which provides an air inlet 1602 for receiving the humidified airflow from the body 1100. The external surface of the base 1601 of the nozzle 1600 is then substantially flush with the outer edge of the upper annular flange 1155 of the upper body chassis 1150. The base 1601 of the nozzle 1600 therefore comprises a housing that covers/encloses any components of the humidifier 1000 that are provided on the uppermost surface of the body 1100, which in this embodiment is provided by the upper surface of the upper annular flange 1155.

In the illustrated embodiment, a number of electronic control circuits are mounted on the upper surface of the upper annular flange that extends radially away from the upper end of the upper body section. These control circuits 1111 are therefore housed within base 1601 of the nozzle 1600. In addition, an electronic display 1115 is also mounted on the upper annular flange 1155 of the upper body section 1101 and therefore housed within base 1601 of the nozzle 1600, with the display 1115 being visible through an opening or at least partially transparent window provided in the base 1601 of the nozzle 1600. Optionally, one or more additional electronic components may be mounted on the upper surface of the upper annular flange 1155 and consequentially housed within base 1601 of the nozzle 1600. For example, these additional electronic components may one or more wireless communication modules, such as Wi-Fi, Bluetooth etc., and one or more sensors, such as a humidity sensor, an infrared sensor, a dust sensor etc., and any associated electronics. Any such additional electronic components would then also be connected to one or more of the control circuits 1111.

The nozzle 1600 then further comprises a nozzle body 1603 having one or more air outlets 1604 through which the humidified air flow is emitted from the nozzle 1600 and therefore from the humidifier 1000. In the illustrated embodiment, the nozzle 1600 that has an elongate annular shape, often referred to as a stadium or discorectangle shape, and defines a correspondingly shaped bore 1605 having a height (as measured in a direction extending from the upper end of the nozzle 1600 to the lower end of the nozzle 1600) greater than its width (as measured in a direction extending between the side walls of the nozzle 1600), and a central axis (X). The nozzle body 1603 therefore comprises two parallel, straight side sections each adjacent a respective elongate side of the bore 1605, an upper curved section joining the upper ends of the straight sections, and a lower curved section joining the lower ends of the straight sections. The nozzle body 1603 then has a pair of air outlets 1604 that are each located on a respective elongate side of the nozzle body 1603 at the front of the nozzle body 1603.

Figure 38:
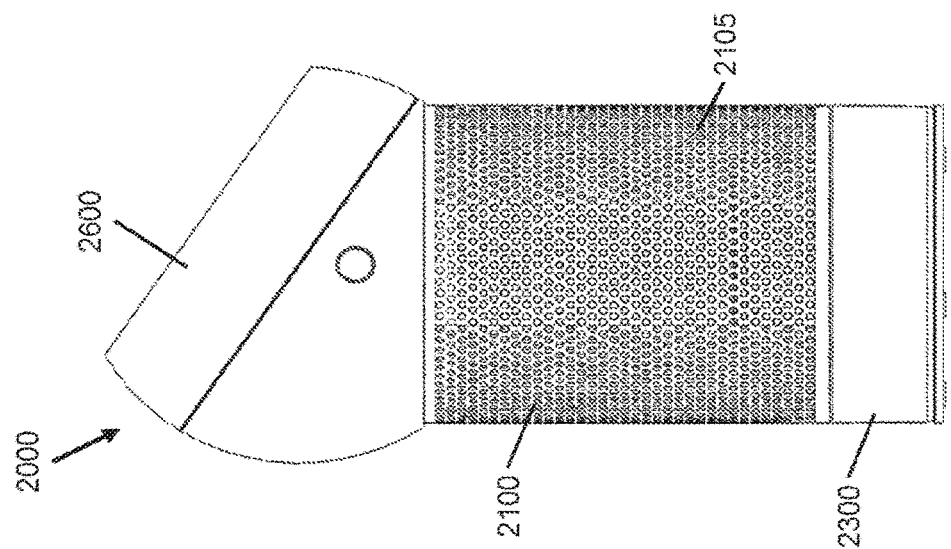
FIG. 38 is a side view of the humidifier of FIG. 37.
Figure 37:
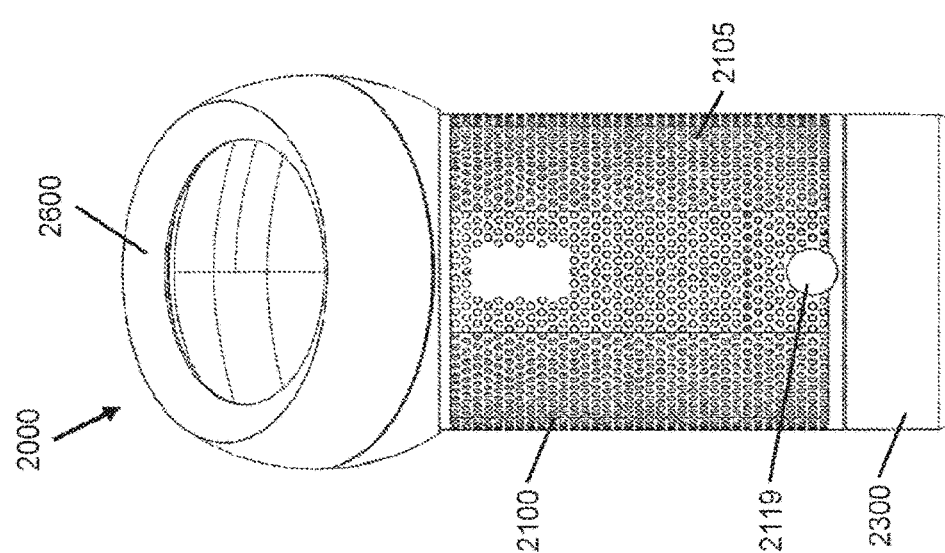
FIG. 37 is a front view of a second example of a humidifier as described herein.

FIGS. 37 and 38 are external views of second embodiment of a humidifier 2000. FIG. 37 shows a front view of the humidifier 2000 and FIG. 38 shows a side view of the humidifier 2000. The humidifier 2000 comprises a body or stand 2100 containing an air flow generator that is arranged to generate an air flow through the humidifier 2000, a moisture or water vapour source 2200 that is arranged to introduce water vapour into the air flow, a water supply system that is arranged to provide water to the moisture source and that is separable from the body 2100, and a nozzle 2600 mounted on the body 2100 that is arranged to emit the air flow from the humidifier 2000.

Figure 39:
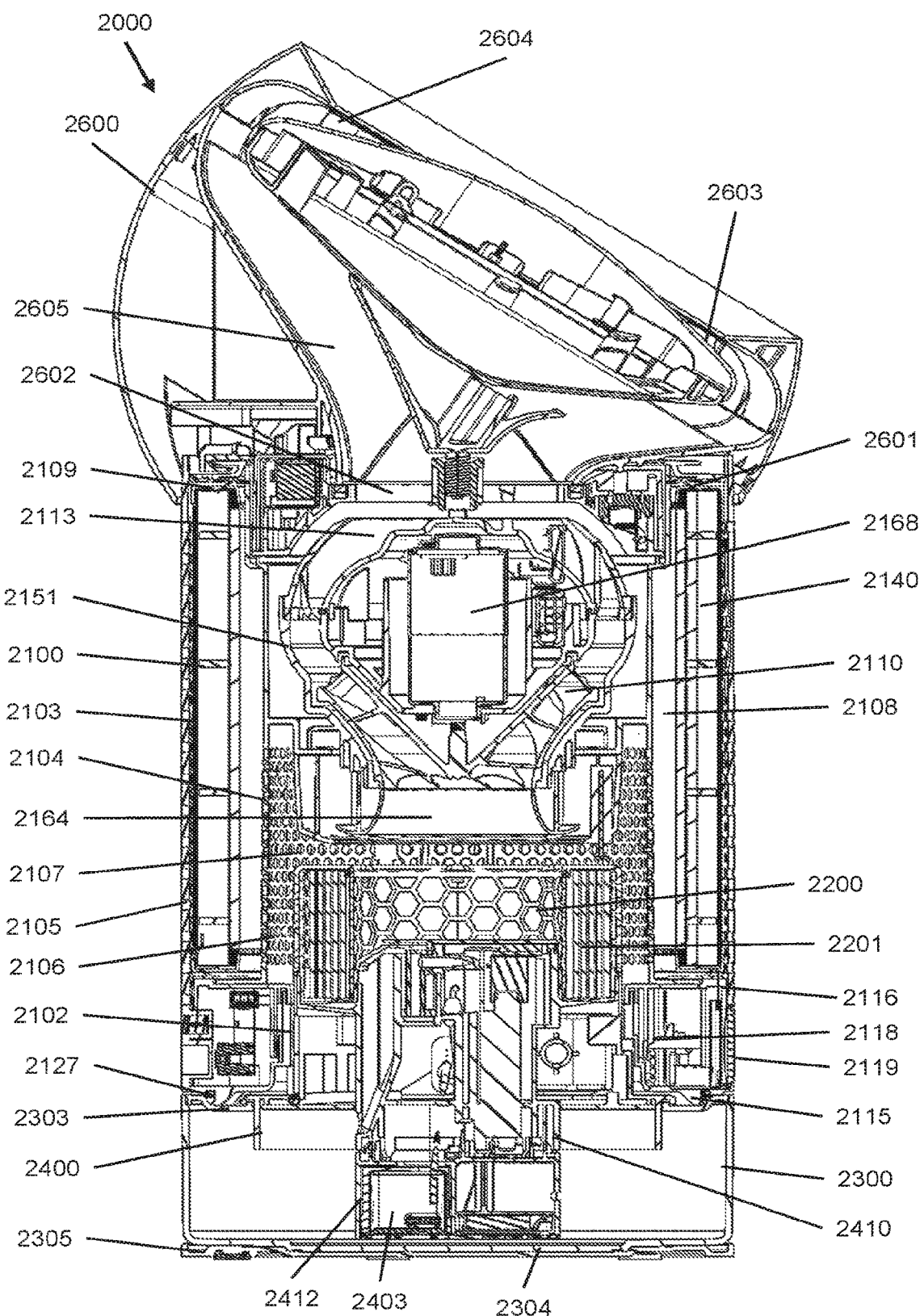
FIG. 39 is a sectional side view through the body of the humidifier of FIG. 38.

FIG. 39 shows a sectional side view through the body 2100 of the humidifier 2000. In the illustrated embodiment, the moisture source comprises an evaporator assembly or evaporative wick 2200 that is disposed within the air flowing through the humidifier 2000. In this second embodiment, the evaporator assembly 2200 comprises an arrangement of porous material 2201 that absorbs water supplied to it by the water supply system and provides a large surface area in order to allow the water to evaporate when the air flow passes through the evaporator assembly 2200 thereby introducing water vapour into the air flow.

The water supply system then comprises a water tank assembly that has a detachable/separable connection to the body 2100 of the humidifier 2000 and water supply pipework 2407 arranged to convey water to the evaporator assembly 2200. The water tank assembly comprises a water tank 2300 and a water pump 2403 that is arranged to be disposed within the water tank 2300 and to move water from the water tank 2300 to evaporator assembly 2200, through the water supply pipework 2407. Specifically, the water tank 2300 has a tank opening/aperture 2312 through which the water tank 2300 can be filled with water, and a removable tank cap or cover 2400 that is arranged to fit over and thereby occlude the tank opening 2312, with the water pump 2403 being provided in the removable tank cap 2400. In this second embodiment, the entirety of the water supply pipework 2407 is disposed within the water tank 2300. The water supply pipework 2407 can therefore be considered to be part of the water tank assembly.

Figure 40:
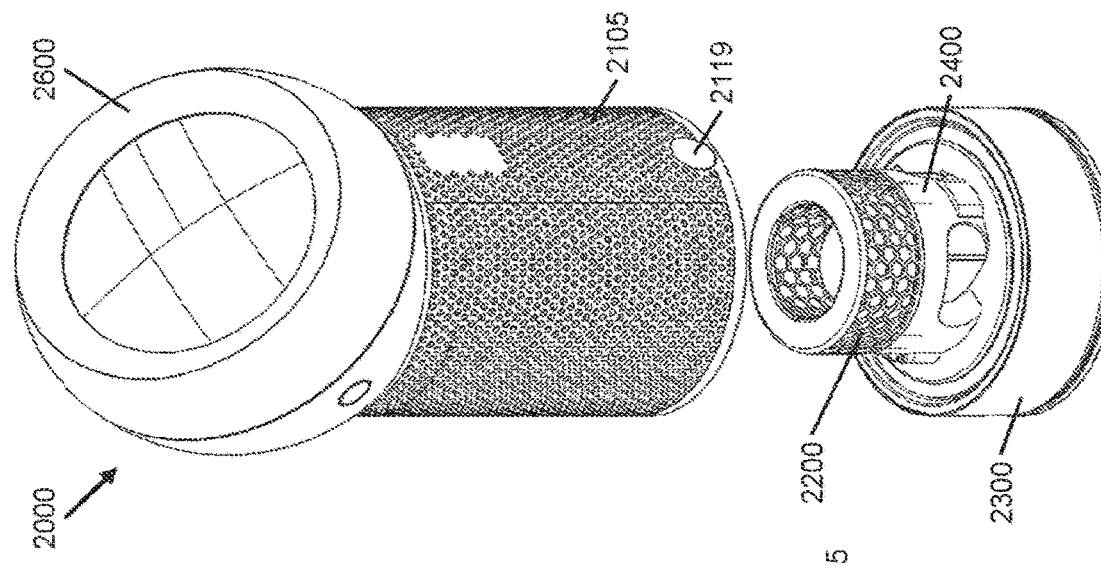
FIG. 40 is a perspective view of the humidifier of FIG. 37 with the water tank assembly separated from the body.

FIG. 40 shows a perspective view of the humidifier 2000 with the water tank assembly separated from the body 2100. In this second embodiment, the body 2100 of the humidifier 2000 comprises a casing 2101 that houses both the air flow generator and a filter assembly 2140 that is disposed upstream of the air flow generator. The nozzle 2600 is then mounted on the body 2100 downstream of both the air flow generator and the filter assembly 2140. The casing 2101 then also provides an opening 2102 through which the evaporator assembly 2200 can be disposed within the body 2100, with the evaporator assembly 2200 downstream of the filter assembly 2140 and upstream relative to the air flow generator, and such that evaporator assembly 2200 is disposed within the air flow passing through the body 2100. In contrast with the first embodiment, the humidifier 2000 of the second embodiment is arranged such that, in use, the body 2100 of the humidifier 2000 sits on top of the water tank assembly. The water tank assembly is therefore connected to the body 2100 of the humidifier 2000 by lowering the body 2100 of the humidifier 2000 on to the water tank assembly until a lower surface of the casing 2101 rests upon an upper surface of the water tank assembly. The water tank assembly is then disconnected/detached from the body 2100 of the humidifier 2000 by lifting the body 2100 of the humidifier 2000 away from the upper surface of the water tank assembly. In addition, rather than evaporator assembly 2200 being supported by the body 2100 of the humidifier 2000, in this second embodiment, the evaporator assembly 2200 is supported by the water tank assembly, on an upper surface of the water tank assembly, and is therefore disposed within the body 2100 of the humidifier 2000 when the water tank assembly is connected to the body 2100 of the humidifier 2000.

In particular, the casing 2101 comprises an outer casing section 2103 and an inner casing section 2104 that is disposed within the outer casing section 2103. The outer casing section 2103 comprises an air inlet 2105 through which air can flow into the body 2100 and thereby provides the air inlet 2105 of the humidifier 2000. The inner casing section 2104 then also comprises an air inlet 2106 through which air can flow into an inner cavity/compartment 2107 defined by the inner casing section 2104 and within which the air flow generator is disposed and into which the evaporator assembly 2200 can be inserted. A space between the outer casing section 2103 and the inner casing section 2104 then defines a filter cavity/compartment 2108 within which the filter assembly 2140 can be disposed such that the filter assembly 2140 is then downstream of the air inlet 2105 of the humidifier 2000 and upstream of the air flow generator. Consequently, air drawn into the interior of the body 1000 by air flow generator is filtered prior to passing through the air flow generator.

The outer casing section 2103 and the inner casing section 2104 are arranged such that they define an open-ended inner cavity/compartment 2107 with a first opening 2109 at an upper end of the body 2100 and a second opening 2102 at the lower end of the body 2000. The air flow generator is then disposed towards the upper end of the open-ended inner compartment 2107 with an air inlet 2164 of the air flow generator facing into the inner cavity/compartment 2107 and an air outlet 2113 of the air flow generator disposed within or adjacent to the first opening 2109 at the upper end of the body 2100. The second opening 2101 at the lower end of the body 2100 then allows the evaporator assembly 2200 to be inserted into the inner cavity/compartment 2107 defined by the inner casing section 2104.

As described above, in use the evaporator assembly 2000 is located on top of the water tank assembly with the water tank assembly then being connected to the body 2100 of the humidifier 2000 by lowering the body 2100 vertically onto the water tank assembly. Consequently, the evaporator assembly 2200 enters into the body 2100 of the humidifier 2000 through the second opening 2102 at the lower end of the body 2100, until a lower surface of the body 2100 rests upon an upper surface of the water tank assembly 2300, 2400. An interface/connection sealing element 2127 is then arranged to form a seal between the water tank assembly and the body 2100 that prevents that prevents the leakage of air into the body 210X) of the humidifier 2000 (i.e. from outside the humidifier 2000). In particular, the interface sealing element 2127 is arranged to form a seal around the interface between the water tank assembly and the body 2100 of the humidifier 1000.

In this second embodiment, the interface/connection sealing element 2127 is therefore arranged to form a seal between an upper surface of the water tank 2300 and a lower surface of the body 2100 of the humidifier 2000. Specifically, the interface/connection sealing element 2127 is provided by a closed loop of a resilient material (e.g. rubber) that is mounted on to a lower surface on the body 2100 and is arranged to contact and be compressed by an upper surface of the water tank 2300 when the body is supported on the water tank 2300.

In the embodiment illustrated in FIG. 39, both the outer casing section 2103 and the inner casing section 2104 are cylindrical. The inner casing section 2104 has a smaller diameter than the outer casing section 2103 and is disposed concentrically within the outer casing section 2103 such that they define an annular space between them which thereby provides the filter compartment 2108 within which the filter assembly 2140 can be disposed. The lower end of the filter compartment 2108 is closed and provides a shelf upon which the filter assembly 2140 is supported when disposed within the filter compartment 2108. The upper end of the filter compartment 2108 is then open and thereby provides that a cylindrical filter assembly 2140 can be disposed within the filter compartment 2108 by lowering this into the filter compartment 2108 through the opening 2109 at the upper end. The closed lower end of the filter compartment 2108 is then also provided with a lower filter sealing element 2111 that forms a seal between a lower surface of the filter assembly 2140 and the body 2100 of the humidifier 200 when the filter assembly 2140 is disposed within the filter compartment 2108 and thereby prevents air from leaking between the lower surface of the filter assembly 2140 and the body 2100 of the humidifier 2000. The nozzle 2600 then comprises an upper filter sealing element 2601 that is arranged such that, when the nozzle 6000 is attached to the body 2100 of the humidifier 2000, the upper filter sealing element 2601 contacts both an upper surface of the filter assembly 2140 and an inner surface of the body 2100 to prevent leakage of air around the top end of the filter assembly 2140.

Figures 41, 42:
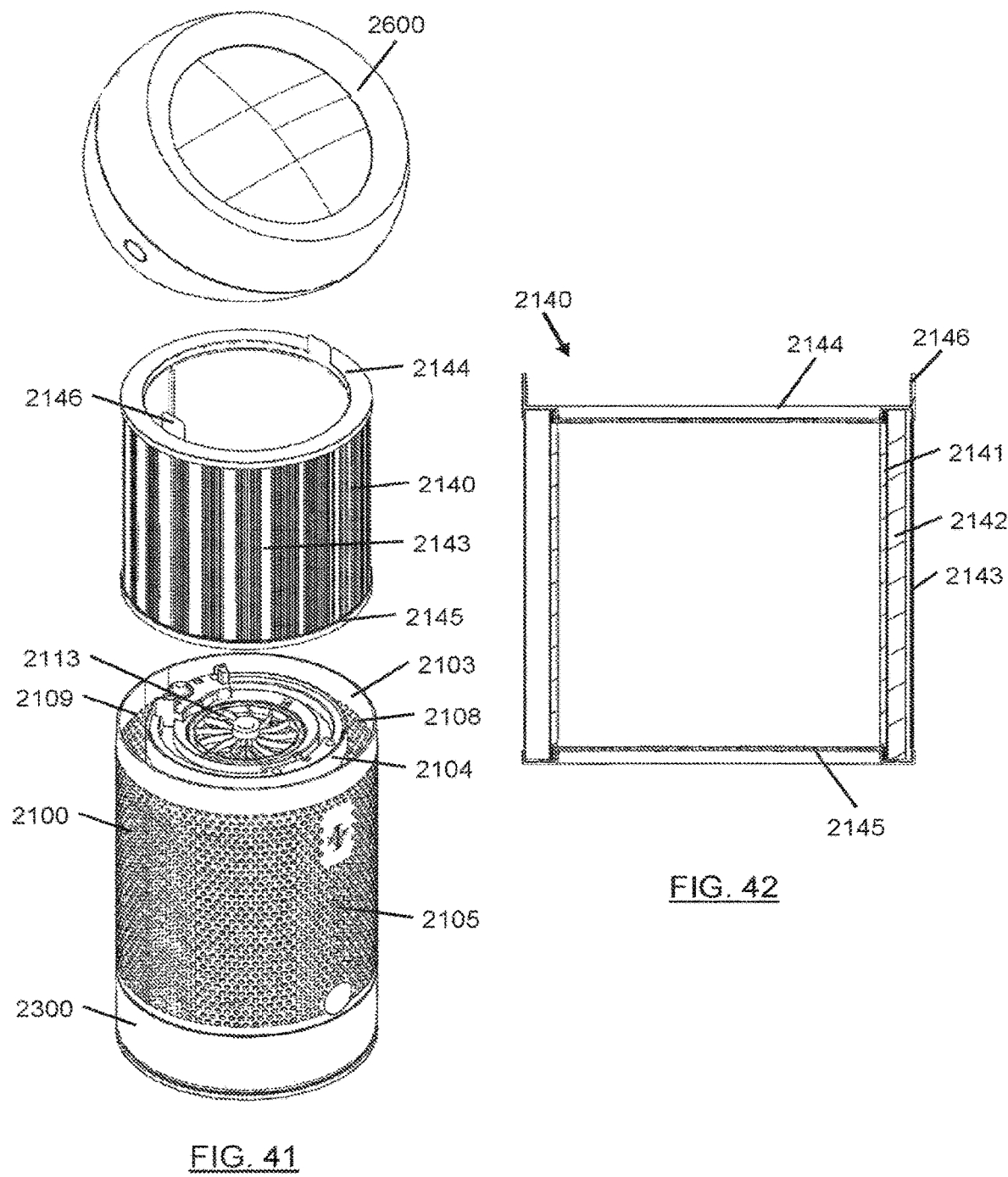
FIG. 41 is a perspective view of the humidifier of FIG. 37 with the filter assembly separated from the body.
FIG. 42 is sectional view side through a filter assembly suitable for use with the humidifier of FIG. 37.

FIG. 41 shows a perspective view of the humidifier 2000 with the filter assembly 2140 separated from the body 2100. FIG. 42 then shows a sectional view side through a filter assembly 2140 suitable for use with the humidifier 2000. In the illustrated embodiment, the filter assembly 2140 comprises a chemical filter media layer 2141, a particulate filter media layer 2142 disposed over the outer face of the chemical filter media layer 2141 and therefore upstream of the chemical filter media layer 2141, and an outer mesh layer 2143 disposed over the outer face of the particulate filter media layer 2142 and therefore upstream of the particulate filter media layer 2142. A first end cap 2144 is then disposed over a first end of each of the particulate filter media layer 2142, the chemical filter media layer 2141 and the outer mesh layer 2143, whilst a second end cap 2145 is disposed over a second end of each of the particulate filter media layer 2142, the chemical filter media layer 2141 and the outer mesh layer 2143. For example, the particulate filter media 2142 could comprise a pleated polytetrafluoroethylene (PTFE) or glass microfiber nonwoven fabric, whilst the chemical filter media 2141 could comprise an activated carbon filter media such as a carbon cloth. The filter end caps 2144, 2145 could then be moulded from a plastic material and attached/adhered to the ends of the filter media using an adhesive. In a preferred embodiment, one of the filter end caps 2144 further comprises one or more tabs 2146 that project longitudinally away from the filter end cap 2144 and that can therefore be gripped by a user to assist in lifting the filter assembly 2140 out of the annular filter compartment 2108.

The air inlet 2105 into the body 2100 of the humidifier 200W then comprises an array of apertures formed in the outer casing section 2103 that therefore allow air to enter the humidifier 2000 by passing through the outer casing section 2103 into the filter compartment 2108. The inner casing section 2104 is then also formed with an array of apertures that therefore allow air to exit the filter compartment 2108 and enter into the inner compartment 2107 defined by the inner casing section 2104. The inner casing section 2104 then further comprises a ledge/shelf 2114 then extends radially inwardly from the inner casing section 2104, above the array of apertures formed therein, with the air flow generator then being supported by the shelf 2114 within the inner compartment 2107. In this second embodiment, the air flow generator is provided by a motor-driven impeller 2110 that is housed within an impeller housing 2151, with the impeller housing 2151 then being supported on the shelf 2114 towards an upper end of the casing 2101. Both the motor-driven impeller 2110 and the impeller housing 2151 are substantially the same as that of the first embodiment described above and have therefore not been further described. Whilst the air inlets 2105, 2106 of this second embodiment are each provided by an array of apertures, these air inlets 2105, 2106 could alternatively comprise one or more grilles or meshes mounted within windows formed in the corresponding casing section.

In the embodiment illustrated in FIG. 39, the casing 2101 also provides an electronics compartment within which various electronic components of the humidifier 2000 are housed. Specifically, the lower end of the outer casing section 2103 is provided with an annular tray 2115 that extends radially inward from the outer casing section 2103 and is disposed beneath the filter compartment 2108. Various electronic components of the humidifier 2000 are then supported within the annular tray 2115 which is then covered by an annular cover 2116 that sits over and separates the electronics from the rest of the humidifier 2000. The annular cover 2116 and the annular tray 2115 thereby define the electronics compartment. For example, the electronic components housed within the electronics compartment typically comprise one or more control circuits 2118, power supply connections, and one or more sensors, such as an infrared sensor, a dust sensor etc. In addition, the electronics compartment could also house one or more wireless communication modules, such as Wi-Fi, Bluetooth etc., and any associated electronics. The electronics compartment may also contain an electronic display 2119 that is visible through an opening or at least partially transparent window provided towards the lower end of the outer casing section 2103. In the illustrated embodiment, the electronic display 2119 is provided by an LCD display that is mounted within the electronics compartment and aligned with a transparent window provided in the outer casing section 2103.

In the embodiment illustrated in FIG. 39, the lower surface of the annular tray 2115 also forms the lower surface of the body 2100 and thereby provides an annular base 2120 (i.e. lower surface) upon which the body 2100 rests/is supported and also defines the second opening 2102 at the lower end of the body 2100 through which the evaporator assembly 2200 enters into the body 2100 of the humidifier 2000 (i.e. into the inner compartment 2107 of the body 2100). The interface sealing element 2127 is therefore disposed on the annular base 2120 of the body 2100.

Figure 43:
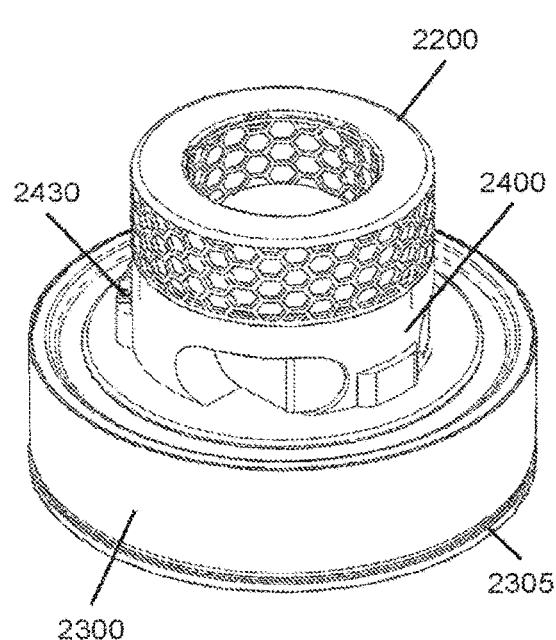
FIG. 43 is a front perspective view of the water tank assembly of the humidifier of FIG. 37 with the evaporator assembly.

As described above, when in use the evaporator assembly 2200 is located on top of the water tank assembly, with the water tank assembly then being connected to the body 2100 of the humidifier 2000 by lowering the body vertically onto the water tank assembly. FIG. 43 shows a perspective front view of the water tank assembly with the evaporator assembly 2200 supported on an upper surface of the water tank assembly.

Figure 44:
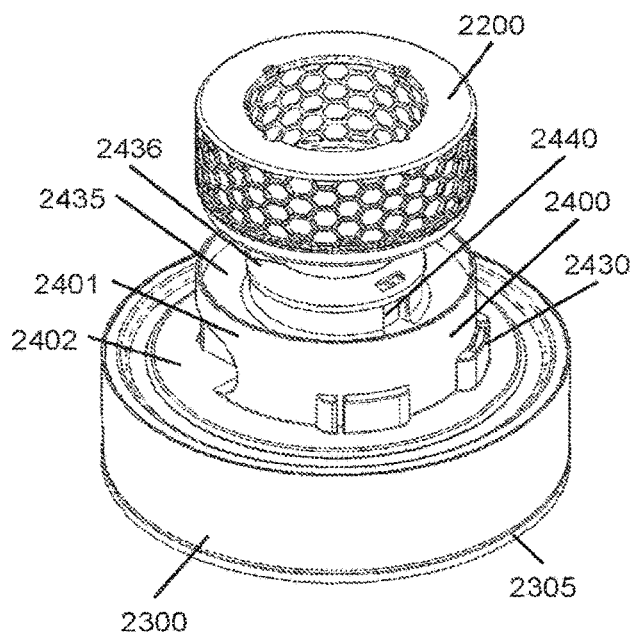
FIG. 44 is a rear perspective view of the water tank assembly of FIG. 43 with the evaporator assembly separated from the water tank assembly.
Figure 45:
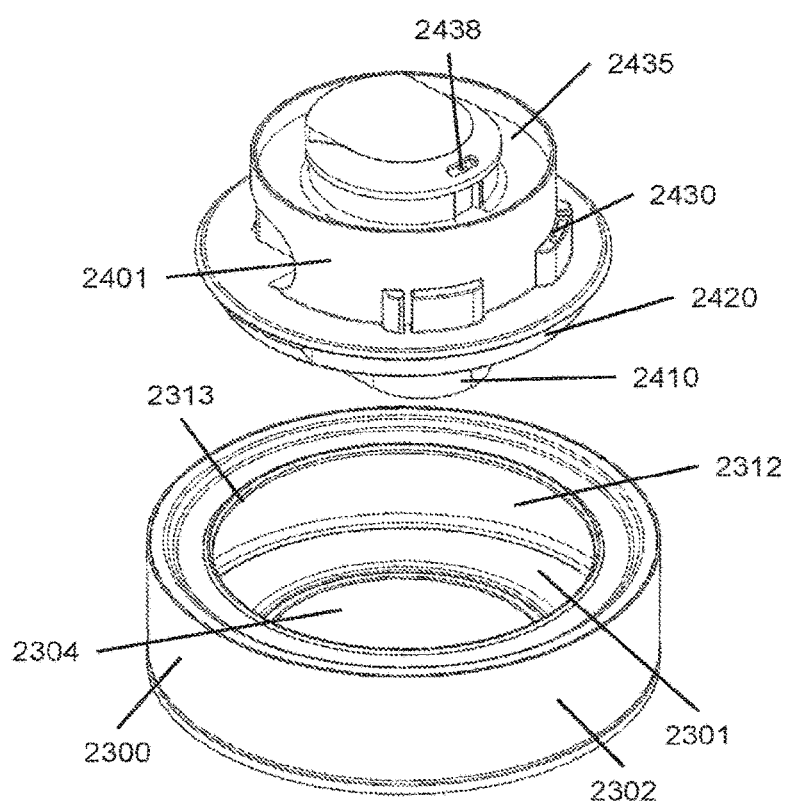
FIG. 45 is a rear perspective view of the water tank assembly with the removable tank cap separated from the water tank.

FIG. 44 then shows a perspective rear view of the water tank assembly with the evaporator assembly 2200 separated from the water tank assembly. FIG. 45 then shows a perspective rear view of the water tank assembly with the removable tank cap 2400 separated from the water tank 2300.

In the embodiment illustrated in FIGS. 37 to 45, the body 2100 of the humidifier 1000 is generally cylindrical in shape and is arranged to be supported by an upper surface of the water tank assembly. The water tank assembly then comprises a generally cylindrical water tank 2300 that is shaped to substantially correspond to the shape of the body 2100 of the humidifier 2000 and thereby provide an aesthetically appealing appearance but also provide a visual indication that the body 2100 of the humidifier 3000 is correctly aligned with the water tank assembly when lowering the body 2100 of the humidifier 2000 onto the water tank assembly. The water tank 2300 therefore comprises a generally circular floor 2301 and a cylindrical side wall 2302 that is arranged to be substantially flush/level with the outer surface of the body 2100 of the humidifier 2000 when the body of the humidifier 2000 is supported by an upper surface 2303 of the water tank assembly. The circular floor 2301, the cylindrical side wall 2302 and the upper surface 2303 of the water tank 2300 therefore have substantially the same radius as the outer surface of body 2100 of the humidifier 2000. It is preferable that at least the side wall 2302 of the water tank 2300 is formed from a transparent material to allow the user to visually determine the level of water in the water tank 2300. It is also preferable that at least the floor 2301 and side wall of the water tank 2302 are integrally formed in order to minimise the risk that water could leak from the water tank 2300.

The upper surface 2303 of the water tank 2300 is then provided with the tank opening 2312 through which the water tank 2300 can be filled with water. In addition, and as will be described in more detail below, the tank opening 2312 is sufficiently large to allow the evaporator assembly 2200 to be inserted into the water tank 2300, with the water tank 2300 also being sufficiently deep to allow the evaporator assembly 2200 to be fully contained within the water tank 2300 when inserted through the tank opening 2312. In the illustrated embodiment, the tank opening 2312 is circular and is provided at the centre of the upper surface 2303 of the water tank 2300 such that the upper surface 2303 is then generally annular in shape. The floor 2301 of the water tank 2300 then also has a recessed or sunken portion 2304 that is aligned with the tank opening 2312 in order to ensure that water within the water tank 2300 flows towards the area of the water tank 2300 in which the pump 2403 is located when the removable tank cap 2400 is disposed on the water tank 2300. The water tank 2300 then further comprises a base plate 2305 that is attached to the bottom of the water tank 2300 to provide a stable lowermost surface for the water tank 2300 and the humidifier 2000 whilst also protecting the bottom of the water tank 2300.

As described above, the water tank assembly further comprises the removable tank cap 2400 that is arranged to fit over and thereby occlude the tank opening 2312. The tank cap 2400 is therefore releasably retained on the water tank 2300 so that the tank cap 2400 can be removed to allow the supply of water in the water tank 2300 to be replenished. FIG. 46 therefore shows a front view of the tank cap 2400 whilst FIG. 47 shows a perspective rear view of the tank cap 2400. In the illustrated embodiment, the tank cap 2400 comprises a lid portion 2401 that is generally cylindrical in shape with a flange 2402 that projects radially outward from periphery of the lid portion 2401. A rim 2420 projects downwardly from the periphery of the lid portion 2401, with this rim 1403 being arranged to fit closely around the outside of a corresponding rim 2313 that projects upwardly from the periphery of the tank opening 2312 to thereby locate and align the tank cap 2400 over the opening 2312. The tank cap 2400 is also provided with a tank cap sealing element 2404 that is arranged to form a seal against the water tank 2300 when the tank cap 2400 is disposed on the water tank 2300 and thereby prevent the leakage of air through the tank opening 2312 into the water tank 2300. In the illustrated embodiment, the tank cap sealing element 2404 is provided by an annular seal formed from a resilient material, such as a rubber, and is disposed on the underside of the tank cap 2400 (i.e. beneath the lid portion) adjacent to the inside of the rim 2420 so that the tank cap sealing element 2404 contacts and forms a seal against the upward rim 2313 provided around the periphery of the tank opening 2312.

The tank cap 2400 is then releasably retained on the water tank 2300 by a tank cap retaining mechanism. The tank cap retaining mechanism has a first configuration in which the tank cap 2400 is retained on the water tank 2300 and a second configuration in which the tank cap 2400 is released for removal from the water tank 2300. The tank cap retaining mechanism is also arranged to biased towards the first configuration such that the tank cap retaining mechanism retains the tank cap 2400 on the water tank 2300 unless placed into the second configuration by a user. In the illustrated embodiment, the tank cap comprises a pair of tank cap retaining mechanisms provided on opposite sides of the tank cap. Each of these tank cap retaining mechanisms comprises a retention element 2406*a*, 2406*b* in the form of a catch that is moveable relative to the tank cap 2400 between the first configuration and the second configuration. Each of these tank cap retaining mechanisms then further comprise a manually actuable member 2408*a*, 2408*b* for effecting movement of the retention element 2406*a*, 2406*b* from the first configuration to the second configuration. Specifically, each manually actuable member 2408*a*, 2408*b* takes the form of a button that is accessible to the user on the lid portion 2401 of the tank cap 2400 (i.e. above the flange 2402) such that these buttons can be pressed by a user in order to actuate the retention elements 2406*a*, 2406*b* to release the tank cap 2400 from the water tank 2300. The retention elements 2406*a*, 2406*b* are then diametrically opposed and project radially outward below the flange 2402 of the lid portion 2401. The retention elements 2406*a*, 2406*b* are therefore arranged such that they are obstructed by an edge of the tank opening 2312 (i.e. the upper surface 2303 of the water tank 2300) when the tank cap 2400 is disposed on the water tank 2300 with these tank cap retaining mechanisms in the first configuration, thereby preventing separation of the tank cap 2400 from the water tank 2300, and such that the retention elements 2406*a*, 2406*b* are clear of/unobstructed by the edge of the tank opening 2312 when the tank cap 2400 is disposed on the water tank 2300 with the tank cap retaining mechanisms in the second configuration, thereby allowing separation of the tank cap 2400 from the water tank 2300.

Figure 51:
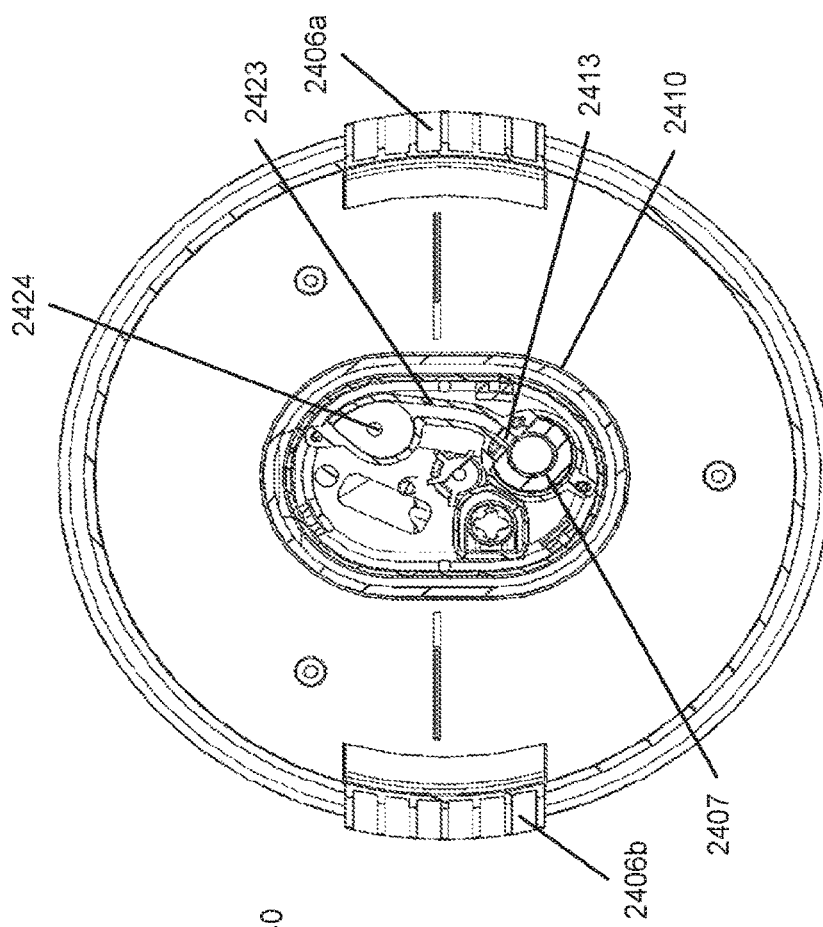
FIG. 51 is a perspective view of the pump system of the tank cap of FIG. 46.
Figure 50:
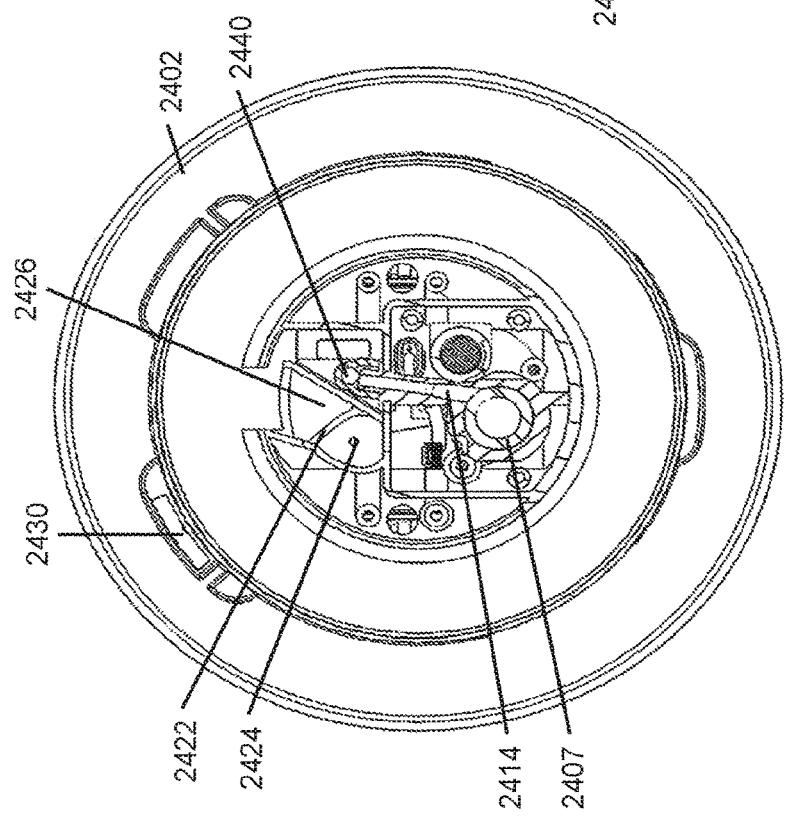
FIG. 50 is a sectional top view of the tank cap of FIG. 46.

As described above, the tank cap 2400 provides the water pump 2403 that is arranged to be disposed within the water tank 2300 and to move water from within the water tank 2300 to evaporator assembly 2000, through a water supply outlet 2440 provided towards the top of the tank cap 2400. FIG. 48 shows a sectional side view of the tank cap 2400, whilst FIG. 49 shows a sectional perspective view of the tank cap 2400. In the illustrated embodiment, the tank cap 2400 further comprises a column 2410 that projects downwardly from the tank cap 2400 (i.e. beneath the lid portion 2401) such that when the tank cap 2400 is located on the water tank 2300 the column 2410 extends into the interior of the water tank 2000 with the bottom of the column 2410 adjacent to the floor 2301 of the water tank 2300. FIG. 50 then shows a sectional top view through the tank cap 2400, whilst FIG. 51 shows a sectional bottom view through the column of the tank cap 2400. The bottom of the column 2410 is then provided with a pump housing inlet 2411 that allows water to enter a pump housing portion 2412 of the column 2410, with the pump 2403 then being provided within the pump housing 2412 at the bottom of the column 2410, immediately above the pump housing inlet 2411. An outgoing water supply pipe 2407 is then arranged to convey water from the pump 2403 to the water supply outlet 2440 provided towards the top of the tank cap 2400.

The column 2410 then also contains an ultraviolet (UV) disinfection system that is arranged to irradiate the water with UV light as it is pumped from the water tank 2300 to the body 2100 of the humidifier 2000. The UV disinfection system of this second embodiment comprises a UV light source 2409 arranged to irradiate the water passing through the outgoing water supply pipe 2407. Specifically, the UV light source 2409 is arranged to irradiate the water passing through the outgoing water supply pipe 2407 with short-wavelength UVC light (i.e. 100 to 280 nm). The outgoing water supply pipe 2407 is then arranged such that the inner surface is capable of reflecting the UV light generated by the UV light source 2409.

The outgoing water supply pipe 2407 comprises a tube of material that is capable of reflecting the UVC light with a lateral water inlet 2413 provided adjacent to a lower end of the tube and a lateral water outlet 2414 provided adjacent to an upper end. In the illustrated embodiment, the lateral water outlet 2414 comprises an aperture formed in the side of the tube at the upper end and a channel that extends away from the aperture in a direction that is tangential relative to the hollow centre of the tube of ultraviolet reflective material (i.e. in a direction that is tangential to an inner surface of the tube). In this regard, the term "tangentially" is used herein to describe the water outlet 2414 as being arranged such that the water flowing through the water outlet 2414 flows in a direction that is tangential to the inner surface of the tube. The UV light source 2409 then comprises a single UV LED disposed at the upper end of the tube that is arranged to longitudinally irradiate the interior of the tube through an upper UV transparent window 2415 (e.g. quartz glass) provided at the upper end of the tube. The tangential arrangement of the water outlet 2414 ensures that the flow of water out of the tube creates a vortex within the tube which prevents bubbles from forming on the upper UV transparent window 2415 and thereby improves the performance of the disinfection system. In addition, the creation of a vortex within the tube ensures that the cleaning cycle removes mineral deposits from the UV transparent window 2415.

In this second embodiment, the outgoing water supply pipe 2407 comprises an integrally formed tube of a UV reflective material having an open upper end 2416, a hollow bore/centre 2417, and a closed lower end 2418. Specifically, the outgoing water supply pipe 2407 comprises an integrally formed tube of a polytetrafluoroethylene (PTFE), and preferably consists of unadulterated (i.e. pure/virgin) PTFE. The surface of the hollow centre 2417 of the tube has an ISO roughness grade of approximately N5 (i.e. an Ra of approximately 0.4 µm). However, the surface of the hollow centre 2417 of the tube could have an ISO roughness grade of from N8 to N1 (i.e. an Ra of from 3.2 µm to 0.025 µm), and preferably of from N7 to N4 (i.e. an Ra of from 1.6 µm to 0.2 µm).

The tube of a UV reflective material is manufactured by compression moulding a powder of the UV reflective material to form a solid bar or rod of UV reflective material. Preferably, the solid bar is formed from a powder of PTFE consisting of PTFE particles having a diameter of less than 100 microns, preferably less than 50 microns and more preferably less than 40 microns. A material removal process (e.g. subtractive manufacturing such as machining, boring, drilling) is then used on the solid bar to form the tube having an open end 2416, a hollow bore/centre 2417, and a closed end 2418. A material removal process is also used in order to form a first aperture in a side of the tube adjacent to the closed end and a second aperture in the side of the tube adjacent the open end. The first aperture then forms part of the lateral water inlet 2413, whilst the second aperture forms part of the lateral water outlet 2414.

The column 2410 also contains a flow regulator of the pump system that is arranged to ensure that the flow rate of water through the UV disinfection system does not exceed a pre-defined maximum, thereby ensuring that a minimum level of disinfection of the water flowing through the outgoing water supply pipe 2407 is maintained. Specifically, the flow regulator is provided by a receptacle 2421 that is arranged to receive water from the pump 2403 and that is fluidically connected to the inlet 2413 provided at the lower end of the water supply pipe 2407. The upper end of the receptacle 2421 is then provided with a crest/brim 2422 that allows excess water to flow out of the receptacle 2421 and back into the water tank 2300, such that the receptacle 2421 can be considered to act as a weir. The receptacle 2421 then further comprises a restriction 2427, with this restriction 2427 being arranged such that the water received by the receptacle 2421 must flow through the restriction 2427 before passing over the crest/brim 2422 of the receptacle 2421. By configuring the water pump 2403 to operate at a flow rate that ensures a constant flow of water over the weir provided by the flow regulator, the flow rate of the water received by the outgoing water supply pipe 2407 is then regulated by a combination of the height of the crest/brim 2422 of the receptacle 2421 and the size of the restriction 2427. Specifically, any fluctuations in the flow rate of the water received from the water pump 2403 (e.g. due to a reduction in the height of the water in the tank 2300, fluctuations in the performance of the water pump 2403 etc.) are then consumed by fluctuations in the volume of water flowing over the weir provided by the flow regulator such that the flow rate of the water received by the outgoing water supply pipe 2407 remains substantially constant.

In the illustrated embodiment, the receptacle 2421 comprises a flow regulation chamber provided within the column 2410 that is connected to the inlet 2413 provided at the lower end of the outgoing water supply pipe 2407 by a channel or manifold 2423 that extends from the lower end of the chamber. The outlet of the pump 2403 is then connected to an inlet 2424 provided at the bottom of the flow regulation chamber, whilst the crest/brim 2422 comprises an outlet provided at the top of the flow regulation chamber through which water exits the flow regulation chamber into a drain 1426 through which water can flow back into the water tank 13M via an overflow spillway. The crest/brim 2422 is then displaced vertically relative to the outlet 2414 of the outgoing water supply pipe 2407 (i.e. when the tank cap 2400 is disposed on the water tank 2300). In particular, the crest/brim 2422 of the receptacle 2421 is lower than the outlet 2414 of the outgoing water supply pipe 2407. The restriction 2427 then comprises an orifice plate disposed between the inlet 2424 of the flow regulation chamber and the crest/brim 2422, with the orifice plate comprising a wall/barrier that extends across the flow regulation chamber with a restriction orifice formed in the wall/barrier.

The lid portion 2401 of the tank cap 2400 is then provided with a tank-to-body connector 2430 that is arranged to connect to a corresponding body-to-tank connector 2121 provided on the body 2100 of the humidifier 2000. The tank-to-body connector 2430 is arranged to be substantially parallel with the direction in which the body 2100 of the humidifier 2000 is disposed on the water tank 2300 (i.e. axially relative to the body 2100), and is directed/faces upwards, so that the tank-to-body connector 2430 mates and/or connects with the corresponding body-to-tank connector 2121 provided on the body 2100 of the humidifier 2000 during lowering of the body 2100 of the humidifier 2000 on to the water tank 2300. In this second embodiment, the tank-to-body connector 2430 comprises electrical connectors 2431 for receiving electrical power from the body 2100 of the humidifier 2000 and for communicating with control circuitry 2118 provided in the body 2100 of the humidifier 2000. The electrical connectors 2431 provided by the tank-to-body connector 2430 are therefore arranged to contact/engage with corresponding electrical connectors 2122 provided by the body-to-tank connector 2121.

Figure 53:
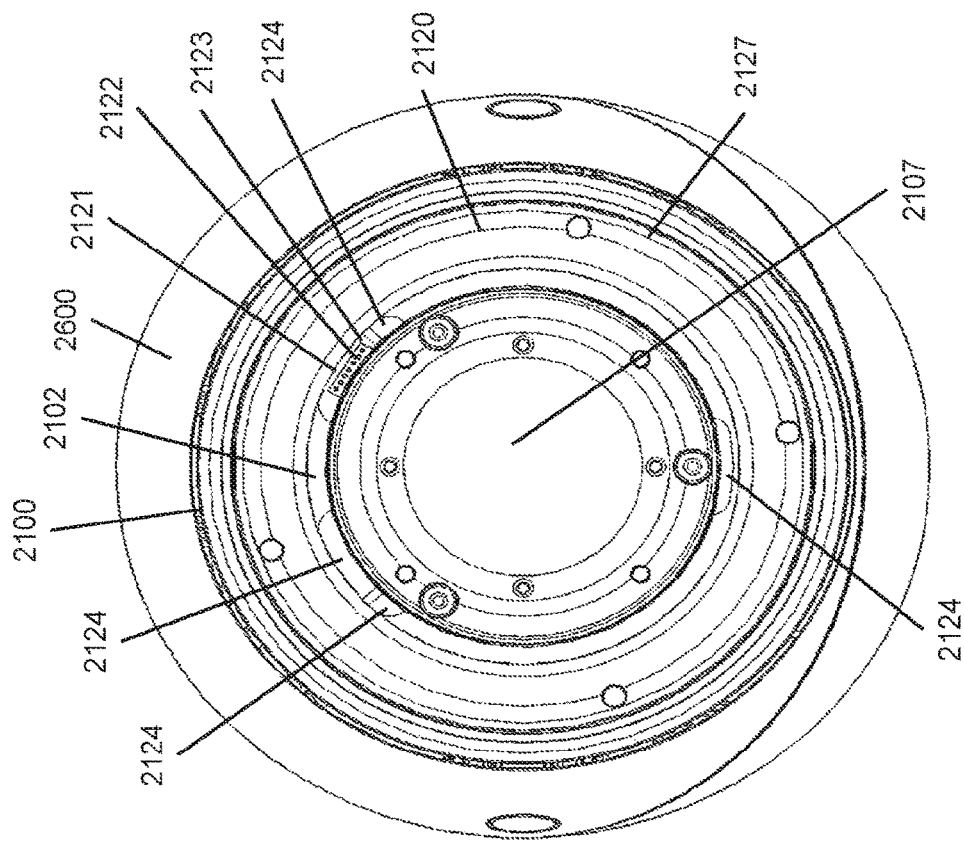
FIG. 53 is a bottom view of the body of the humidifier of FIG. 37.
Figure 52:
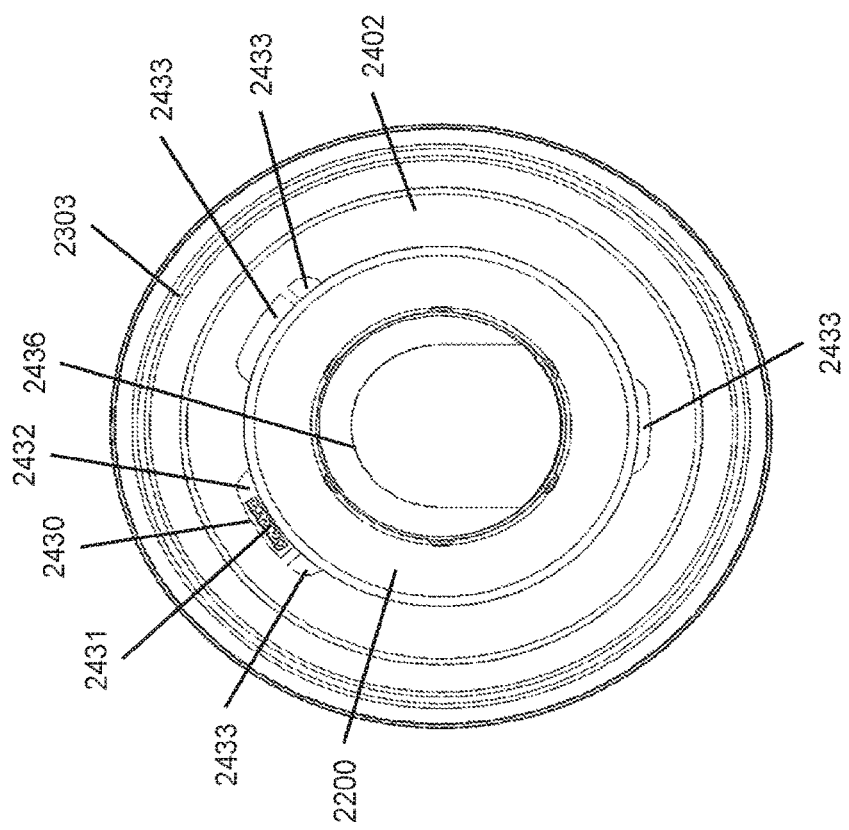
FIG. 52 is a top view of the water tank assembly of the humidifier of FIG. 37 with the evaporator assembly disposed on the tank cap.

FIG. 52 shows a top view of the water tank assembly with the evaporator assembly 2200 disposed on an upper surface of the tank cap 2400, whilst FIG. 53 shows a bottom view of the body 2100 of the humidifier 2000. In the illustrated embodiment, the tank-to-body connector 2430 comprises a connector housing 2432 that projects radially outward from the periphery of the lid portion 2401 of the tank cap 2400. A plurality of contact pad electrical connectors 2431 are then exposed at an upper surface of the connector housing 2432. Electrical wiring from the column 2410 of the tank cap 2400 then enters the connector housing 2432 and connects to the inner ends of the contact pad electrical connectors 2431. The body-to-tank connector 2121 then comprises a connector enclosure 2123 that projects radially inward from the electronics compartment provided at the lower end of body 2100 of the humidifier 2000. A plurality of male-ended electrical connectors 2122 project downwardly from the connector enclosure 2123. Electrical wiring from the electronics compartment of the body 2100 of the humidifier 1000 then enters the connector enclosure 2123 and connects to the inner ends of the plurality of male-ended electrical connectors 2122.

The tank cap 2400 is then then also provided with a plurality of alignment features 2433 that are arranged to cooperate with a plurality of corresponding alignment features 2124 provided on the body 2100 of the humidifier 2000 to ensure that the body 2100 of the humidifier 2000 can only be disposed on the water tank in an orientation that aligns the tank-to-body connector 2430 with the body-to-tank connector 2121. In the illustrated embodiment, the tank cap 2400 is provided with a plurality of alignment features 2433 in the form a plurality of protrusions that project radially outward from the external periphery of the lid portion 2401 of the tank cap 2400, with these protrusions being distributed irregularly around the periphery of the lid portion 2401 of the tank cap 2400. The body 2100 of the humidifier 2000 is then provided with a plurality of corresponding alignment features 2124 in the form a plurality of recesses that extend radially outward into the internal periphery of the lower end of body 2100 of the humidifier 2000, with the sizes and distribution of these recesses around the periphery of the lower end of body 2100 of the humidifier 2000 matching that of the protrusions provided on the lid portion 2401 of the tank cap 2400.

In the embodiment illustrated in FIGS. 37 to 53, the evaporator assembly 2200 is arranged to sit upon an evaporator tray 2435 provided by an upper surface of the removable tank cap 2400. In particular, the evaporator tray 2435 of the tank cap 2400 is arranged to support the evaporator assembly 2200 so that it extends upwardly away from the tank cap 2400. Consequently, when the water tank assembly is connected to the body 2100 of the humidifier 2000, the evaporator assembly 2200 is disposed within the air flowing through the inner cavity/compartment 2107 defined by the body 2100 of the humidifier 2000. In addition, the evaporator tray 2435 of the tank cap 2400 is arranged to support the evaporator assembly 2200 so that water pumped from the water tank 2300 is supplied to the evaporator assembly 2200 and so that any water that drains from the evaporator assembly 2200 is received by the evaporator tray 2435 and conveyed back to the water tank 2300.

In the second embodiment, the water supply outlet 2440 is arranged such that water pumped from the water tank 2300 by the water pump 2403 is supplied into the evaporator tray 2435. The water supply outlet 2440 is then also arranged such that, when the water pump 2403 ceases pumping water (i.e. is turned off), the water supply outlet 2440 functions as a siphon to convey any water remaining within the evaporator tray 2435 back to the water tank 2300. Consequently, the evaporator assembly 2200 is arranged such that, when disposed upon the evaporator tray 2435, the lower end of the evaporator assembly 2200 is immersed within water supplied to the evaporator tray 2435 by the water pump 2403. The evaporator tray 2435 therefore provides a reservoir for water received from the water supply system, with the water contained within the evaporator tray 2435 then being drawn up through the porous material of the evaporator assembly 2200.

In the illustrated embodiment, the evaporator tray 2435 is provided at the top of the lid portion 2401 of the tank cap 2400 and comprises a generally annular trough section 2435a that slopes downwardly towards a central axis of the evaporator tray 2435 (i.e. radially inward). Within the centre of the annular trough section 2435a, the evaporator tray 2435 then further comprises a sink section 2435b that is fluidically connected to the trough section 2435a and a drain 2426 that extends through the tank cap 2400 that allows excess water in the evaporator tray 2435 to flow back into the water tank 2300. The water supply outlet 2440 then comprises a pipe that extends downwardly from the lateral water outlet 2414 of the outgoing water supply pipe 2407, with an open end of the water supply outlet 2440 disposed adjacent to and facing toward the surface of the sink section 2435b. An overflow wall 2426a then separates the drain 2426 from both the trough section 2435a and the sink section 2435b of the evaporator tray 2435 in order to ensure that the level of water in the trough section 2435a of the evaporator tray 2435 can reach sufficiently high to immerse the lower end of the evaporator assembly before overflowing into the drain 2426. The evaporator tray 2435 is then also provided with an outer wall 2435c that extends upwardly from the outer edge of the trough section 2435a. The outer wall 2435c provides an evaporator seat upon which the evaporator assembly 2200 can rest when disposed upon the evaporator tray 2435.

In the illustrated embodiment, the lid portion 2401 of the tank cap 2400 then further comprises a generally cylindrical water supply enclosure 2436 that covers the top of the column 2410 and thereby covers the UV light source 2409, the water supply outlet 2440 and the sink section 2435b of the evaporator tray 2435. The water supply enclosure 2436 is disposed centrally at the top of the lid portion 2401 of the tank cap 2400 such that the trough section 2435a of the evaporator tray 2435 projects radially outward around the periphery of the water supply enclosure 2436.

The tank cap 2400 is also provided with an air supply inlet 2438 that receives a supply of air from within body 2100 of the humidifier 2000 and conveys this supply of air to the water tank 2300. Providing the water tank 2300 with a supply of air from the body 2100 of the humidifier 2000 allows the pressure of the air within the water tank 2300 to be equalised with that within the body 2100 of the humidifier 2000 and thereby allows the tank 2300 to be sealed against the ingress of air that has not passed through filters provided on the body 2100 of the humidifier 2000 without impacting on the draining of excess water back into the water tank 2300.

In the illustrated embodiment, the air supply inlet 2438 is provided by an opening in the water supply enclosure 2436 provided at the top of the tank cap 2400, and above the drain 2426 provided towards the top of the column 2410. Consequently, when the body 2100 of the humidifier 2000 is supported on the upper surface of the water tank 2300, air from within body 2100 of the humidifier 2000 can flow into the tank cap 2400 through the air supply inlet 2438 and then into the water tank 2300 through the drain 2426

As mentioned above, the evaporator assembly 2200 comprises an arrangement of porous material 2201 that absorbs water supplied to it by the water supply system and provides a large surface area in order to allow the water to evaporate when the air flow passes through the evaporator assembly 2200 thereby introducing water vapour into the air flow. The evaporator assembly 2200 then comprises an evaporator frame that supports the arrangement of porous material 2201, with the evaporator frame comprising a first end cap covering a first end of the arrangement of porous material, a second end cap covering a second end of the arrangement of porous material, and at least one grille that extends between the first end cap and the second end cap. The at least one grille is connected to both the first end cap and the second end cap and thereby maintains the overall structure of the evaporator frame without restricting the flow of air through the evaporator assembly.

Figure 54:
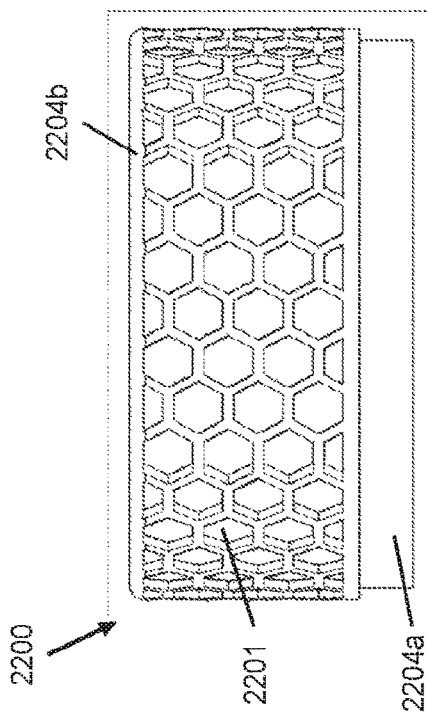
FIG. 54 is a side view of an evaporator assembly suitable for use with the humidifier of FIG. 37.
Figure 55:
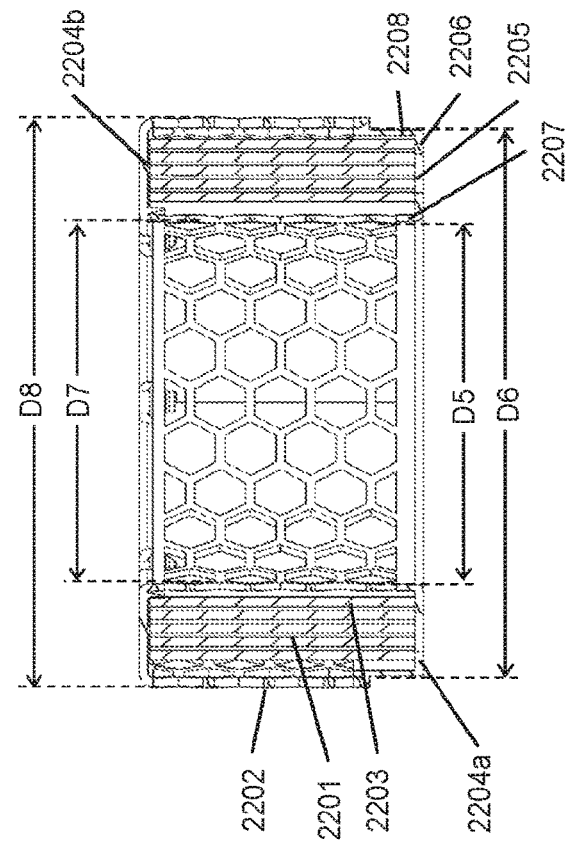
FIG. 55 is a sectional side view of the evaporator assembly of FIG. 54.
Figure 56:
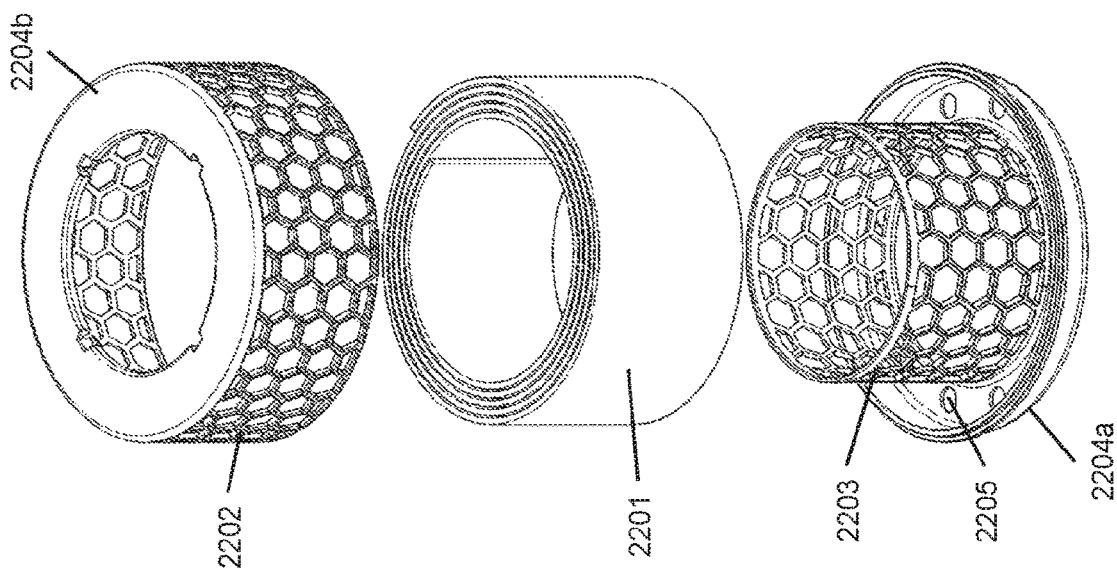
FIG. 56 is an exploded view of the evaporator assembly of FIG. 54.
Figure 57:
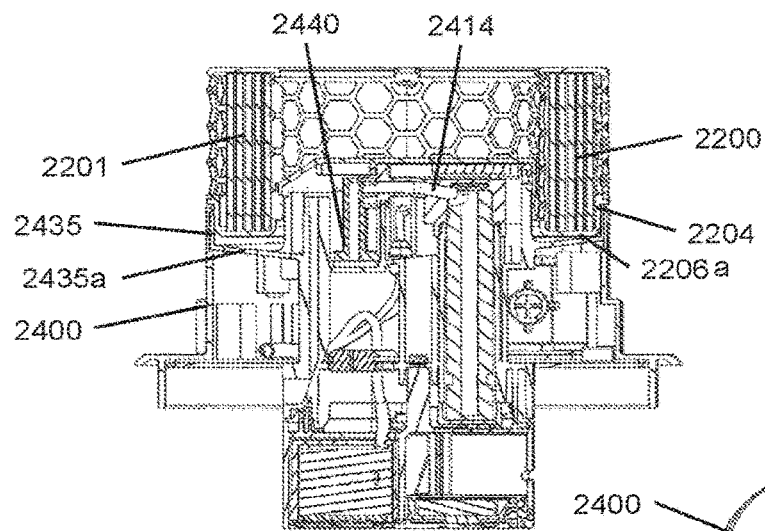
FIG. 57 is a sectional side view of the evaporator assembly of FIGS. 54 to 56 when disposed upon on the tank cap.

FIG. 54 shows a side view of an evaporator assembly 2200 suitable for use with the humidifier 2000 of this second embodiment, FIG. 55 then shows a sectional side view of the evaporator assembly 2200, and FIG. 56 shows an exploded view of the evaporator assembly 2200. FIG. 57 then shows a sectional side view of the evaporator assembly 2200 when disposed upon on the tank cap 2400. In this second embodiment, the evaporator frame comprises a generally tubular outer grille 2202 that extends over the outer surface of a tubular arrangement of porous material 2201 and a generally tubular inner grille 2203 that extends over the inner surface of the tubular arrangement of porous material 2201. The evaporator frame then further comprises a pair of annular end caps 2204a, 2204b that cover the exposed ends of the porous material 2201.

In this second embodiment, the tubular arrangement of porous material 2201 comprises a single tube of porous material, with this tube of porous material 2201 being disposed between a first end cap 2204a and a second end cap 2204b. In particular, a first exposed end of the tubular arrangement of porous material 2201 is covered by the first end cap 2204a and an opposing, second exposed end of the tubular arrangement of porous material 2201 is covered by the second end cap 2204b of the evaporator frame.

In this second embodiment, the evaporator assembly 2200 is arranged such that only one of the two ends of the evaporator assembly 2200 can fit within the evaporator tray 2435. In particular, the first end cap 2204a that covers a first end of the tubular arrangement of porous material 2201 is arranged to fit within the evaporator tray 2435, whilst the second end cap 2204b that covers a second end of the tubular arrangement of porous material 2201 is arranged such that it does not fit within the evaporator tray 2435. Specifically, the inner diameter (D5) of the first end cap 2204a is therefore greater than an inner diameter (D3) of a recess provided by the evaporator tray 2435 whilst the outer diameter (D6) of the first end cap 2204a is less than an outer diameter (D4) of the recess provided by the evaporator tray 2435. In contrast, whilst the inner diameter (D7) of the second end cap is greater than the inner diameter (D3) of the recess defined by the evaporator tray 2435, and is equal to that of the first end cap 2204a, the outer diameter (D8) of the second end cap 2204b is greater than the outer diameter (D4) of recess defined by the evaporator tray 2435. The outer diameter (D6) of the first end cap 2204a is therefore less than the outer diameter (D8) of the second end cap 2204b.

In this second embodiment, the first end cap 2204a is arranged to provide a trough/tray within which the first end of the arrangement of porous material 2201 is disposed. The first end cap 2204a is then provided with a plurality of apertures 2205 that allow water to rise up into and drain out of the trough/tray. Consequently, when disposed upon the evaporator tray 2435, water supplied to the evaporator tray 2435 by the water pump 2403 rises up through these apertures 2205 into the trough/tray provided by the first end cap 2204a such that the first end of the arrangement of porous material 2201 is immersed within the water contained within the first end cap 2204a. The water contained within the first end cap 2204a is then drawn up through the porous material 2201 of the evaporator assembly 2200. Then, when the water pump 2403 ceases pumping water (i.e. is turned off) and the water supply outlet 2440 siphons any water remaining within the evaporator tray 2435 back to the water tank 2300, the water contained within trough/tray provided by the first end cap 2204a drains out of the first end cap 2204a through these apertures 2205.

In the illustrated embodiment, the first end cap 2204a provides an annular trough/tray that fits over the first end of the tubular arrangement of porous material 2201 and acts as the reservoir for water received from the water supply system. A portion of the tubular arrangement of porous material 2201 therefore resides within the volume of water within the first end cap 2204a in order to ensure that this is absorbed by the porous material 2201 of the evaporator assembly 2200. The first end cap 2204a therefore comprises a floor 2206, an inner wall 2207 and an outer wall 2208, with the apertures 2205 being provided within the floor 2206 of the first end cap 2204a. In the illustrated embodiment, the water supply system is also arranged such that, when the evaporator assembly 2200 is disposed upon the evaporator tray 2435, the floor 2206 of the first end cap 2204a is separated from the surface of the evaporator assembly 2200 and is therefore also higher than the bottom end of the water supply outlet 2440 to ensure that water drains from the evaporator assembly 2200 when the water pump 2403 ceases pumping water. The first end cap 2204a is also arranged such that the outer wall 2207 is higher than the inner wall 2206 to ensure that any excess water that overflows from the first end cap 2204a flows over the inner wall 2206 and into the evaporator tray 2435.

As mentioned above, the water tank 2300 is arranged to allow the evaporator assembly 2200 to be inserted into and fully contained within the water tank 2300 when the tank cap 2400 is retained over the tank opening 2312. This arrangement allows the evaporator assembly 2200 to be located within the water tank 2300 when the body 2100 of the humidifier 2000 is connected to the water tank assembly 2300, 2400 so that the evaporator assembly 1200 can be immersed in a de-scaling solution whilst the humidifier 2000 implements a self-contained cleaning cycle. This self-contained cleaning cycle can therefore simultaneously clean both the water supply system, including both the water tank 2300 and the pump system, and the evaporator assembly 2200. The tank opening 2312 of the water tank 2300 is therefore configured to allow the evaporator assembly 2200 to pass/fit through the tank opening 2312. Specifically, the dimensions of the tank opening 2312 exceed the footprint of the evaporator assembly 2200. The interior volume of the water tank 2300 then also has a height/depth that is greater than the height of the evaporator assembly 2200. In addition, the evaporator assembly 2200 is configured to allow the column 2410 that projects from the lower surface of the tank cap 2400 to fit within the hollow centre of evaporator assembly 2200 so that the tank cap 2400 can be located on the water tank 2300 when the evaporator assembly 2200 is aligned with the tank opening 2312.

Figure 58:
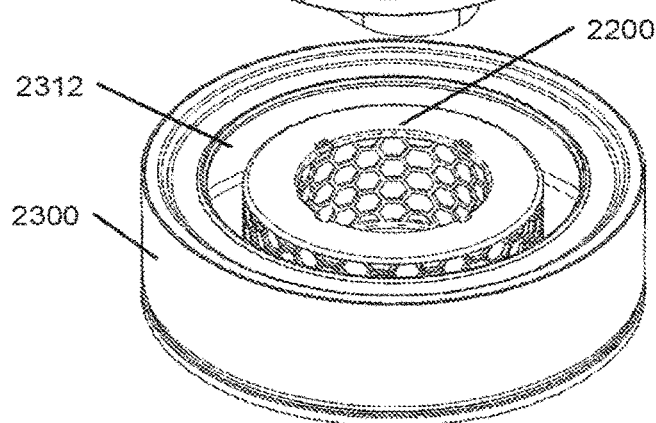
FIG. 58 is a perspective view of the water tank assembly of the humidifier of FIG. 37 with the evaporator assembly located within the water tank.
Figure 59:
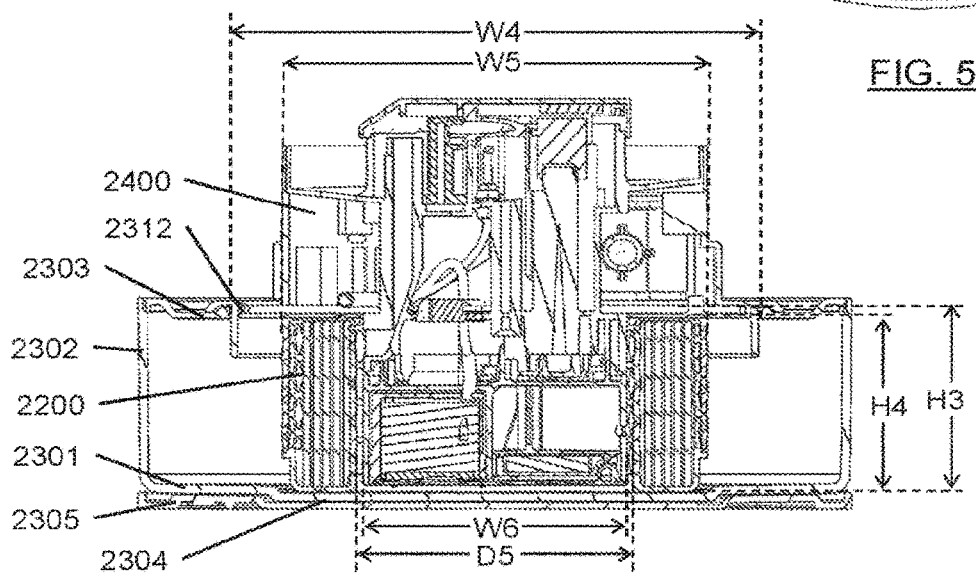
FIG. 59 is a sectional side view of the water assembly of the humidifier of FIG. 37 with the evaporator assembly located within the water tank.

FIG. 58 therefore shows a perspective view of the water tank 2300 with the evaporator assembly 2200 located within the water tank 2300, whilst FIG. 59 shows a sectional side view of the water tank 2300 with the evaporator assembly 2200 located within the water tank 2300 and the tank cap 2400 covering the opening 2312. In the illustrated embodiment, the tank opening 2312 is circular and therefore has a width/diameter (W4) that is greater than the maximum width (W5) of the evaporator assembly 2200. The interior volume of the water tank 2300 when the tank cap 2400 is retained over the opening 2312 then has a height/depth (H3) that is greater than the height (H4) of the evaporator assembly 2200. In addition, the evaporator assembly 2200 is tubular and therefore has an inner diameter (D5) that is greater than the maximum width (W6) of the column 2410 that projects from the lower surface of the tank cap 2400. In the illustrated embodiment, the evaporator assembly 2200 has a height (H4) (i.e. the distance between the outer faces of the first and second end caps 2204*a*. 2204*b*) of at least 50 mm and a maximum width (W5) (i.e. the maximum outer diameter, D8) of at least 120 mm.

It is preferable that evaporator assembly 2200 comprises a multi-layered arrangement of porous material 2201. Consequently, in the illustrated embodiment, the tubular arrangement of porous material 2201 comprises a single piece of porous material 2201 that is formed into a spiral or roll so as to have multiple, overlapping layers. However, in an alternative embodiment, the tubular arrangement of porous material could comprise multiple separate pieces of porous material 2201 that are formed into separate tubes disposed concentrically. In this second embodiment, the porous material 2201 of the evaporator assembly 2200 comprises a spacer fabric that is substantially the same as that of the first embodiment described above and has therefore not been further described In this second embodiment, the nozzle 2600 is arranged to be releasably mounted on, and therefore detachable from, the body 2100 of the humidifier 2000 over the air outlet 2113 of the air flow generator through which the humidified airflow exits the body 2100. The nozzle 2600 comprises an air inlet 2602 that is arranged to receive the airflow from the body 2100 of the humidifier 2000, at least one air outlet 2603, 2604 for emitting the air flow from the nozzle 2600, and an internal air passageway 2605 extending between the air inlet 2602 and the at least one air outlets 2603, 2604. The nozzle 2600 then further comprises a nozzle retaining mechanism for releasably retaining the nozzle 260M on the body 2100 of the humidifier 2000. The nozzle retaining mechanism has a first configuration in which the nozzle 2600 is retained on the body 2100 of the humidifier 2000 and a second configuration in which the nozzle 2600 is released for removal from the body 2100 of the humidifier 2000. The nozzle retaining mechanism is also arranged to biased towards the first configuration such that the nozzle retaining mechanism is retained the nozzle 2600 on the body 2100 of the humidifier 2000 unless placed into the second configuration by a user. The nozzle 2600 can therefore be temporarily detached from the body 2100 of the humidifier 2000 in order to allow a user insert and remove a filter assembly 2140 through the open upper end 2109 of the filter compartment 2108 before reattaching the nozzle 2600 to the body 2100 of the humidifier 2000.

When in use the pump 2403 provided by the tank cap 2400 pumps water from within the water tank 2300 through the outgoing water supply pipe 2407. Within the outgoing water supply pipe 2407 the water from the water tank 2300 is then disinfected by the UV system before the water exits the tank cap 2400 through the water supply outlet 2440 and into the annular trough/tray provided by the first end cap 2204*a* of the evaporator assembly 2200. The water retained within the first end cap 2204*a* is then drawn up through the porous material 2201. Rotation of the impeller 2110 by the motor 2168 generates an air flow through the impeller housing 2151. This air flow draws air into the body 2100 of the humidifier 2000 through the filter assembly 2140 and through the pores of the evaporator assembly 2200. The water absorbed by the porous material 2201 of the evaporator assembly 2200 then evaporates into the air flow as it passes through the porous material 2201 thereby introducing water vapour into the air flow. The humidified air flow then passes through the impeller housing 2151 and exits the body 2100 of the humidifier 2000 through the air outlet air outlet 2113 of the air flow generator and into the nozzle 2600.

It will be appreciated that individual items described above may be used on their own or in combination with other items shown in the drawings or described in the description and that items mentioned in the same passage as each other or the same drawing as each other need not be used in combination with each other. In addition, the expression "means" may be replaced by actuator or system or device as may be desirable. In addition, any reference to "comprising" or "consisting" is not intended to be limiting in any way whatsoever and the reader should interpret the description and claims accordingly.

Furthermore, although the invention has been described in terms of preferred embodiments as set forth above, it should be understood that these embodiments are illustrative only. Those skilled in the art will be able to make modifications and alternatives in view of the disclosure which are contemplated as falling within the scope of the appended claims. For example, those skilled in the art will appreciate that the above-described invention might be equally applicable to other types of humidifiers, and not just free standing humidifiers. By way of example, such a humidifier could be any of a freestanding humidifier, a ceiling or wall mounted humidifier and an in-vehicle humidifier.

In the above described embodiments, the evaporator assembly comprises one or two separate formations of porous material with at least one end of each formation being disposed within a corresponding trough/tray; however, in an alternative embodiment, the evaporator assembly could comprise more than two formations of porous material, with the evaporator frame then having an appropriate number of trough/trays separating adjacent formations of porous material. Also, in the illustrated embodiments, the evaporator assembly has the shape of a cylindrical tube (i.e. a right circular hollow cylinder). However, the evaporator assembly could equally have the shape of a non-cylindrical tube and/or a partial tube (e.g. a cross-sectional shape of a major circular arc).

In addition, in the above described embodiments, the lateral water outlet of the outgoing water supply pipe extends tangentially from the outgoing water supply pipe. However, in alternative embodiments, both of the lateral water inlet and the lateral water outlet could extend tangentially from the outgoing water supply pipe or the lateral water inlet rather than the lateral water outlet could extend tangentially from the outgoing water supply pipe.

Furthermore, in the above described first embodiment, the interface sealing element is provided on the connector chassis of the body-to-tank connector. However, the interface sealing element could equally be provided on the tank-to-body connector. In particular, in the above described first embodiment, the connection sealing element is provided by a gasket that is arranged on the connector chassis to surround each of the water supply inlet, the water return outlet and the air supply outlet. In an alternative of this first embodiment, the connector sealing element could be provided on a rearward facing surface of the connector housing of the tank-to-body connector surrounding the openings into the fluid connector section of the connector housing. Similarly, in the above described second embodiment, the interface sealing element is provided on the lower surface on the body of the humidifier and is arranged to contact and be compressed by an upper surface of the water tank. In an alternative of this second embodiment, the interface sealing element could be provided on the upper surface of the water tank and is arranged to contact and be compressed by a lower surface on the body of the humidifier.

Moreover, in the first embodiment described herein it is the outgoing water supply pipe provided by the water tank assembly that forms part of the ultraviolet (UV) disinfection system such that the UV light source is arranged to irradiate the water passing through a water supply pipe that is disposed within the water tank. However, in an alternative embodiment, the ultraviolet (UV) disinfection system could comprise at least a portion of the water supply pipework that is disposed within the body of the humidifier. The UV light source would then be arranged to irradiate the water passing through a water supply pipe that is disposed within the body of the humidifier.

In addition, in the embodiments described herein the crest/brim of the receptacle of the flow regulator is lower than the outlet of the outgoing water supply pipe. However, whilst the height of the weir provided by the crest/brim is a factor in determining the flow rate, it is not essential that the crest/brim is lower than the outlet. In particular, the crest/brim could be at the same height or higher than the outlet. Furthermore, in the embodiments described herein the restriction of the flow regulator comprises an orifice plate disposed between the inlet of the receptacle and the crest/brim. However, in alternative embodiments, the restriction could be provided at the outlet from the receptacle such that crest/brim is provided at/by the outlet from the restriction. For example, the outlet from the receptacle could comprise an outlet duct that is narrower than the receptacle and therefore provides the restriction, with the crest/brim then being provided at the exit from the outlet duct.

The invention claimed is:

1. An ultraviolet disinfection apparatus for disinfecting a supply of water, the ultraviolet disinfection apparatus comprising:
a water supply pipe arranged to convey the supply of water;
a water pump arranged to pump water from a water tank through the water supply pipe;
an ultraviolet light source arranged to irradiate water passing through the water supply pipe with ultraviolet light; and
a flow regulator that is arranged to ensure that the flow rate of water through the water supply pipe does not exceed a pre-defined maximum;
wherein the flow regulator comprises a receptacle that is arranged to receive water from the water pump and that is fluidically connected to the water supply pipe, and the receptacle comprises a crest that is arranged to allow water to flow out of the receptacle and back into the water tank, and wherein an inlet into the receptacle is provided at a lower end of the receptacle and the crest is provided at an upper end of the receptacle.

2. The ultraviolet disinfection apparatus of claim 1, wherein the flow regulator is arranged to allow water that exceeds a height of the crest to flow out of the receptacle.

3. The ultraviolet disinfection apparatus of claim 1, wherein the receptacle comprises a restriction that is arranged such that the water received by the receptacle must flow through the restriction before passing over the crest of the receptacle.

4. The ultraviolet disinfection apparatus of claim 3, wherein the restriction comprises an orifice plate disposed between an inlet of the receptacle and the crest.

5. The ultraviolet disinfection apparatus of claim 1, wherein:
the water supply pipe comprises a water supply pipe inlet provided at a lower end of the water supply pipe, and
the inlet into the receptacle is connected to the water supply pipe inlet by a channel or manifold that extends from the lower end of the receptacle.

6. An air treatment apparatus comprising:
an air flow generator that is arranged to generate an air flow;
a moisture source that is arranged to introduce water vapour into the air flow; and
a water supply system that is arranged to provide water to the moisture source;
wherein the water supply system comprises a water tank, a water supply pipe arranged to convey water from the water tank towards the moisture source, a water pump arranged to pump water from the water tank through the water supply pipe, and an ultraviolet light source arranged to irradiate water passing through the water supply pipe with ultraviolet light;
wherein the water supply system further comprises a flow regulator that is arranged to ensure that the flow rate of water through the water supply pipe does not exceed a pre-defined maximum; and
wherein the flow regulator comprises a receptacle that is arranged to receive water from the water pump and that is fluidically connected to the water supply pipe, and the receptacle comprises a crest that is arranged to allow water to flow out of the receptacle and back into the water tank, and wherein an inlet into the receptacle is provided at a lower end of the receptacle and the crest is provided at an upper end of the receptacle.

7. The ultraviolet disinfection apparatus of claim 1, wherein an inlet into the water supply pipe is provided adjacent to a lower end of the water supply pipe and an outlet from the water supply pipe is provided adjacent to an upper end of the water supply pipe, and the crest is vertically lower than the outlet from the water supply pipe.

8. The ultraviolet disinfection apparatus of claim 7, wherein the inlet of the receptacle is fluidically connected to the inlet of the water supply pipe.

9. The ultraviolet disinfection apparatus of claim 8, wherein the outlet of the water pump is connected to the inlet of the receptacle and inlet of the receptacle is connected to the inlet of the water supply pipe by a channel.

10. The ultraviolet disinfection apparatus of claim 1, wherein the crest of the receptacle is fluidically connected to an overflow spillway.

11. The ultraviolet disinfection apparatus of claim 6, wherein the inlet of the receptacle is fluidically connected to an outlet of the water pump.

12. The air treatment apparatus of claim 6, wherein the flow regulator is arranged to allow water that exceeds a height of the crest to flow out of the receptacle and back into the water tank.

13. The air treatment apparatus of claim 6, wherein the receptacle comprises a restriction that is arranged such that the water received by the receptacle must flow through the restriction before passing over the crest of the receptacle.

14. The air treatment apparatus of claim 13, wherein the restriction comprises an orifice plate disposed between an inlet of the receptacle and the crest.

15. The air treatment apparatus of claim 6, wherein:
the water supply pipe comprises a water supply pipe inlet provided at a lower end of the water supply pipe, and
the inlet into the receptacle is connected to the water supply pipe inlet by a channel or manifold that extends from the lower end of the receptacle.

16. The air treatment apparatus of claim 6, wherein the inlet of the receptacle is fluidically connected to an outlet of the water pump.

17. The air treatment apparatus of claim 6, wherein an inlet into the water supply pipe is provided adjacent to a lower end of the water supply pipe and an outlet from the water supply pipe is provided adjacent to an upper end of the water supply pipe, and the crest is vertically lower than the outlet from the water supply pipe.

18. The air treatment apparatus of claim 17, wherein the inlet of the receptacle is fluidically connected to the inlet of the water supply pipe.

19. The air treatment apparatus of claim 18, wherein the outlet of the water pump is connected to the inlet of the receptacle and inlet of the receptacle is connected to the inlet of the water supply pipe by a channel.

20. The air treatment apparatus of claim 6, wherein the crest of the receptacle is fluidically connected to an overflow spillway.

21. The air treatment apparatus of claim 20, wherein in use the overflow spillway is arranged to convey water from the receptacle into the water tank.

22. The air treatment apparatus of claim 6, and further comprising a pump controller that is arranged to operate the water pump at a flow rate that ensures a constant flow of water over the crest of the receptacle.

* * * * *